May 27, 1958 E. D. EARLY 2,836,730

ECONOMIC LOADING OF POWER SYSTEMS

Filed June 1, 1954 15 Sheets-Sheet 1

May 27, 1958 E. D. EARLY 2,836,730

ECONOMIC LOADING OF POWER SYSTEMS

Filed June 1, 1954 15 Sheets-Sheet 2

ECONOMIC LOADING OF POWER SYSTEMS

ECONOMIC LOADING OF POWER SYSTEMS

Filed June 1, 1954

May 27, 1958 E. D. EARLY 2,836,730

ECONOMIC LOADING OF POWER SYSTEMS

Filed June 1, 1954 15 Sheets-Sheet 10

May 27, 1958 E. D. EARLY 2,836,730

ECONOMIC LOADING OF POWER SYSTEMS

Filed June 1, 1954 15 Sheets-Sheet 13

May 27, 1958 E. D. EARLY 2,836,730

ECONOMIC LOADING OF POWER SYSTEMS

Filed June 1, 1954 15 Sheets-Sheet 15

2,836,730

ECONOMIC LOADING OF POWER SYSTEMS

Edwards Donald Early, Birmingham, Ala.

Application June 1, 1954, Serial No. 433,511

69 Claims. (Cl. 290—4)

This invention has for an object the provision of methods of and means for loading interconnected generating stations forming an electrical power system so that the cost of delivered power at the loads or load centers is a minimum and has for a further object the provision of a reliable arrangement by means of which the generation of the respective power sources may be brought to values which yield minimum cost of operation of the system as a whole.

For a number of years utility engineers have paid particular attention to the relative costs of power generation at each of the power sources. Electrical generating units vary widely in their characteristics and generation costs. For example, in the case of steam stations, the type of fuel burned in the boilers may greatly change the cost factor of a station. A station which is equipped to burn either coal or gas may have available at times so-called "dump gas," which is available when normal requirements are less than pipe line transmission capacity. Since the cost of "dump gas" is less than coal, its use may materially affect the load assigned to the station, loading being increased because of the lower fuel cost.

If cost of generation is the only factor to be considered, then the lowest overall cost is obtained when all units are operating at points of equal slopes on the input-output curves where the input is taken in dollars-per-hour cost of generation, and the output as kilowatts. Since the input-output curves are not straight lines, there may be considerable variation in the slopes as the unit loads are changed.

Numerous methods using schedules and curves to correlate the slopes of generating units at the required total system generation are used for this purpose. Such methods require a large number of schedules and curves to take care of the possible variations in the number of generators available for generation, variable fuel costs, etc. While material savings have been realized in practicing the foregoing methods, such systems have not taken into account transmission losses which may be large. With an interconnected system extending over a wide geographical area, it is not uncommon to transmit or relay power over distances of two or three hundred miles and more.

The need to take into account transmission losses as well as the cost of power generation greatly complicates the overall problem. In an electrical power system consisting of interconnected power sources feeding power to load centers located throughout the system, it has been demonstrated that the incremental transmission losses from each power source will in part depend upon the power supplied by each of the other sources. The application of the foregoing principles so as to take into account both the cost of generation and transmission loss indicates that for a large system it is necessary to solve as many as twenty-three non-linear simultaneous equations involving twenty-three unknowns.

Prior to the present invention there has been recognition by those skilled in the art of the equations above referred to. Use has been made of slide rules and other devices by means of which generation at the sources has been calculated for assumed levels of generation and assumed constraints on the sources. While generation-determining slide rules and digital computers of great complexity and cost have been utilized, much has been left to be desired in providing methods of and systems for determining generation levels as a function of actual system conditions existing at the moment.

In accordance with the present invention, as system conditions change, so do the computed generation values or change in generation values needed to maintain the sources operating at the lowest total cost of delivered power. When constraints, expected or unexpected, arise by reason of a generator reaching an uppper or lower limit of its regulating range, account is immediately taken of that fact. Such constraints include the inability of a power source to deliver additional generation or to have its generation increased at the anticipated rate. Such constraints include the overloading of transmission lines which will require that generation of certain of the sources be maintained at existing levels, or perhaps be decreased. The variables imposing such constraints are unpredictable to a degree which makes it impossible to take them into account by means of predetermined loading schedules which are usually prerequisite to the use of slide rules, digital computers and the like.

Where there are interconnections by way of tielines to other areas, a change in flow on such tielines will not always conform to predetermined schedules. When it does not, the economy of operation of all of the sources in a controlled area is immediately affected. Aside from the foregoing, in any large area having a large number of generators, as many as forty and more in some systems, there may be failure of auxiliaries such as pulverizers for powdered coal-fuel, failure of fans or fan motors for draft control, boiler feed pumps and condensers. Where the moisture content of the coal supplied the pulverizers suddenly changes, the generation level may be limited solely by reason of "wet coal" supplied the pulverizers. The occurrence of a leak in a boiler or in the super-heater tubes may impose further limitations upon generation.

In accordance with the present invention I have provided systems and methods which utilize the power system itself as a part of a computer and by means of which there is attained a minimum cost of power delivered to the load centers of the system. Operations to achieve such minimum cost of power delivered to the load are accomplished in terms of existing generation at the several sources. As that generation changes either by the occurrence of one of the aforesaid constraints, by change of load or required generation, the computer continuously and coincidentlly with such changes provides for the distribution of generation among the sources for continued operation at a minimum cost of power delivered to the load centers.

Further in accordance with the invention, the change in generation at the several sources is continuously effected as a part of the computing procedures for the determination of the minimum cost of power delivered to the load centers of the system. When the computation is complete the distribution of generation is complete for the minimum incremental cost of power delivered to the load. The direct interrelationship between generation at the several sources and the computation of incremetal costs of delivered power is in contrast with prior systems which must always include assumptions as to what the generation levels will be and what the constraints will be, for the determination of the incremental costs of delivered power. Such calculations also require a considerable length of time for their accomplishment. Not only during that time interval, but almost continuously, the load is changing on the system as a whole. By the time the calculations are made and by the time generation is changed in accordance with those calculations, the generation level will not have been adjusted to meet the existing load conditions for the system. In other words, there is no assurance that the generation or load conditions assumed for the calculations will continue to exist for that length of time during which generation may be adjusted in conformity with the calculations. In general, unpredictable changes in tieline loadings and failure of a plant to perform in accordance with past experience can never be taken into account in determining predetermined loading schedules.

More particularly, signals which may be in the form of voltages representative of the levels of generation of the several sources are applied to a computing network. The computing network then produces signals or voltages representative of the incremental transmission losses for the respective power sources. Other signals or voltages produced are representative of the incremental costs of generation at the several sources. By suitable means, voltages or signals are produced whose magnitudes are determined both by the transmission losses of, and the generation costs at, the sources. The latter signals are representative of the incremental costs of delivered power. The foregoing voltages vary with change in generation and with change in transmission loss and are utilized for the adjustment of generation of each source for equality of the incremental cost of delivered power with each other source. In this manner, there is at all times achieved a minimum cost of revenue-producing delivered power for the system at a whole.

In summary, the present invention provides a dynamic generation-dispatching control which at all times, in terms of existing system conditions and system demands, provides not only continuous indications for the needed changes in generation to maintain the aforesaid equality in the incremental costs of delivered power, but also includes features of control which cause the computing system to take existing constraints into account. Provisions are also made for directly and continuously changing actual generation levels as a part of the computing procedures to maintain those levels of generation which assure equal incremental costs of delivered power from all sources.

For a more detailed development of the underlying theory and for further objects and advantages of the invention, reference is to be had to the following detailed description taken in conjunction with the accompanying drawings, in which.

Figure 1:
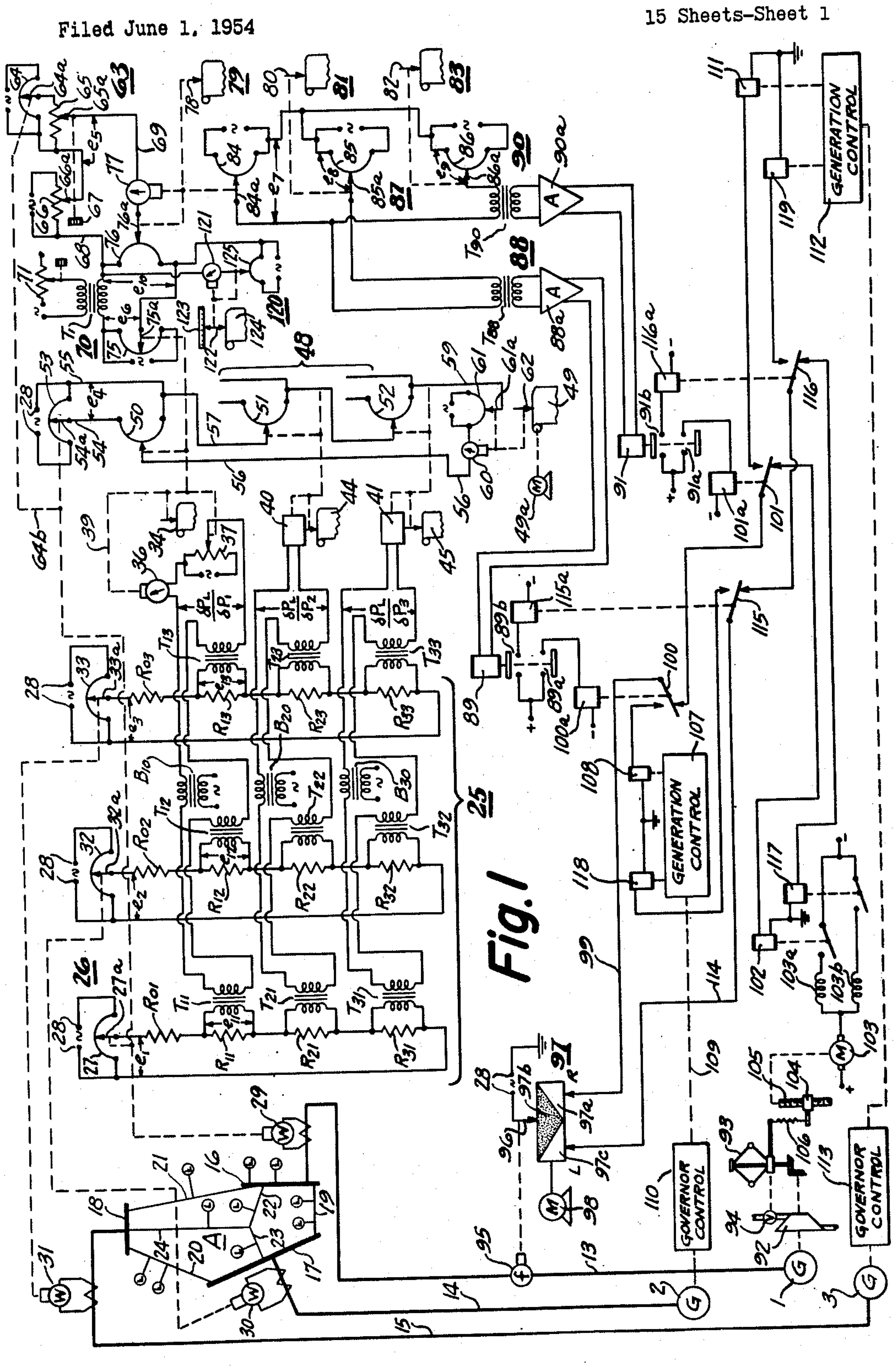
Fig. 1 is a wiring diagram of one modification of the invention.
Figure 2:
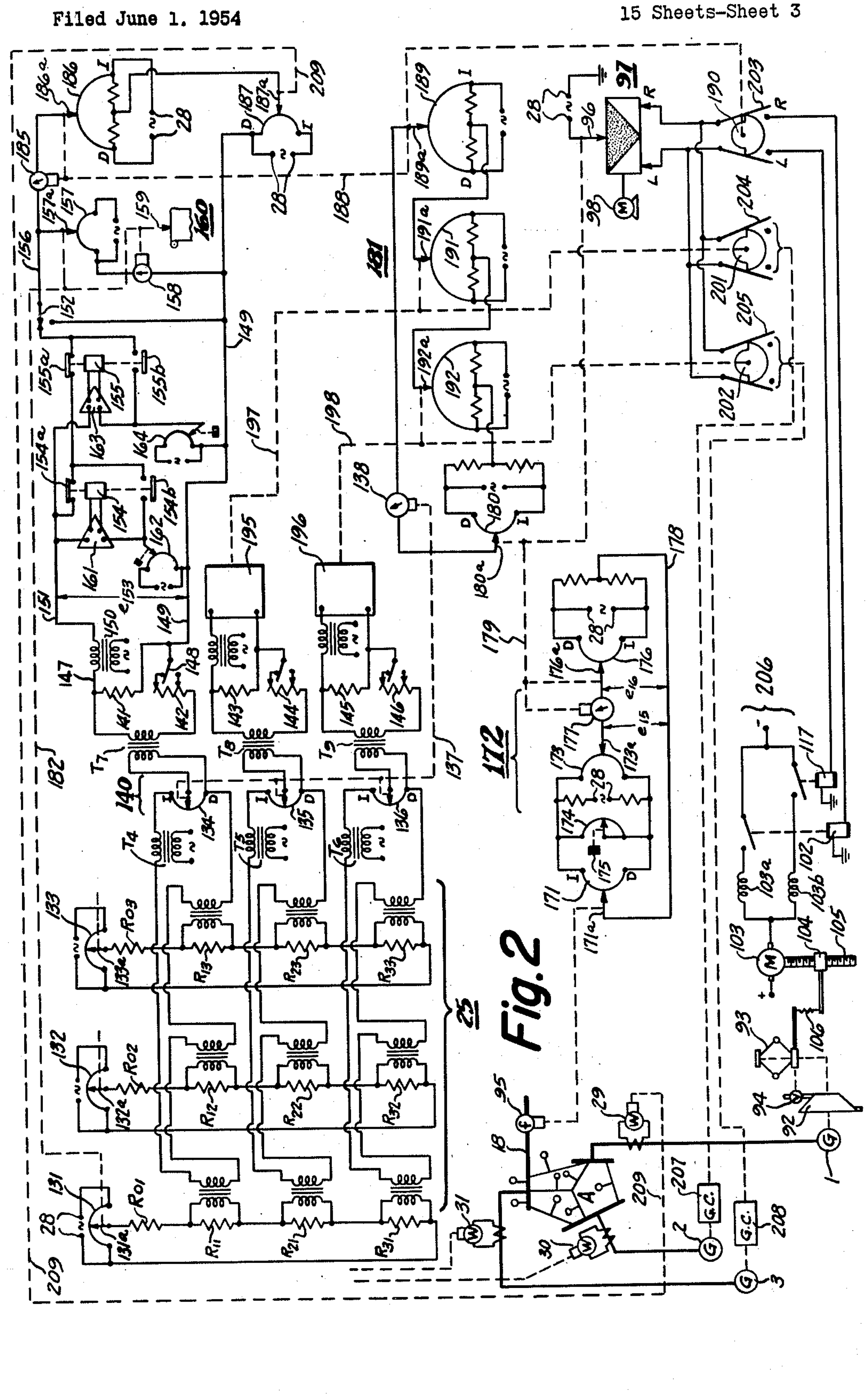
Fig. 2 is a wiring diagram diagrammatically illustrating a substantially different modification of the invention in which reliance is largely placed upon desired values of generation rather than upon actual generation, the latter being regulated for attainment of computed values thereof.
Figure 2A:
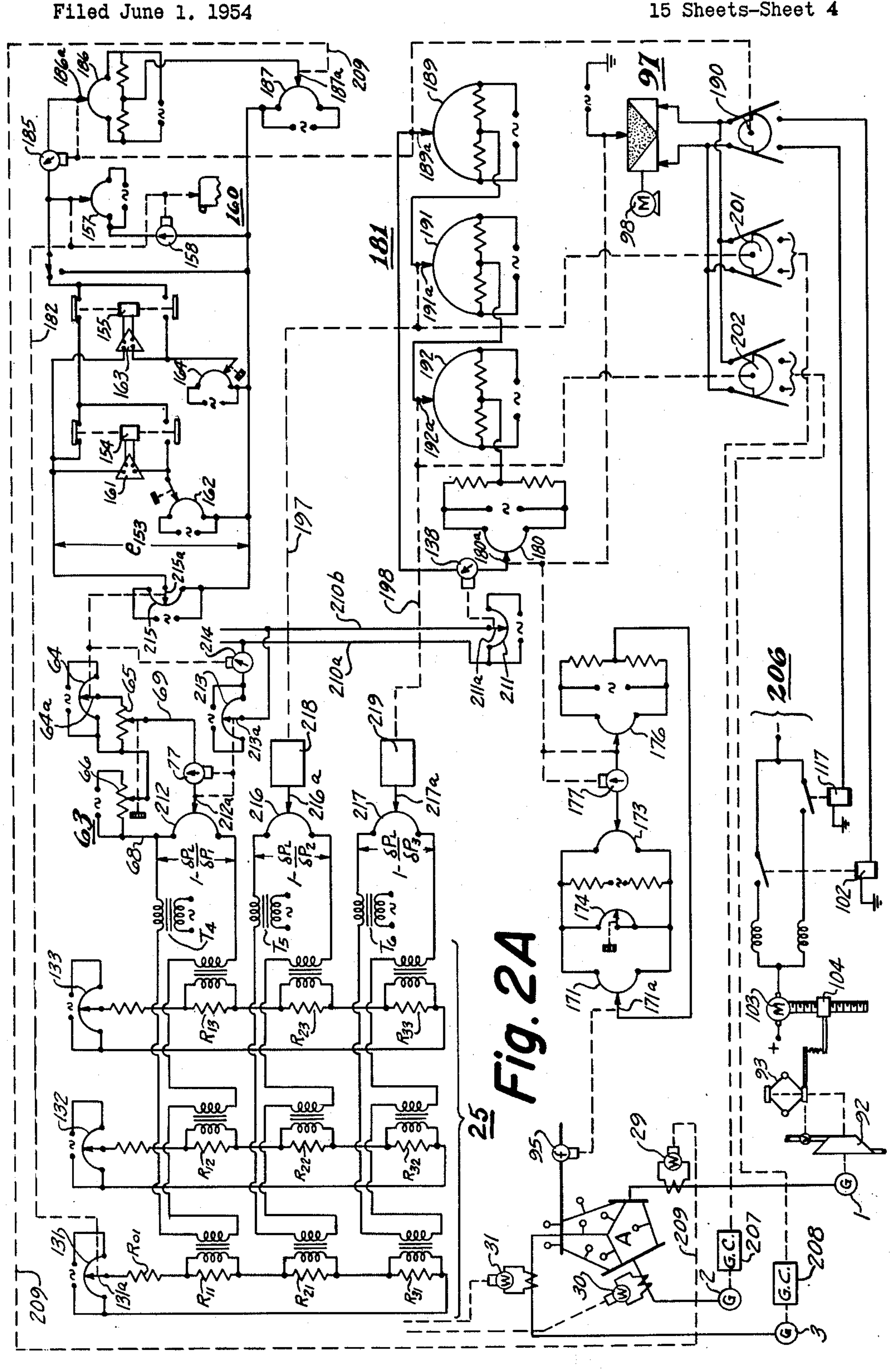
Fig. 2A is a wiring diagram diagrammatically illustrating another modification of the invention including control features differing from those disclosed in Fig. 1.
Figure 3:
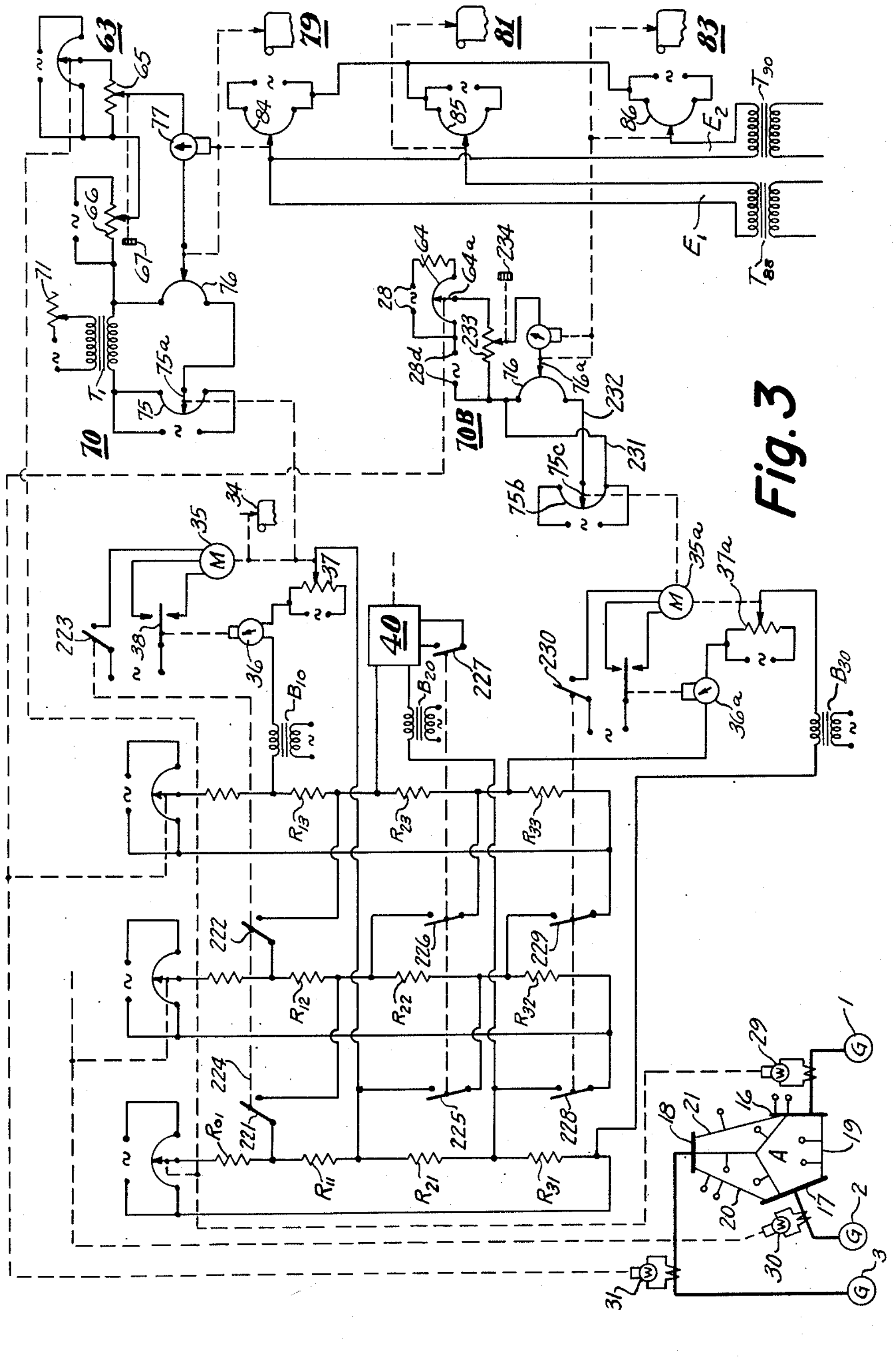
Figure 4:
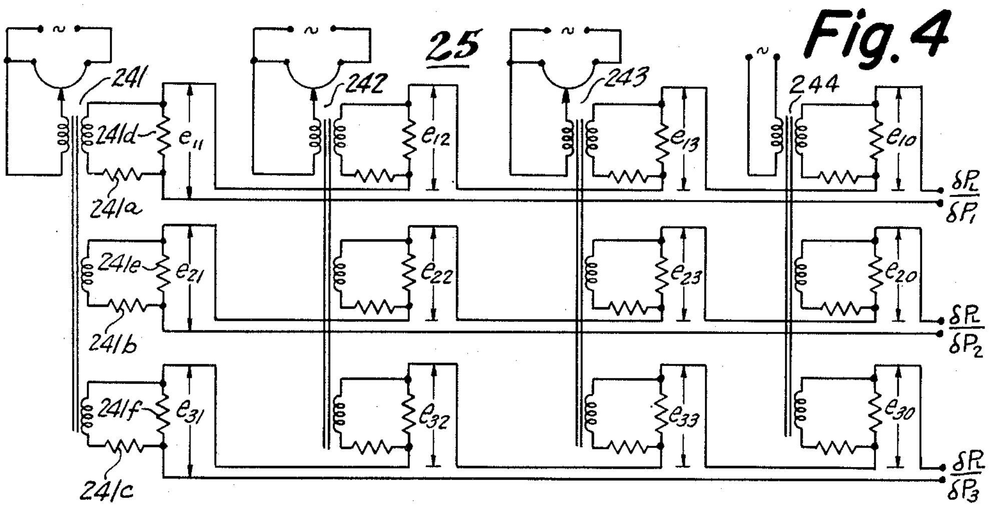
Figure 5:
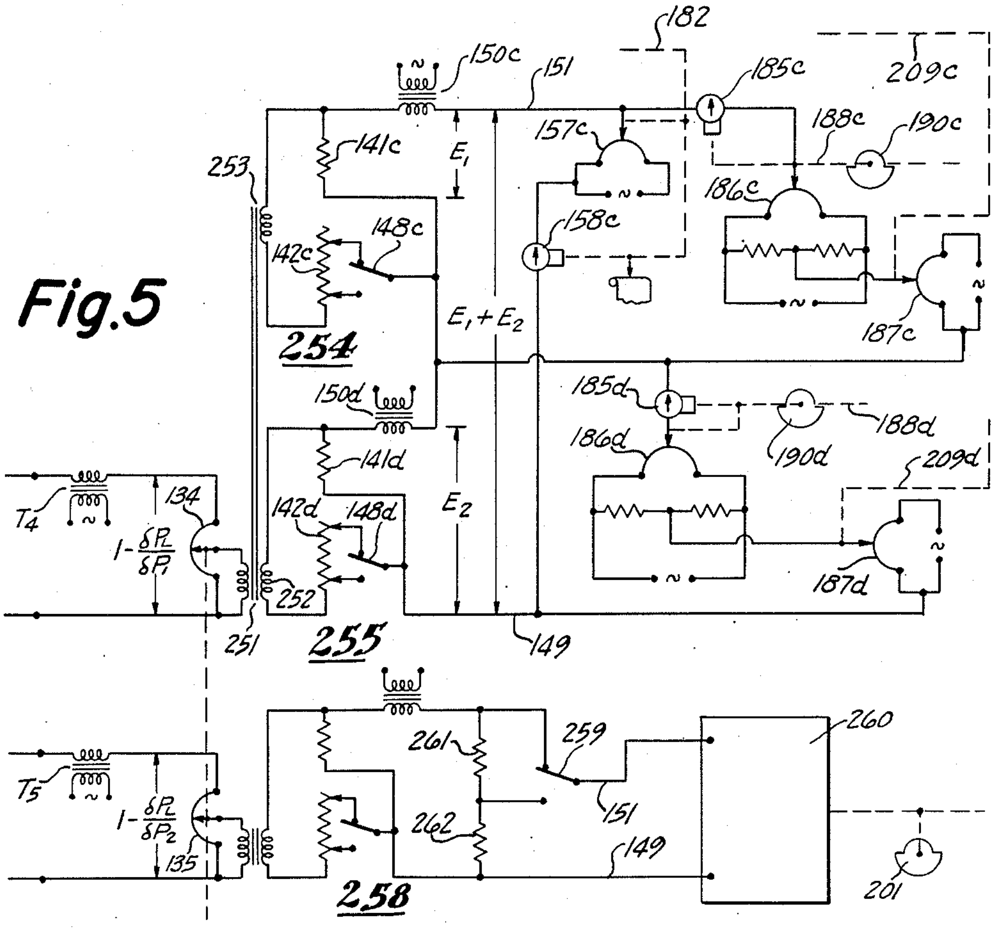
Figure 6:
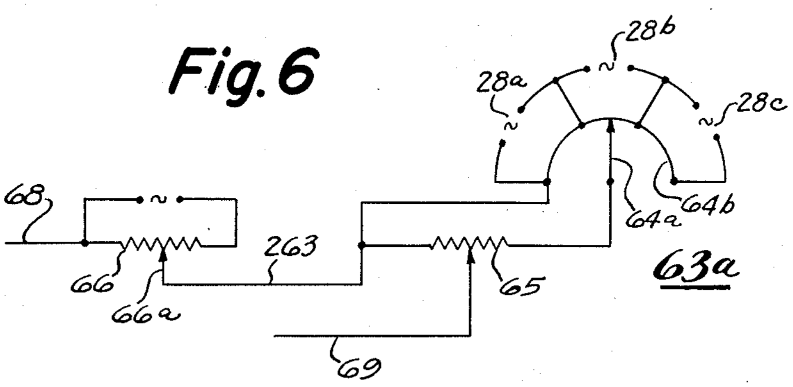
Figure 7:
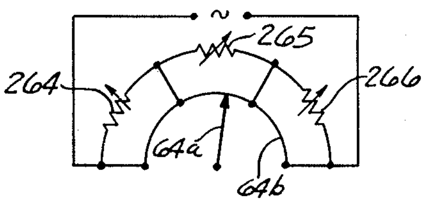
Figure 8:
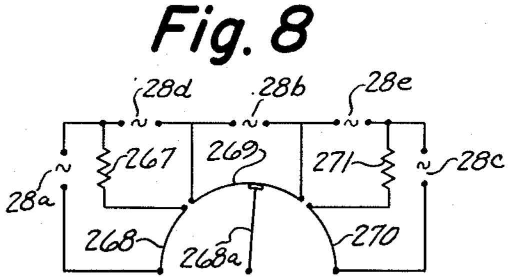
Figure 9:
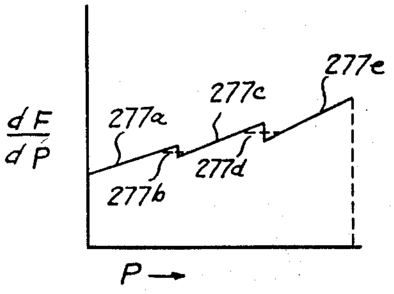
Figure 10:
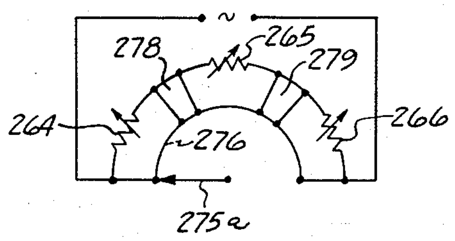
Figure 8A:
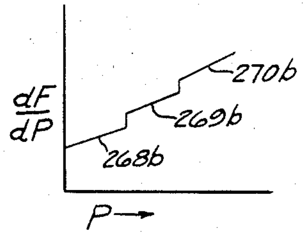
Figure 11:
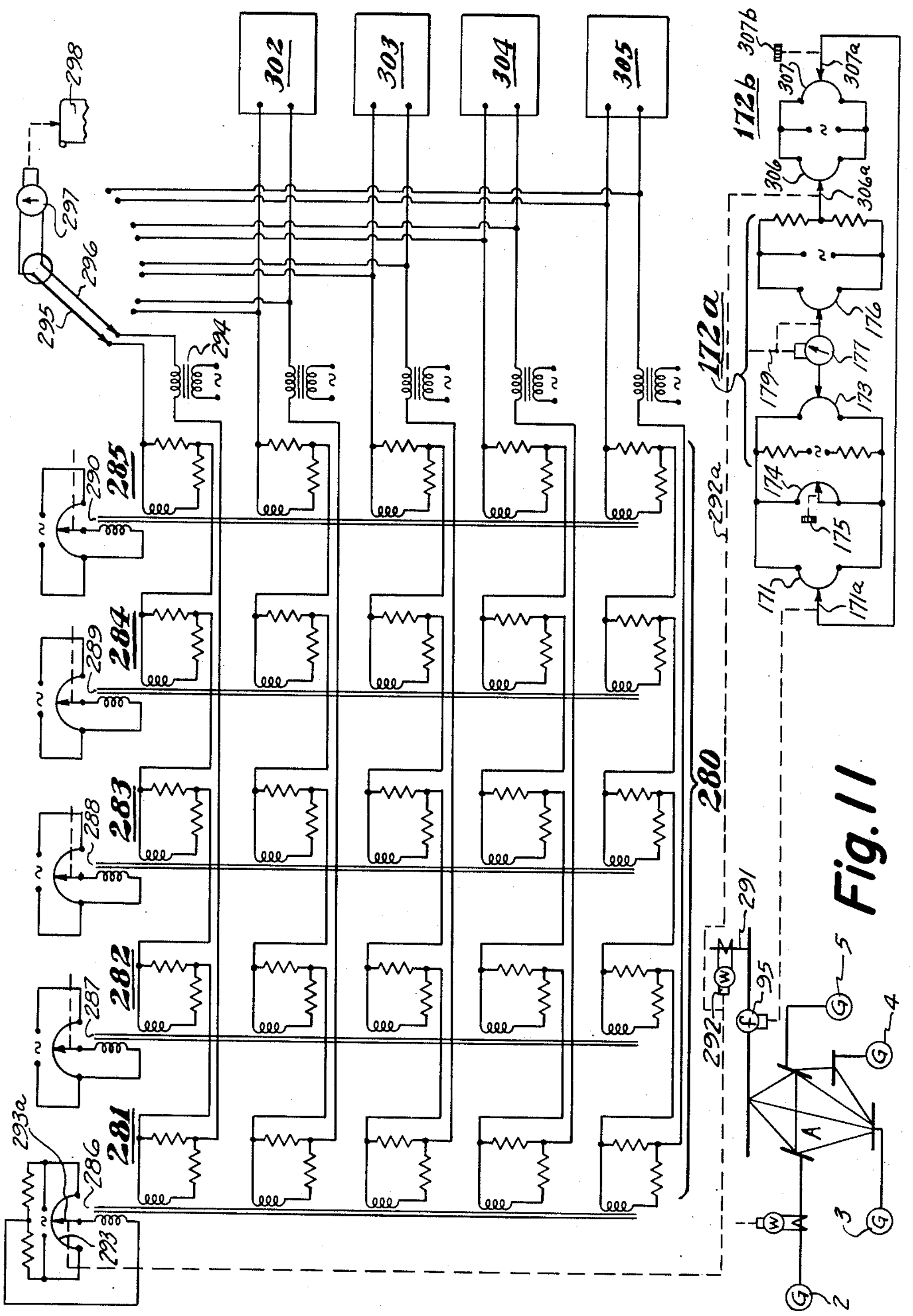
Figure 12:
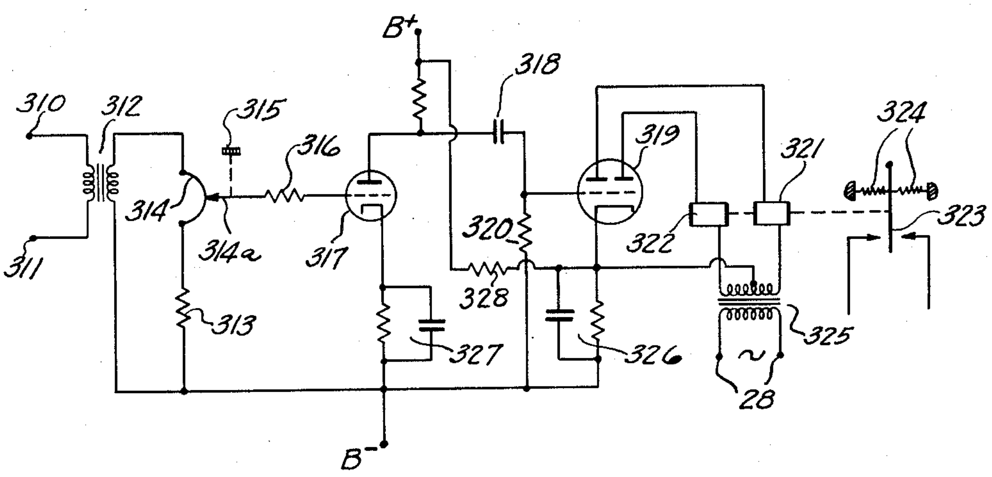
Figure 13:
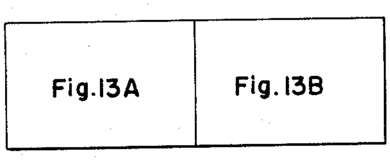
Figure 13A:
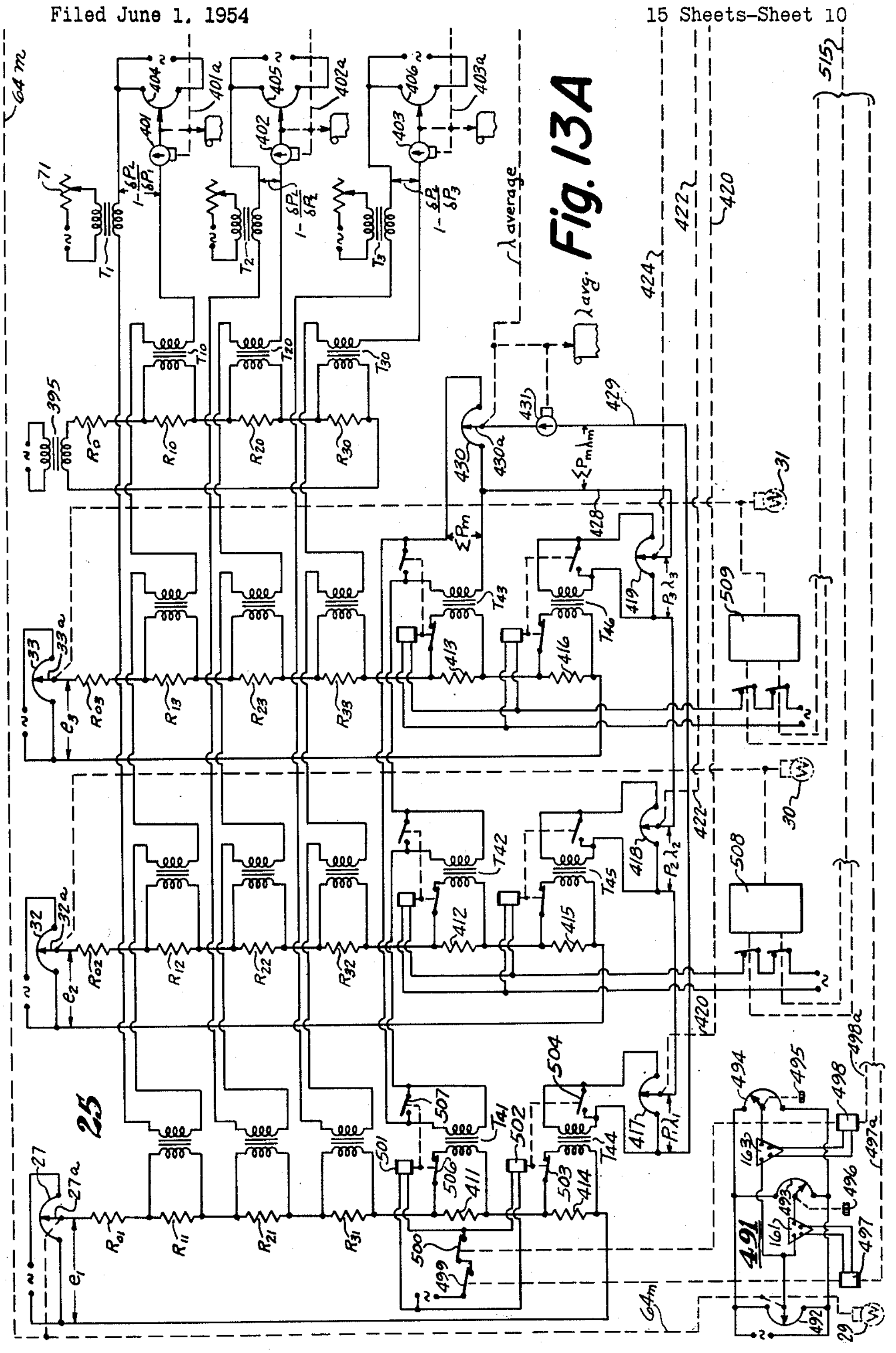
Figure 13B:
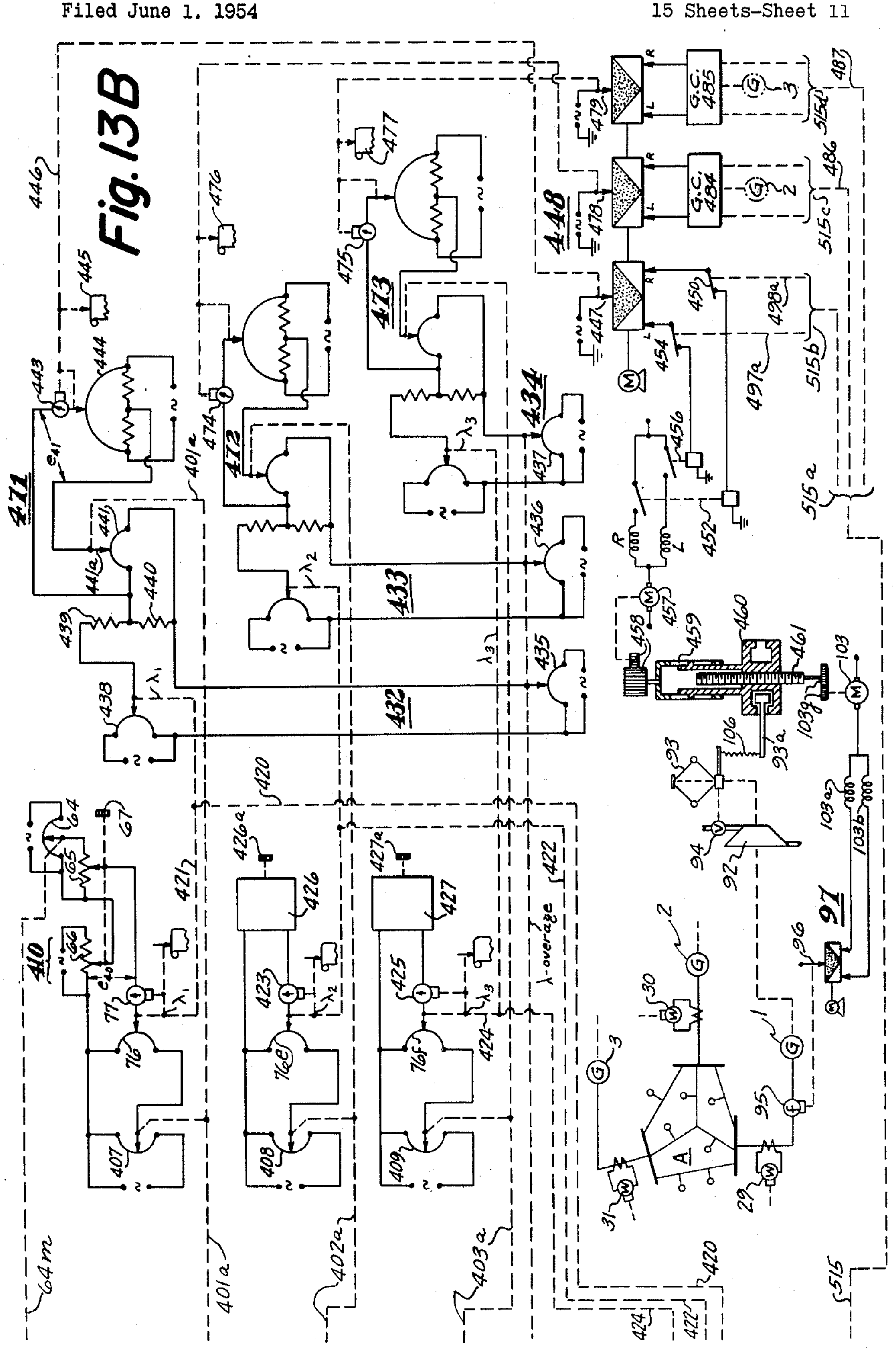
Figure 14:
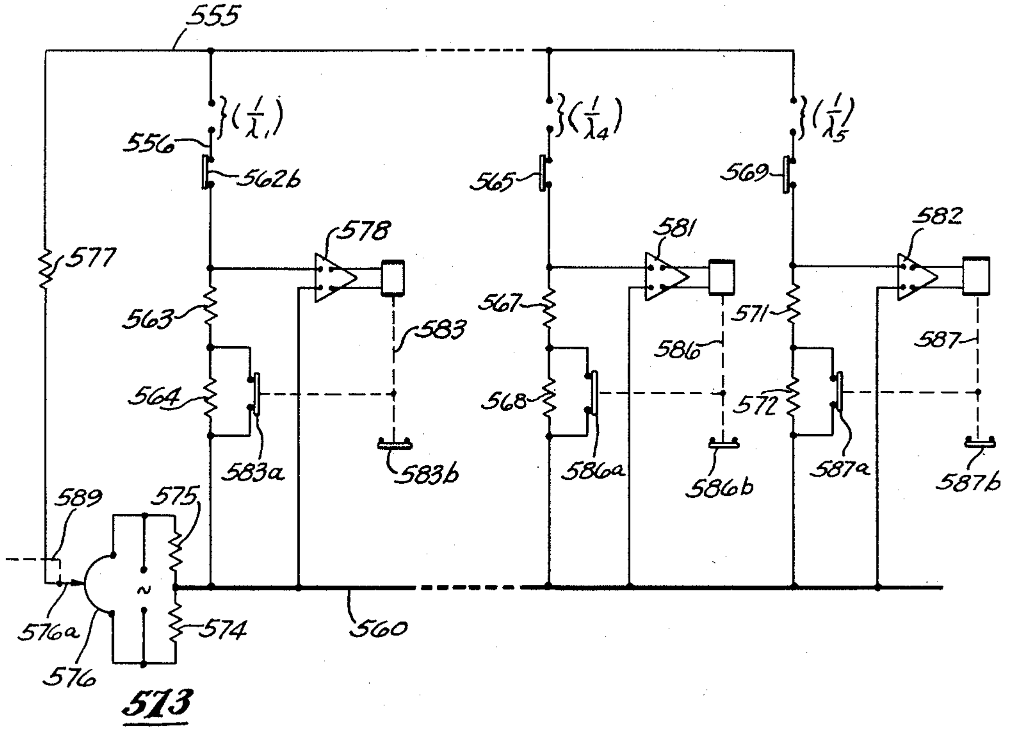
Figure 15:
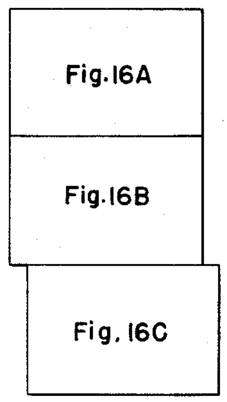
Figure 16A:
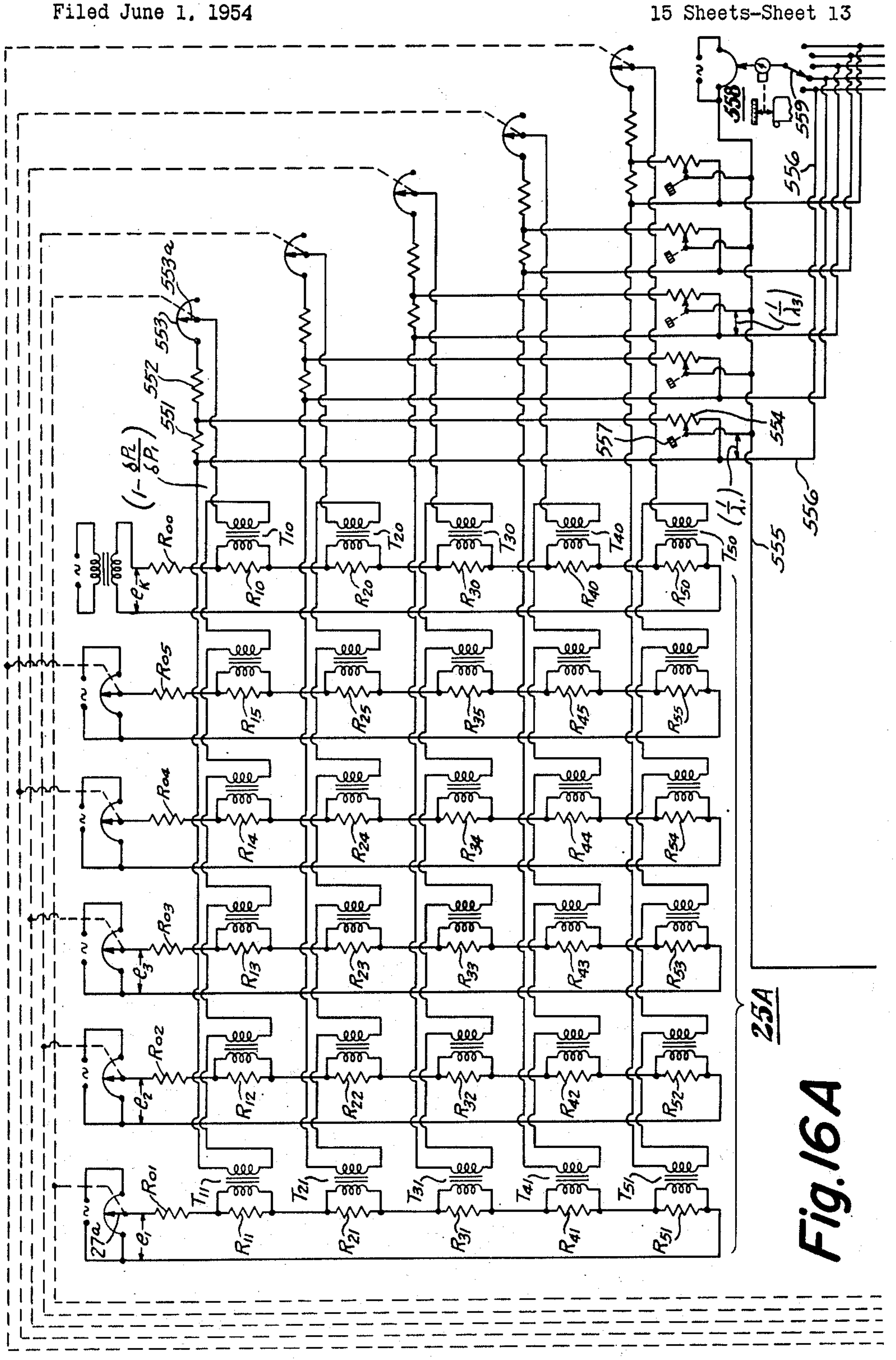
Figure 16B:
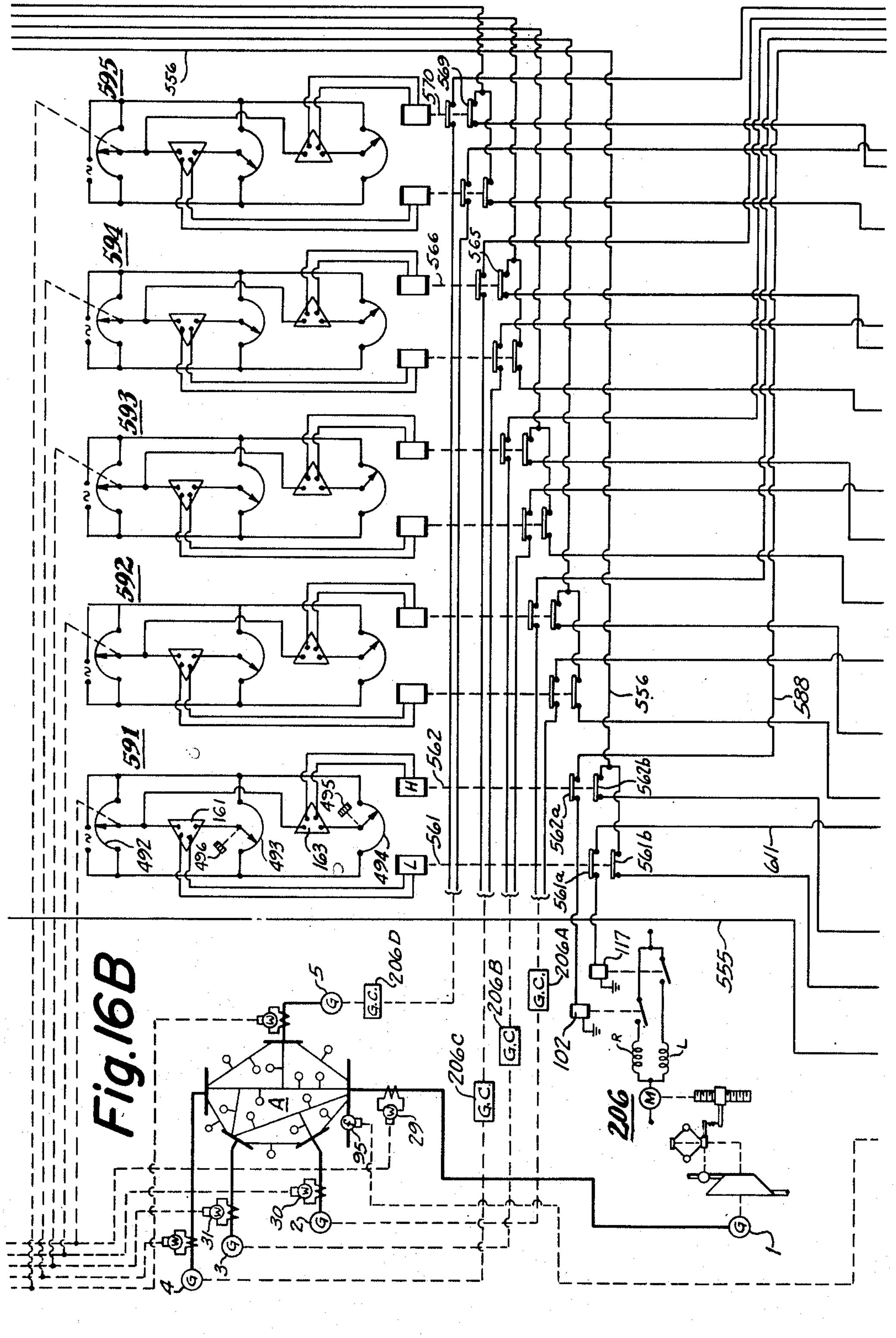
Figure 16C:
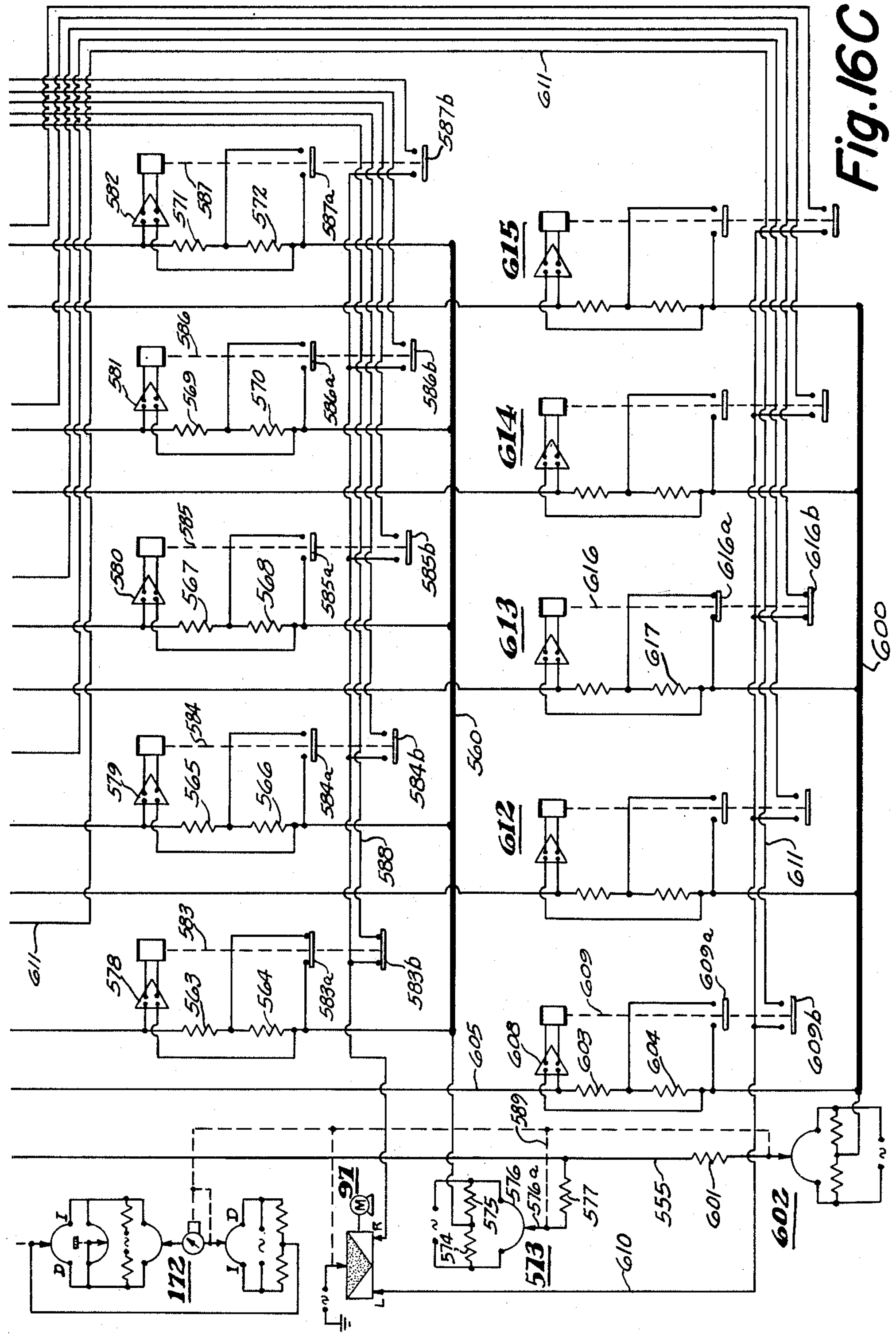

Fig. 3 diagrammatically illustrates a simplified computer network of a type which does not require the isolating transformers of Figs. 1–2A;

Fig. 4 is a wiring diagram of a computing means in which there is shown an equivalent for one group of series circuits in the form of transformers having single primary windings and multiple secondary windings;

Fig. 5 is a wiring diagram illustrating modifications applicable to the system of Fig. 2 and to certain other of the systems where there are a plurality of generators at a given generating station;

Figs. 6–8 are wiring diagrams illustrating modifications of a circuit component of the computing means which may be used in a number of the modifications of the invention;

Figs. 8A and 9 are graphs explanatory of the operation of the wiring diagrams of Figs. 8 and 10;

Fig. 10 is a wiring diagram of a further modification of one of the circuit components;

Fig. 11 is a wiring diagram illustrating a still further modification of the invention;

Fig. 12 is a wiring diagram schematically illustrating one form of a sensitive high-impedance detector which may be used;

Fig. 13 illustrates the manner in which Figs. 13A and 13B are to be combined;

Figs. 13A and 13B comprise a single wiring diagram of a still further modification of the invention;

Fig. 14 is a simplified wiring diagram of a fractional part of the system of Figs. 16A–16C;

Fig. 15 illustrates the manner in which Figs. 16A–16C are to be combined together; and Figs. 16A–16C form a wiring diagram of yet another modification of the invention.

Referring to the drawings, the invention in one form has been shown in Fig. 1 as applied to a relatively simple power generating and distributing system including but three power sources shown as generators 1, 2 and 3 respectively supplying power by way of conductors 13, 14 and 15 to their respective station busses 16, 17 and 18. The station busses are interconnected by power transmission lines 19–24 for the supply of power to loads, the load centers of which have been indicated by the small circles encircling each load center L. It is to be understood that each generator and associated bus may also have local loads, two load centers being illustrated for the bus 16.

As will be later explained, the area A, comprising the power sources and the transmission lines interconnecting the station busses, may be interconnected by way of tielines, not shown in Fig. 1, with other areas, with exchange of power between them. It is to be further understood that the respective generators 1, 2 and 3 may be located in one or in different power stations and there may be more than one generator in each power station. The effort in Fig. 1 has been to simplify the system as much as possible to make easier a full and complete understanding of the basic principles underlying the invention and the manner in which they have been utilized in providing new methods and systems of controlling the load on the several power sources to produce delivery of power at the load centers at a minimum total cost.

An inspection of area A will reveal that power supplied to the load centers connected to the transmission lines 22–24 may come from any one or all of generators 1–3. If certain assumptions are made (which will later be referred to), the total system transmission loss can be expressed by the following equation:

$$P_L=\Sigma_m\Sigma_n P_m B_{mn} P_n \qquad (1)$$

where $P_L$=total transmission loss
$P_m$=power of source "$m$"
$P_n$=power of source "$n$"
$B_{mn}$ are constants to be determined; they are dependent on the transmission network (and other factors later to be mentioned)
$B_{mn}=B_{nm}$ To the mathematician, Equation 1 states that the total transmission loss includes a double summation involving only the electrical power outputs of the sources $P_m$ and $P_n$ and the constants $B_{mn}$. If the system has ten sources, the $m$ index assumes all values of whole numbers from 1 to 10 and the $n$ index likewise will assume all values of whole numbers from 1 to 10.

The transmission loss equation for the system of Fig. 1 having but three power sources would be written $$P_L=B_{11}P_1^2+B_{22}P_2^2+B_{33}P_3^2+2B_{12}P_1P_2+2B_{13}P_1P_3+2B_{23}P_2P_3 \quad (2)$$

For the general case for an N-number of power sources, the equation is as follows:

$$P_L=B_{11}P_1^2+B_{22}P_2^2+\dots+B_{NN}P_N^2+2B_{12}P_1P_2+2B_{13}P_1P_3+\dots+2B_{(N-1)(N)}P_{(N-1)}P_N \quad (3)$$

In accordance with the present invention, use is made of the foregoing equations in conjunction with further mathematical operations upon them to determine the changes in transmission loss which will occur with changes of power generation of the respective sources. With such changes in transmission loss ascertained and the cost of generation known, most efficient operation can be achieved by distributing the generation among the several sources for minimum incremental cost of delivered power to the load centers.

The effect of transmission loss on the power sources or generators 1 and 2 may be illustrated as follows. It will be assumed that an increase in generation at generator 1 may be accomplished at an incremental rate of 3 mills per kilowatt hour with an attendant incremental transmission loss of 20%, and it will be further assumed that the incremental rate at power source 2 will be 2.5 mills per kilowatt hour and with an incremental transmission loss of 50%. Consequently, the net incremental cost will be 3.75 mills for power source 1, and 5 mills for power source 2. (See Equation (12), column 9, lines 21–25, column 12, lines 38–50.)

From the foregoing it will be seen that the incremental cost of generation and the incremental transmission loss mean respectively the cost of the incremental unit change of generation which is next to take place and the incremental unit change in transmission loss with said unit change of generation.

The foregoing states that the important factor is the rate of change, i. e., the slopes of the curves representing the respective variables, or mathematically, the first derivative of the applicable equations.

Referring again to Equations 1, 2 and 3, consideration in the past has been given to the determination of the incremental transmission loss of a particular source by differentiating with respect to the power of a particular source with all other sources held constant, i. e., using partial derivatives. I have found that system conditions over a wider range of variables can be taken into account by a set of incremental transmission loss equations of the following type. (A full discussion of these equations will appear toward the end of this specification.)

$$\frac{\partial P_L}{\partial P_1}=2B_{11}P_1+2B_{12}P_2+2B_{13}P_3+B_{10} \quad (4)$$

$$\frac{\partial P_L}{\partial P_2}=2B_{21}P_1+2B_{22}P_2+2B_{23}P_3+B_{20} \quad (5)$$

$$\frac{\partial P_L}{\partial P_3}=2B_{31}P_1+2B_{32}P_2+2B_{33}P_3+B_{30} \quad (6)$$

where $B_{mn}\neq B_{nm}$.

An examination of each of the foregoing Equations 4 to 6 reveals that the incremental transmission loss for each of the power sources $P_1$–$P_3$ is expressed as a ratio, i. e., non-dimensional, rather than in kilowatts. It is also important to observe that if the incremental transmission losses are found to be 0.2, by way of example, for the power source $P_1$, it does not means that under the particular loading conditions 20% of the power is lost in transmission. It does means, however, that 20% of the next incremental unit of power generated and transmitted to the load will be lost in transmission; and it also means that 20% of the preceding like incremental unit of power was lost in transmission. The foregoing illustrates the meaning of incremental transmission loss and suggests that it may rise fairly rapidly with increased power output. Though the total transmission losses for a given level of power output may be only 5% or 6%, yet the incremental transmission loss for that given level may be much greater than 20%.

Further inspection of Equations 4 to 6 will make apparent the fact that the first term on the righ-hand side of each equation includes the generation $P_1$; the second term of each equation has in common the power generation $P_2$; and the third term has in common the power generation $P_3$. The right-hand side of each equation, besides including power generation, $P_1$, $P_2$ and $P_3$, includes only the "B" constants.

In accordance with the present invention there is provided a computer network 25, in matrix form, where the resistances of resistors are selected to represent the "B" constants. In network 25, *m* is the row index and *n* is the column index. For example, the resistor $R_{11}$ is shown in the first row and in the first column; $R_{21}$ is in the second row and first column, and $R_{31}$ is in the third row and first column. Similarly, in the second column there appear, in the first, second and third rows, resistors $R_{12}$, $R_{22}$ and $R_{32}$, and in the third column there are provided resistors $R_{13}$, $R_{23}$ and $R_{33}$. The value of each resistor is selected to be representative of each coefficient associated with the respective power outputs $P_1$–$P_3$, the resistors having the same subscripts as the coefficients of Equations 4 to 6. Each column also includes ballast resistors $R_{01}$, $R_{02}$ and $R_{03}$ respectively, which, though not entering into the solution of the equations, are included for linearity and for calibrating purposes.

For the first column there is provided an adjustable source of voltage 26, shown as formed by a slidewire 27 energized from any suitable source as indicated by supply terminals 28 connected as indicated by the symbol to alternating-current supply lines. Hereinafter, the symbol ~ will be used in all cases without repeating the reference character 28.

The movable contact 27*a* is adjusted in accordance with the power generation of source 1, as by an instrument 29. The power-measuring instrument 29 may comprise any suitable type of wattmeter. For convenience, measuring instruments of conventional design have been shown by generally like symbols.

The voltage $e_1$ applied to the series-connected resistors in the first column has a magnitude representative of the power output or level of generation at source 1. Similarly, the voltages $e_2$ and $e_3$ respectively applied to the series-connected resistors in the second and third columns are adjusted, as by instruments 30 and 31, in accordance with the respective levels of power generation at sources 2 and 3. Suitable slidewires 32 and 33 connected to the same source of alternating current produce voltages $e_2$ and $e_3$.

The potential difference or voltage appearing across resistor $R_{11}$ will be proportional to the product of the value of that resistor and the magnitude of the current flowing through it. As will appear, the voltage $e_{11}$ will thus have a value representative of the product from Equation 4 of $2B_{11}P_1$. The voltage $e_{12}$ has a value representative of the second term of the same equation, namely $2B_{12}P_2$, and the voltage $e_{13}$ is representative of the value of the third term $2B_{13}P_3$.

The product defined by the first term on the right-hand side of Equation 4 is representative of the component of incremental transmission loss for source 1 due to the level of generation at source 1. That product determines the magnitude of the voltage $e_{11}$. The component of the incremental transmission loss for source 1 due to the level of generation of source 2 is represented by $e_{12}$, the product defined by the second term on the right-hand side of Equation 4. The component of the incremental transmission loss for the source 1 due to the level of generation at the source 3 is represented by $e_{13}$, a product defined by the third term of the right-hand side of Equation 4.

The resistors in the computer network 25 which provide the products in each of Equations 4 to 6 representative of the component of incremental transmission loss for a given source by the level of generation at that source represent what may be termed "self-constants." The remaining "B" constants of Equations 4 to 6 included in the products thereof may be termed "mutual-constants." The self-constants ($R_{11}$, $R_{22}$ and $R_{33}$) will, in general, be larger than the mutual-constants. As will later be more fully explained, some or all of the mutual B-constants may have negative values.

In network 25 there are provided summing circuits, one for each source, and respectively including isolating transformers. For the mutual B-constants of positive sign, the secondary windings of each isolating transformer will be connected in each summing circuit with the same phase of the output voltages therefrom as from the self-product transformers. Where a mutual B-constant is of negative sign, the secondary winding of the transformer will be reversed relative to the connection from the secondary winding from the self-products, i. e., those including $R_{11}$, $R_{22}$ and $R_{33}$ to provide a voltage of opposite phase. The summing circuit for the voltages $e_{11}$, $e_{12}$ and $e_{13}$ (Equation 4) includes self-transformer $T_{11}$ and mutual-transformers $T_{12}$ and $T_{13}$. Included in that summing circuit is a transformer $B_{10}$ which modifies the algebraic sum of said voltages by an amount corresponding with the value of the constant $B_{10}$ of Equation 4, both as to magnitude and sign. Accordingly, the resultant voltage will be equal to the incremental transmission loss for power source $P_1$ as expressed by $$\frac{\partial P_L}{\partial P_1}$$

that voltage appearing near the output of the computer network 25 as indicated by the voltage arrows.

If desired, the incremental transmission loss for source 1 may be indicated on a suitable scale of an indicating and recording instrument as well as recorded on a record chart 34 by a pen-index. The detector 36, through mechanical connection 39, serves also to adjust the movable contact of a slidewire 37 energized from a suitable source of current and connected in the summing-circuit branch of the computer network of row 1 for introduction of a voltage opposed to that representative of the incremental transmission loss. If a difference voltage appears at detector 36, the latter relatively adjusts the contact and the slidewire 37 to reduce the difference to zero. The detector 36 will preferably be of the high-impedance electronic type, such as disclosed in Williams Patents Nos. 2,113,164 and 2,367,746, or as shown in Fig. 12 hereof and which will be later described.

Similar summing circuits for each of the second and third rows of the computing network provide output signals or voltages which are solutions of Equations 5 and 6. These circuits include transformers $B_{20}$ and $B_{30}$. Their summing circuits provide outputs representative of the incremental transmission losses of the respective power sources 2 and 3.

For the second and third rows, the detector and the balancing slidewire are shown in block diagram as controls 40 and 41 which function in the same manner as described for the first row for indicating and recording, as on recorder charts 44 and 45, the aforesaid incremental transmission losses for power sources $P_2$ and $P_3$.

In the control of power generation it is frequently desirable to know the total transmission loss involved, and a computing network 48 provides such an indication on an indicator-recorder 49 which also includes a schematic representation of the chart-driving motor **49*a***. It will be understood that each indicator-recorder will be provided with such a chart-driving motor and other associated equipment as shown in said Williams Patent No. 2,113,164.

In order to obtain the total transmission loss the computer network 48 has slidewires 50, 51 and 52 respectively adjusted by detector 36 and by controls 40 and 41 in accordance with the incremental transmission loss for the respective sources.

Associated with the slidewire 50 is a second slidewire 53 connected across the alternating-current source of supply 23 with its associated contact adjusted, as by the instrument or wattmeter 29, so that the voltage $e_4$ developed across conductors 54 and 55 is representative of the level of power generation of source $P_1$. The voltage $e_4$ is applied to the respective ends of the slidewire 50. Accordingly, the voltage between conductors 56 and 57 is representative of one-half of the product of the power of source $P_1$ and the incremental transmission loss of $P_1$. It is to be understood that slidewires 51 and 52 are similarly associated with slidewires corresponding with 53 and respectively adjusted by wattmeters 30 and 31 for introducing into the computer network similar products.

Mathematically, the computer network 48 provides the following:

$$\left.\begin{array}{l}\text{Total Trans-}\\ \text{mission Loss}\end{array}\right\} = \tfrac{1}{2}\left[\left(P_1\frac{\partial P_L}{\partial P_1}\right)+\left(P_2\frac{\partial P_L}{\partial P_2}\right)+P_3\frac{\partial P_L}{\partial P_3}\right] \quad (7)$$

Thus, the computer network 48 is a summing circuit which develops across conductors 56 and 59 a voltage proportional to the total transmission loss. This voltage, by means of a detector 60 operating slidewire contact **61*a* of slidewire 61, controls the magnitude of an opposing voltage which balances the network with adjustment of a pen-index 62 of the recorder 49** to indicate and record the total transmission loss.

Now that there has been described the manner in which both incremental transmission loss and total transmission loss may be ascertained, attention will be directed to that part of the system for producing signals or voltages representative of the incremental cost of power generation.

Mathematically, it can be shown that the relation between fuel input and generator output of generator G in station *m* can be expressed by the following relationship:

$$I_{Gm}=\text{Input}=a+bP_{Gm}+cP_{Gm}^2 \quad (8)$$

where input is expressed as $10^6$ B. t. u. per hour, $P_{Gm}$=K. W. output for generator G in station *m*; and *a*, *b* and *c* are constants.

The foregoing may be converted to incremental input by differentiating, viz:

$$\frac{dI_{Gm}}{dP_{Gm}}=b+2cP_{Gm} \quad (9)$$

To convert the above equation to incremental cost, it will be assumed that the cost of fuel per million B. t. u. is *f*. Accordingly, $$\frac{d(fI_{Gm})}{dP_{Gm}}=\frac{dF_{Gm}}{dP_{Gm}}=(b+2cP_{Gm})f \quad (10)$$

A computing network 63 solves Equation 10 for power source 1 in the following manner: The power generation $P_1$, as by means of the wattmeter instrument 29, adjusts slidewire contact **64*a* relative to slidewire 64 energized from the alternating-current source to apply to opposite ends of a voltage-divider or slidewire 65 a voltage having a magnitude varying with change in level of generation of source 1. Thus, the voltage $e_5$ varies as the term $2cfP_1$, Equation 10, where slidewire contact 65*a* is set on slidewire 65 in accordance with the value of the constant $2cf$ for source 1. A third slidewire 66 energized from the alternating-current source has its contact 66*a* set with respect thereto in accordance with the value of the product of the constants $b$ and $f$. It has been found that both contacts 65a and 66a may be operated by a single knob 67 when the cost of fuel $f$ changes. This performs the multiplication by the factor "$f$." With contacts 65a and 66a in their voltage-maximum positions, the circuit components will have values corresponding with a base reference of fuel cost, say 50¢ per million B. t. u.'s, the maximum to be encountered. Thus, in the network there is developed between conductors 68 and 69** an output voltage having a magnitude representative of $$\frac{dF_1}{dP_1}=(b_1+2c_1P_1)f \qquad (11)$$

Between the computing networks 25 and 63 there is provided a further computing network 70 for the following purposes. As can be shown mathematically, the incremental cost of power delivered to the load by a power generator G in station "$m$," which is defined as $\lambda$ (lambda), may be expressed as follows:

$$\lambda_{Gm}=\frac{\dfrac{dF_{Gm}}{dP_{Gm}}}{1-\dfrac{\partial P_L}{\partial P_m}} \qquad (12)$$

In Fig. 1 the value of "unity" is inserted in computing network 70 by the transformer $T_1$ energized from a suitable alternating-current source of supply, as by way of a voltage-adjusting rheostat 71. From the "unity" voltage introduced into computing network 70 by transformer $T_1$ may be subtracted the voltage labeled $$\frac{\partial P_L}{\partial P_1}$$

of computer network 25, but as shown, a second voltage $e_6$ proportional to that representing the incremental transmission loss for source 1 is developed by adjustment of slidewire contact 75a of slidewire 75 energized from a suitable source of alternating current. The contact 75a is positioned with reference to slidewire 75 by the detector 36 and the mechanical driving connection 39.

The difference, $e_{10}$, between the voltages respectively representative of unity and $e_6$ is applied across the ends of a slidewire 76. By means of a detector 77 the slidewire contact 76a is adjusted to a value where the voltage between it and conductor 68 is equal to that developed by the computing network 63 as between conductors 68 and 69. By determining the ratio of the voltage between conductors 68 and 69

$$\left(\frac{dF_{Gm}}{dP_{Gm}}\right)$$

with respect to the voltage across the respective ends of slidewire 76

$$\left(1-\frac{\partial P_L}{\partial P_m}\right)$$

the division called for by Equation 12 is performed and the position of contact 76a on slidewire 76 will be proportional to the incremental cost of power delivered to the load, i. e., $\lambda_{Gm}$.

Since only one generator has been shown for each of the three stations, $\lambda_1$ may be accepted as the designation for the incremental cost of power delivered to the load by power source 1. Accordingly, detector 77 may function not only to adjust slidewire contact 76a, but also to adjust a pen-index 78 of a recorder 79 to record the incremental cost of power delivered to the load by source 1. Only the computing networks 63 and 70 for power source 1 have been shown in Fig. 1. Additional computing networks are provided for each of the power sources 2 and 3 which include detectors for relatively adjusting pen-indexes 80 and 82 for recorders 81 and 83. The respective detectors (including detector 77) relatively adjust slidewire contacts 84a, 85a and 86a and their slidewires 84, 85 and 86 for producing in a comparison network 87 voltages respectively representative of incremental cost of power delivered to the loads by the respective sources.

The voltage $e_7$ developed in the network 87 is representative of the incremental cost of power delivered to the load by source 1. The voltages $e_8$ and $e_9$ are respectively representative of the cost of delivered power from the respective sources 2 and 3. By connecting a detector 88 between slidewire contacts 84a and 85a and comprising a transformer $T_{88}$ and an amplifier 88a, relay 89 may be operated from a mid-position in one direction or the other depending upon the direction of the difference in magnitude between voltages $e_7$ and $e_8$ and depending upon whether voltage $e_8$ is greater or less than voltage $e_7$. Similarly, a detector 90 connected between slidewire contacts 84a and 86a and respectively comprising transformer $T_{90}$ and amplifier 90a serves to energize a relay coil 91 for operation of its contacts from a mid-position in one direction or the other depending upon whether the voltage $e_9$ is greater or less than the voltage $e_7$. Thus, the comparison circuit 87 utilizes the incremental cost of delivered power from source 1 as a reference and compares with it the incremental costs of power delivered respectively from the sources 2 and 3.

It will now be assumed that for a given level of generation the incremental costs of delivered power are equal ($e_7=e_8=e_9$) and that a load change then occurs on the power system. An increase of load requires increased generation from one or more of the power sources. An increase of load appears to the power sources as though the impedance of the lines to which they are connected has decreased. An increase in connected load without an increase of steam to the prime mover, in the case of a steam turbine, will cause a decrease in speed of the prime mover. Any decrease in the speed of a generator, however, slightly lowers the frequency of the system as a whole, and this may be detected by a frequency meter 95 which can be connected to any point on the system, but which for convenience is shown connected in the conductor 13 symbolically representative of a 3-phase system. The frequency meter 95, upon an increase in load, adjusts a contact 96 to the right of its illustrated mid-position to produce electrical pulses of variable length during the time that the conducting portion 97a of a pulse-producing commutator 97 is in engagement with contact 96. The contact 96 is connected through an alternating-current source 28 to ground, and the "raise" pulses pass by way of conductor 99, a single-pole, double-throw switch 100, lower stationary contact to a second single-pole, double-throw switch 101, and by way of the lower contact thereof to a "raise" relay 102 which is energized once for each pulse and for a time interval corresponding to the length of the pulse. The closure of the contact of relay 102 completes an energizing circuit for the governor control diagrammatically shown as including a motor 103 having forward and reverse windings 103a and 103b and which through a traveling nut 104 on threaded shaft 105 adjusts a spring 106 of governor 93 in a direction to cause the valve 94 to be moved toward open position for a predetermined speed of operation of governor 93. The normal speed of operation will be that which produces the desired frequency, usually selected as 60 cycles per second.

As soon as source 1 increases its generation, the wattmeter 29 responds to the new level of generation and produces adjustment of slidewire contacts 27a, 54a and 64a. Detector 77 immediately responds and adjusts contact 84a in a direction to increase the value of voltage $e_7$. With voltage $e_7$ greater than $e_8$, detector 88 energizes coil 89 to close its contact 89a for the energization of operating coil 100a of switch 100 to transfer the raise pulses from commutator 97 from the generation control for source 1 to the generation control 107 of source 2. Thus, the raise pulses will then be applied to the operating coil 108, corresponding for generation control 107 with operating coil 102 of the generation control for source 1. Through a mechanical connection 109, the governor for source 2 will be adjusted, as through the governor control 110, to increase the steam flow to the turbine.

It may here be observed that with $e_7$ greater than $e_8$, that voltage $e_7$ will also be greater than $e_9$. However, the resultant energization of coil 91 by detector 90 to close contacts **91*a* with energization of coil 101*a* for operation of switch 101 will be ineffective to transfer raise pulses to a coil 111 of generation control 112 for source 3 for the reason that switch 100 in moving to complete the circuit through its upper stationary contact interrupts the circuit to coil 111**.

As the generation of source 2 is increased, the wattmeter 30 adjusts slidewire contact **32*a* and through a mechanical connection, not shown, adjusts a slidewire in a computing network corresponding with network 63 for eventual adjustment of contact 85*a* in comparison network 87**.

When $e_8$ equals $e_7$ relay 89 returns to its neutral or illustrated mid-position and coil **100*a* is deenergized for return of switch 100 to complete the pulse circuit from conductor 99 to switch 101. This switch, it will be recalled, is in the energized position and therefore completes a circuit through its upper stationary contact for coil 111, thus to route the raise pulses to that coil for operation of the generation control 112 and the governor control 113 to increase the generation of source 3**.

The foregoing connections are maintained until through the operation of wattmeter 31 and the resultant adjustment of slidewire contacts **33*a* and 86*a* the voltage $e_9$ is made equal to the voltage $e_7$. When the foregoing occurs it may be further assumed that the total load change has now been taken care of by the total change in generation of sources 1–3. Consequently the frequency meter 95 will have returned the contact 96 to its mid-position where it is continuously in contact with the insulated segment 97*b* of commutator 97 without production of either raise pulses, as by segment 97*a*, and without production of lower pulses, as by conducting segment 97*c*. As shown, the commutator 97 is driven by any suitable means as by a motor 98**.

From the foregoing, it will be seen that the system as a whole functions in response to any change in load to change the level of generation of the respective sources 1–3 to maintain equal the incremental costs of delivered power as represented by voltages $e_7$–$e_9$. By thus maintaining equal the incremental costs of power delivered, the most economical operation is achieved. Stated differently, if the incremental cost of power delivered for source 2 be less than for source 1, the system will not be operating most efficiently. In fact, if there be any difference between the incremental costs of delivered power as between the several sources, it is apparent that savings will be effected by a redistribution of power generation for increased generation from the source then operating at the lesser cost of delivered power. The foregoing, however, does not obtain if there be equality of the several incremental costs of delivered power. With such an equality existing, no change of level of generation of any source will produce a lower total cost of delivered power. Stated in terms of Equation 12, so long as $$\lambda_1 = \lambda_2 = \lambda_3 \ldots = \lambda_N \qquad (13)$$

there will be achieved minimum cost of power delivered to the load. One mathematical proof of Equation 13 will be found in an A. I. E. E. Technical Paper 52—112 of January 1952 entitled "Evaluation of Methods of Coordinating Incremental Fuel Costs and Incremental Transmission Losses," by Kirchmayer and Stagg. Another mathematical proof is also known. The system of Fig. 1 functions automatically to maintain the relationship of Equation 13.

Returning again to the assumption of a change in load on the power system, it will now be assumed that the load decreases. The frequency meter 95 will move contact 96 to the left to initiate the flow of "lower" impulses by way of the left-hand contact and conductor 114, single-pole, double-throw switch 115, single-pole, double-throw switch 116 to relay 117, which will periodically close in accordance with the lower impulses to operate motor 103 in a reverse direction to change the setting of the bias-spring 106 of governor 93 for decreased opening of steam throttle valve 94 of turbine 92. A decrease in generation of source 1 will be reflected by wattmeter 29 with a change in positioning of slidewire contacts **27*a*, 54*a* and 64*a*. As soon as $e_7$ is decreased below $e_8$, detector 88 will energize relay coil 89 to close its contacts 89*b* for energization of coil 115*a* of switch 115 for transfer of the lower pulses of conductor 114 to relay 118 of generator-control 107 for operation of governor control 110 in direction to move the throttle valve of the turbine drive for generator source 2** toward closed position.

When $e_8$ equale $e_7$ relay 89 will return to its illustrated position.

Since $e_7$ has been decreased, $e_9$ will be greater and will have functioned through detector 90 to energize relay 91 for closure of its contacts **91*b* and for energization of coil 116*a* of switch 116 so that upon return of relay 89 to its illustrated position with deenergization of coil 115*a*, the "lower" impulses flowing by way of conductor 114 will be routed by switch 115 through switch 116 (in its energized position) to a "lower" relay 119 of generation control 112. The latter functions through governor control 113 to move the throttle valve of generator source 3** toward closed position.

From the foregoing, it will be seen that the system will function quite well, indeed, to maintain equal lambdas, the requirements of Equation 13, regardless of the requirements imposed by load changes. Equation 12 for λ may be illustrated by numerical values. If the incremental fuel cost be 3 mills and the incremental transmission losses 20%, then only 80% of the power generated will be delivered to the load centers. This explains the reason for the form of the denominator of Equation 12. Accordingly, the cost of power delivered will be equal to 3 mills divided by 80%, which means that the incremental cost of delivered power will be 3.75 mills per kilowatt-hour.

From the foregoing, it will be seen that a solution alone of the denominator of Equation 12 is quite useful in providing the percent of the incremental power generation delivered to the load. An indicator-recorder may be conveniently embodied in the system continuously to indicate and record the denominator, i. e., one minus the incremental transmission loss, such a recorder being illustrated at 120 and including a detector 121, a pen-index 122 associated with a scale 123 and a chart 124. The detector is connected to respond to the voltage $e_{10}$ and a balancing voltage developed by slidewire 125, the contact of which is adjusted by the detector 121. There will, of course, be provided a corresponding recorder and associated apparatus for each of the power sources 2 and 3. Thus, incremental transmission loss will be recorded on charts 34, 44 and 45; the quantity one minus such incremental transmission losses will be recorded on three recorders, only one, the recorder 120, being shown; and on recorders 79, 81 and 83, there will be recorded the incremental costs of power delivered to the load from the respective sources.

By following the information provided by the several recorders, at least a part of the method may be manually performed. For example, an operator would need only to observe recorders 78, 81 and 83 and manually adjust the governor controls for the respective sources to maintain equal the readings of these "lambda" recorders in order to assure the most economical cost of delivered power. Only one indicator or recorder would be essential with switching thereof in succession in the respective circuits where recorders 79, 81 and 83 appear. The manual control of generation could, of course, be through communication channels and would eliminate the need for the detectors 88 and 90 and the associated routing system. For manual operation, it is assumed that there will be retained in the system the frequency meter 95 and the pulse-producing commutator 97, the function of the operator being merely manually to route the pulses to their respective sources as the readings of recorders 79, 81 and 83 dictate, i. e., to maintain equal $\lambda$ readings thereon. The operator might regulate the generation controls at the level of the motor-controlling relays 102 and 117 by correlating the readings of the foregoing recorders and that of the frequency meter 95. For example, when the frequency is low he would raise the generation of the generator having the lowest $\lambda$ reading on one of recorders 79, 81 and 83, and when the frequency is high, he would decrease the generation for the generator showing the highest $\lambda$ on one of said recorders.

Whether the automatic system of Fig. 1 be utilized, or the semi-automatic system just described be available, there is adequate flexibility to take care of rapidly changing cost conditions. One of these already mentioned has been the availability on a temporary basis of excess fuel gas. By merely operating the knob 67 compensation will be made for any change in cost of fuel.

When a generator is hydraulically driven, and there is limited water supply which is to be conserved over a period of time, an arbitrary "fuel-cost" value may be assigned to that particular hydro-generator. By setting the knob 67 to a predetermined position, the contacts 66*a* and 65*a* will introduce voltages in accordance with Equation 10 to produce a change in the $\lambda$ indication on the corresponding one of recorders 79, 81 and 83, and thus to change the routing of pulses in accordance with the computed value of said $\lambda$ as compared with the lambda of the reference unit.

If the arbitrary "fuel-cost" of the hydro-unit be made higher than for the steam units, the generation or power output of the steam units will be higher than for the hydro-unit unless their incremental transmission losses produce control signals which show more economical operations by increasing the power output of the hydro-unit. The setting of the knob 67 for the hydro-unit may be in accordance with predetermined calibrations relating the arbitrary "fuel-costs" to rate of water consumption for given loadings of the system. For example, during the springtime when there is normally a heavy flow of water due to the accumulation of the winter snows and the heavy rainfall which occurs in the spring, the arbitrary "fuel-cost" will be set at a very low value so that the hydro-unit is favored to absorb load changes. At times of heavy flow it will be desirable to operate the hydro-units at full load and as early summer arrives, to bring in reduced loadings, as by arbitrary settings of the "fuel-cost" knob 67. For full-load operation, the units will not be disconnected from the control system of Fig. 1. The knob 67 will merely be set for zero fuel cost. When the generator reaches a value of generation corresponding to full load, limit switches will be operated, as for example, from wattmeter 29 to open the circuit to the operating coil of the raise relay 102.

Emphasis has been made of changes in fuel cost, because fuel cost is one of the principal items to be taken into account in the generation of power. It is the factor of greatest variability.

The arbitrary "fuel-cost" value can be selected for a given water-consumption over a selected period, say a week. The computing networks establish in terms of Equation 12 the load to be carried by the hydro-unit for most economical operation of the system as a whole. As the system load varies, the power output of the hydro-unit will be changed. It will be maximum when its incremental transmission losses are sufficiently low as to offset its arbitrarily assigned high "fuel-cost." Thus a maximum saving in fuel on the steam units will be attained by using available water for the hydro-unit at the optimum time.

The system of Fig. 2, though retaining some of the basic concepts and generically the same computer systems, substantively differs from Fig. 1. More particularly, in Fig. 1 the end result of the computing systems provides on recorders 79, 81 and 83 indication of $\lambda$-values for the several power sources, and combined with them are the control features by means of which load changes can be distributed among the power sources, while maintaining equal the several lambdas, i. e., the incremental costs of power delivered to the load. In Fig. 2 there are retained the computing networks and there are retained control features by means of which equality is maintained in the lambdas with change in generation. In Fig. 2, however, the end result of the computing networks provides indications of power changes to be made at the respective power sources to meet the changed load with equality of the lambdas, i. e., equality of the incremental costs of delivered power.

Referring more particularly to Fig. 2, corresponding parts in it and the remaining figures having generally like functions have been given the same reference characters as in Fig. 1. Thus, the several resistors and transformers in the computing network 25 are the same as in Fig. 1. However, the slidewires 131, 132 and 133 at the head of each of the columns have their respective contacts adjusted in response to "desired generation," rather than in response to "actual generation" as in Fig. 1. While this will later be explained in detail, it is here to be noted that the output voltages across each summing circuit are respectively equal to one minus incremental transmission losses for the sources 1, 2 and 3 at the given levels of generation determined by the setting of contacts 131*a*–133*a*.

By inserting, respectively in series with the aforesaid output voltages, voltages of suitable values, as by transformers $T_4$–$T_6$, there are produced across the respective ends of slidewires 134–136 voltages varying in accordance with the quantity: one minus the respective incremental transmission losses.

In Fig. 1 the voltages representative of unity were described in connection with the provision of transformer $T_1$ as a part of the overall computing means. In Fig. 1 there were also provided the transformers $B_{10}$, $B_{20}$ and $B_{30}$, these being included in the summing circuits. In Fig. 2 the transformers $T_4$–$T_6$ perform the functions of the transformers of Fig. 1 in the summing circuits, as well as the functions of the "unity" transformers, one of which, the transformer $T_1$, is shown in Fig. 1. More particularly, transformers $T_4$, $T_5$ and $T_6$ insert in the respective summing circuits voltages representative of the quantities unity minus $B_{10}$; unity minus $B_{20}$; and unity minus $B_{30}$.

The respective slidewires 134–136 may be conveniently referred to as equal $\lambda$ multipliers. This phrase is particularly apt since it will be observed that the respective contacts for such slidewires are simultaneously operated by a detector 138 from a common mechanical connection as indicated by the broken line 137.

There will now be explained the manner in which there are achieved the required changes in generation at the respective sources to meet a changed load with equality of the lambdas for the various sources maintained. The voltages applied to the respective ends of slidewires 134–136 are respectively equal to the denominator of Equation 12, one for each power source, which it will be remembered, reads as follows:

$$\lambda_{Gm}=\frac{\dfrac{dF_{Gm}}{dP_{Gm}}}{1-\dfrac{\partial P_L}{\partial P_m}} \qquad (12)$$

It will be recalled that the numerator of the foregoing equation is set for by Equation $$\frac{dF_{Gm}}{dP_{Gm}}=(b+2cP_{Gm})f \qquad (10)$$

For the system of Fig. 2 the right-hand side of Equation 10 will be substituted in Equation 12 for the numerator thereof, and rearranging the equation, there is obtained:

$$\lambda_{Gm}\left(1-\frac{\partial P_L}{\partial P_m}\right)=(b+2cP_{Gm})f \qquad (14)$$

If now, $2cf=C_{Gm}$ and $$\frac{b}{2c}=K_{Gm}$$

Equation 14 with these substitutions and with the solution thereof for $P_{Gm}$ may be written as follows:

$$P_{Gm}=\frac{\lambda}{C_{Gm}}\left(1-\frac{\partial P_L}{\partial P_m}\right)-K_{Gm} \qquad (15)$$

The implications of Equation 15 in terms of Fig. 2 are as follows: For minimum cost of power delivered to the load, the lambdas are to be maintained equal. Accordingly, the equal λ multiplier 140 simultaneously changes by equal amounts the lambdas which are respectively introduced for the several sources. The system of Fig. 2 then solves Equation 15 and changes the generation $P_m$ of each of the sources "*m*" by amounts and in directions corresponding with the aforesaid equal changes in the several lambdas. Accordingly, the required generation to meet any load changes on the system is achieved in Fig. 2 with a minimum cost of total delivered power.

The term of Equation 15 in parentheses has already been described as represented by voltage outputs of the computing network 25 subtracted from the unity voltages introduced by transformers $T_4$–$T_6$. The resultant voltages are applied to the respective ends of slidewires 134–136. Voltages taken from said slidewires representing a multiplication by λ are applied to the primary windings of transformers $T_7$–$T_9$. In this connection, it is to be observed that the voltage between each movable contact and one side of each of slidewires 134–136 is a variable fraction of the voltage developed across the entire slidewire. Thus, the derived voltages may be considered as products.

Viewing the circuit in terms of Equation 12, the control voltages applied to the primary windings of transformers $T_7$–$T_9$ are representative of like values of lambda multiplied by the respective denominators of Equation 12, the resulting control voltages then varying in accordance with $$\frac{F_{Gm}}{P_{Gm}}$$

i. e., the incremental cost of generation.

By connecting across the respective secondaries of transformers $T_7$–$T_9$ pairs of series-connected resistors 141—142, 143—144, 145—146, and taking output voltages from intermediate points of one of the resistors of each pair, there is accomplished a division by $C_{Gm}$ as indicated in Equation 15. For example, the output voltage from transformer $T_7$ is applied across the remote ends of resistors 141 and 142. Resistor 141 is connected in series with resistor 142 by way of a switch 148. The output voltage between conductors 147 and 149 is a fraction of the voltage applied across said resistors. With a change in cost of fuel, or other factors, the switch 148 may be moved from its uppermost position to a lower position to change the amount of the resistor 142 included in the circuit. For further adjustments, the respective stationary contacts of switch 148 are shown respectively adjustable along the length of resistor 142.

The constant $K_{Gm}$ of Equation 15 is represented by a voltage inserted in the line including conductor 147, as by a transformer 150, and is of such relative phase as to be subtractive with respect to the voltage appearing between conductors 147 and 149. Accordingly, the output voltage $e_{153}$ between or across conductors 149 and 151 varies in the same manner that the desired generation for the source 1 must vary in order that the incremental cost of power delivered to load therefrom shall be equal to the incremental costs of power delivered to the load from sources 2 and 3. The output voltage $e_{153}$ is applied by way of conductor 151, switch contacts **154*a* and 155*a*, switch 152 and conductor 156, to a potentiometer including a slidewire 157 and to a detector 158 which adjusts slidewire contact 157*a*, with movement of a pen-index 159 of a recorder 160 to a balancing position, to indicate and record the desired generation for source 1. The return circuit from detector 158 is by way of conductor 149**.

It may here be observed that the intermediate control devices including contacts **154*a* and 155*a*** will be later described.

With the desired generation indicated upon recorder 160 (and upon corresponding "desired generation" recorders for sources 2 and 3 not shown in Fig. 2) an operator can adjust actual generation of each of the sources to correspond with the readings of such recorder to meet any load changes which may occur on the system. The manner in which such changed generation is accomplished automatically will now be described.

Returning now to a consideration of area A, there has been illustrated the frequency meter 95 connected to a station bus 18. The meter located any place on the system will indicate frequency changes on the system as a whole. Load changes cause the frequency meter 95 to respond and to adjust a slidewire contact **171*a* relative to slidewire 171 forming a part of an area requirement network 172. While the area requirement network 172 is a useful component of the modification of Fig. 2, it does not, except in combination with other component parts of Fig. 2, form any part of the present invention. I have been informed and believe that systems similar to those of network 172** have been disclosed and claimed in United States Letters Patent No. 2,688,728 filed by James B. Carolus, and entitled "Method and Arrangement for Measuring Schedule Deviations."

As shown in Fig. 2, the left-hand side of network 172 includes a slidewire 173 having a contact **173*a* set at a point representing the desired frequency to be maintained on the system as a whole and which will usually be for the commercial frequency of 60 cycles per second. The left-hand portion of the network is energized from the alternating-current source of supply through series resistors and includes in a separate branch a rheostat 174 having its contact adjustable by knob 175 to provide the desired magnitude of the output voltage $e_{15}$ for a given change of position of slidewire contact 171*a***.

The right-hand portion of network 172 includes a slidewire 176 with its contact **176*a* adjustable by a detector 177 responsive to the difference voltage between the voltages $e_{15}$ and $e_{16}$. The voltage $e_{16}$ is derived from slidewire 176 energized from source 28, there being included two equal resistors between which connection from contact 171*a* is made by way of conductor 178. The area requirement network 172 thus provides for adjustment of contact 176*a* by an amount representative of a desired change in generation. Such a change will be due to the load change on the system which produced the frequency variation as detected by the frequency meter 95**. When the changed generation is effected, the frequency will be returned to its selected value of 60 cycles per second.

More particularly, the detector 177, through mechanical connection 179, adjusts slidewire contact **180*a* of slidewire 180 and concurrently moves contact 96 of the impulse generator 97 to the right or to the left for production of "raise" and "lower" pulses. Movement of contact 180*a* unbalances the "required change-in-generation" network 181, and the detector 138 responds thereto for simultaneous operation through mechanical connection 137 of the equal-lambda-multiplier 140**.

The adjustment of the contact of slidewire 134 changes the voltage applied by transformer $T_7$ to the computing network including resistors 141 and 142. This produces a change in the output voltage therefrom which appears across conductors 149 and 151. Accordingly, detector 158 responds to that changed output voltage and not only moves the pen-index 159 of "desired generation" recorder 160 to a new position, but also through mechanical connection 182 moves contact **131*a* of slidewire 131 to a new position representative of a new level of desired generation for the power source 1. Accordingly, through the first column of the computing network 25, a current of changed value flows producing changes in the output voltages of each row thereof and representative of the incremental transmission losses at the changed level of generation of power source 1. Thus, while the changed position of the equal λ multiplier 140 initiated the foregoing operations, it will be seen that the given level of "desired generation" as provided by operation of detector 158 causes the computing network 25 to calculate the incremental transmission loss for power source 1 and to modify the output voltage $e_{153}$ appearing across conductors 149 and 151**. By like changes, incremental transmission losses are calculated for sources $P_2$ and $P_3$. Changes of the level of generation of any one source changes the incremental transmission loss of all the sources.

That output voltage $e_{153}$ appearing between conductors 149 and 151 is not only applied to detector 158, but is simultaneously applied to an additional detector 185 in series with fractional parts of slidewires 186 and 187. Both slidewires are energized from the alternating-current source of supply. Slidewire 186 has the midpoint, between resistors of equal value connected across its respective ends, connected to the movable contact **187*a* of slidewire 187. The detector 185, in response to a change in output voltage $e_{153}$, moves slidewire contact 186*a* to a circuit-balancing position, and at the same time through mechanical connection 188 relatively adjusts contact 189*a* of slidewire 189, and operates a switch-operating cam 190 in the proper direction to route generation-controlling impulses to power source 1. The movement of slidewire contact 189*a* introduces into the "required change-in-generation" network 181 a voltage in the network-balancing direction of magnitude proportional to the change in level of generation which has been calculated by the computing networks to be effected at source 1**.

It is to be remembered that corresponding operations are simultaneously taking place for the remaining sources 2 and 3 and that through similar networks, contacts **191*a* and 192*a* of slidewires 191 and 192 are moved to positions representative of changed levels in generation. With the three slidewire contacts 189*a*, 191*a* and 192*a* moved to positions in which the changes in generation equal the changed area requirement, the "required change-in-generation" network 181 will again be in balance, and the detector 138 is brought to standstill with the λ-multiplier 140 in its newly established position. Thus the network 181** can be balanced before the changed generation actually takes place.

The circuitry which has been omitted for sources 2 and 3 corresponds with that shown for source 1 and has been diagrammatically indicated in Fig. 2 by the blocks 195 and 196, the mechanical connections 197 and 198 therefrom corresponding with the mechanical connection 188 for the detector 185 associated with the control system for source 1.

It will be recalled that each of the detectors corresponding with detector 185, through the respective mechanical connections 188, 197 and 198, positions routing cams 190, 201 and 202 for the respective sources. If it now be assumed that an increased load occurred on the system, then the contact 96 of the pulse-producing commutator 97 will be moved to the right to initiate the production of raise impulses. The mechanical connections 188, 197 and 198 will move cams 190, 201 and 202 in clockwise directions to close the respective raise contacts 203–205 for simultaneous routing of raise pulses to the respective generation controls 206, 207 and 208, the latter pair being indicated in block diagram. The generator control 206 is identical with that shown in Fig. 1 and need not be again described in detail.

The fact that the raise pulses are simultaneously routed to generation controls 206–208 does not mean that equal changes in generation will take place. The purpose of the calculating networks previously described is to produce changes in level of generation to maintain each power source operating with equal incremental costs of delivered power (equal lambdas), and, in general, the changes in generation for a given load change may widely differ as between the several sources. It is unlikely that an increase in load will leave one generator unchanged in its level of generation, but such, of course, will always be the case when a given power source is operating at full load as in the earlier example given of the hydro-unit operating during periods of excess water supply.

The effect of a change in level of generation as initiated by the pulse-producing commutator 97 is reflected in changed readings of wattmeters 29–31 with adjustment thereby of the associated slidewire contacts. For example, the wattmeter 29 through mechanical connection 209 adjusts contact **187*a* in a network-balancing direction. The network referred to is that including conductors 149 and 156 across which appears the output voltage $e_{153}$, the slidewires 186 and 187, and the detector 185. It will be remembered that detector 185 produces adjustment of slidewire contact 186*a* to a position indicative of a required change in generation of source 1. As the generation of source 1 changes in the compensating direction, the network unbalance decreases, with operation of detector 185 to move contact 186*a* toward its previous position (which at network balance will be in its mid-position). When the change in actual generation as reflected by the position of slidewire contact 187*a* equals the required generation, the contact 186*a* will have been returned to its mid-position and the cam 190 to its illustrated position to interrupt transmission of raise impulses to the generation control 206. Thus, transmission or routing of raise pulses to generation control 206 for source 1 may be terminated prior to corresponding operations of cams 201 and 202 respectively associated with generation controls 207 and 208 for sources 2 and 3. As contact 186*a* is returned to its mid-position, contact 189*a* is moved to its mid-position. Meanwhile, contact 180*a* has been moved toward its mid-position due to restoration of system frequency. With system frequency reestablished, slidewire contact 180*a* will be in its mid-position and so will slidewire contacts 191*a* and 192*a***. All switches return to their illustrated positions when the total generation of the power sources meets the total area requirement at the given frequency of 60 cycles per second.

In the modifications thus far described all power sources have been illustrated as on automatic control, it being understood that there may be many more than the three which have been utilized for purposes of explaining the invention. It is not required that in all cases all power sources be on automatic control. In some instances, only one power source may be on automatic control, the remainder being under the control of the governors with manual operation of the governor-adjusting means. In the extreme case, control of the generation of all power sources may be achieved by manual adjustment of the respective governors in accordance with the changes in generation at the several stations which maintains equal incremental costs of delivered power from the several sources as determined by the computing systems.

Whether the modification of Fig. 1 or of Fig. 2 be employed with or without further features later to be explained in connection with other schematic diagrams, the end objective is to maintain equal the incremental costs of delivered power from the several sources. The systems achieve the stated objective so long as the respective power sources are operating between desired minimum and desired maximum loads.

In the modified form of the invention of Fig. 2, provisions are made so that when any power source reaches a preset maximum or minimum loading, a voltage approximately equal to the last attained value of $e_{153}$ is inserted in the network. The inserted voltage remains until the calculated generation for that particular power source again falls between said preset minimum and maximum limits.

The manner in which the foregoing is accomplished will be readily understood by considering the operation of relay 154 energized by an amplifier 161 having an input circuit, one side of which is connected to conductor 151 and the other side of which is connected by way of the movable contact of a slidewire 162 to conductor 149, the slidewire being powered from the alternating-current source of supply. It will be observed that the contact of slidewire 162 has been moved by an adjusting knob to the high-side thereof so as to introduce into the input circuit of amplifier 161 a major fraction of the voltage developed across the slidewire. The voltage from slidewire 162 which is introduced into the input circuit of the amplifier 161 is normally greater than $e_{153}$ and the resultant input to amplifier is in a direction which maintains relay 154 in its illustrated position.

Since the voltage $e_{153}$ reppresents a calculated value of generation, that voltage rises as calculated generation increases. When the generation calculated by the network attains a value equal to the value set on slidewire 162 for the source 1, the voltage $e_{153}$ equals that introduced by slidewire 162. When the voltage $e_{153}$ exceeds that introduced by slidewire 162, there is in the input of the amplifier 161 a 180° phase reversal and the relay 154 is, accordingly, energized to open its contacts **154*a* and to close its contacts 154*b*. The contacts transfer the connections from conductor 151 to the contact of slidewire 162 for insertion in the network of the voltage between said contact and conductor 149 instead of voltage $e_{153}$. This voltage determined by the position of contact of slidewire 162 represents the selected upper limit of operation of power source 1**, and thus provides in the network a selected voltage, notwithstanding the fact that the computer may function further to raise the voltage $e_{153}$ to still higher values.

By insertion of the selected fixed voltage, the system is left in a condition where the computer network is most effective in distributing generation requirements among the remaining power sources 2 and 3 for maintaining equal their incremental costs of generation of delivered power, notwithstanding such incremental costs may differ from the incremental cost of delivered power of source 1 when operating at full load.

It will be understood that corresponding relays will be provided for each of the remaining sources and that there also will be provided relays corresponding with relay 155, the operation of which, for the source 1, will now be described.

Associated with relay 155 is an amplifier 163 having in its input circuit a part of a slidewire 164 connected to the alternating-current source of supply, but with its movable contact manually set by a knob to the low-voltage end of the slidewire. The voltage inserted in the input circuit of the amplifier 163 by the fractional part of slidewire 164 is normally less than $e_{153}$. The relay 155 is deenergized or maintained in its illustrated position until $e_{153}$ is reduced to a value less than the voltage from slidewire 164. A phase reversal then occurs at the input of amplifier 163. Such phase reversal occurs when the calculated generation is reduced to a value corresponding with the selected lower limit of generation for source 1. Thereupon relay 155 is energized to open contacts **155*a* and to close contacts 155*b* to insert into the network the fractional voltage of slidewire 164. Thus, the computer network may continue to reduce the voltage $e_{153}$ to still lower values, but such lower values will not appear in the network because of the opening of contacts 155*a*. There will be maintained in the network the fractional part of the voltage across slidewire 164 until a further phase reversal occurs, as by an increase in the voltage $e_{153}$ to a value greater than that introduced by slidewire 164**.

It is worthy of mention that the inclusion of slidewires 162 and 164 together with the associated amplifiers and relays makes possible another control action sometimes useful in system operation. More particularly, if the contacts of slidewires 162 and 164 be set to the same relative positions, the generation of the associated source 1 will be maintained at a constant value. Thus, if the contacts of both slidewires are set to their mid-positions, the generation will be maintained at approximately 50% maximum generation. The generation can be maintained constant at any desired value depending upon the particular angular positions at which both slidewire contacts are set.

When it is desired to reduce to zero the generation from a source, it is only necessary to operate a single switch, one provided for each source, such as the switch 152 for the source 1. The movement of the switch 152 to its second switching position connects conductor 156 to conductor 149 to reduce to zero the voltage between said conductors. Accordingly, detector 158 will respond to move contact **157*a* to the left and toward its "zero" generation position. Similarly, detector 185 will respond to move slidewire contacts 186*a* and 189*a* toward their respective left-hand positions and in generation-decreasing directions. At the same time, the switch-operating cam 190 will close the "lower" contacts for transmittal of lower pulses to relay 117 to decrease generation of source 1. Thus, as soon as lower pulses are produced by the pulse generator 97, the generation of source 1 will begin to decrease, and this action will continue as long as pulses are produced and until the generation of source 1** has been reduced to zero. It is then effectively out of service.

In brief summary, the systems of Figs. 1 and 2 have in common the presence of a computing network having interconnected circuit components developing first and second voltages respectively interrelating given levels of generation of the sources 1–3 and the incremental transmission loss for each of these sources at said given levels of generation and for developing third voltages related to the incremental cost of generating power at each said source at their respective given levels of generation. In Fig. 1 the given levels of generation correspond with actual generation of each of the sources 1–3. The first voltages correspond with $e_1$–$e_3$, and the second voltages are those labeled with the symbols for incremental transmission loss. The third voltages related to the incremental cost of generating power are those corresponding with the voltage between conductors 68 and 69 for the source 1.

Fig. 2, though the operation differs from Fig. 1, has in common with it the computing network which interrelates the first and second voltages for given levels of generation. The adjustment of slidewire contacts **131*a*–133*a*, though not in response to actual generation, does occur in response to the operation of detector 158 to positions corresponding with "desired generation" for each source. The adjustments are for given levels of generation. Detector 158 operates as a result of movement of the equal-λ multiplier 140** which modifies the second voltage to produce across the secondary of transformer $T_7$ the third voltage. The third voltage, representative of the incremental cost of generating power at each source at its given level of generation, is applied to the computing network including resistors 141 and 142 and transformer 150 for operation of detector 158 and, of course, also for operation of detector 185. Thus, in Fig. 2 the voltage-modifying means, including each of the slidewires of the equal-λ multiplier, is included in the network at points intermediate those at which the second and third voltages are respectively developed for introduction into the network of the voltage-modifying effect representative of incremental cost of power delivered at said given level of generation.

In Fig. 1 the second voltage representation of incremental transmission loss appears as $e_6$ in network 70, while the third voltage representative of the incremental cost of generated power has already been identified as that appearing between conductors 68 and 69 of network 63. Slidewire 76 represents a voltage-modifying means included in the network at points intermediate the last-identified voltage and $e_6$, the second of said voltages, for introducing into the network a voltage-modifying effect representative of incremental cost of power delivered at said given level of generation. The voltage-modifying effect referred to is that resulting from the operation of detector 77 which, besides adjusting contact 76*a*, adjusts slidewire contact 84*a* of the λ-slidewire forming a part of the λ-recorder 79. In both the systems of Figs. 1 and 2 the foregoing features are of importance and provide the means whereby generation of each source can be regulated for equality of incremental costs of delivered power with the total generation adequate to meet the total generation requirements of the system.

Referring now to Fig. 2A, the system as a whole is quite similar to Fig. 2, and the apparatus with like reference characters functions in the same way. Instead of the equal-λ multiplier 140 of Fig. 2, the system of Fig. 2A includes system-λ busses 210*a* and 210*b* energized from a slidewire 211 connected to a source of alternating-current supply. The contact 211*a* of slidewire 211 is adjusted as by the detector 138 to establish a voltage across the system-λ busses 210*a* and 210*b* representing the value of λ with the system meeting its generation requirements.

The output from each of the summing circuits of the computer 25 represents respectively the quantity unity minus the incremental transmission loss for each of the sources as shown on the drawing.

For the first summing circuit the output $$\left(1-\frac{\partial P_L}{\partial P_1}\right)$$

is applied to the ends of a slidewire 212 whose contact 212*a* is adjustable by the detector 77. The detector 77 forms a part of the computing network 63 which is identical with the similarly numbered network of Fig. 1 to provide an output voltage between conductors 68 and 69 representative of the incremental cost of generating power at the source 1 for a given level of generation. Accordingly, detector 77 in adjusting contact 212*a* provides an output representative of the λ of source 1 when operating at a given level of generation. Mathematically, the slidewire 212 and its contact 212*a* performs the division of Equation 12 between incremental cost of generation and the quantity, unit minus the incremental transmission loss.

The detector 77 adjusts slidewire contact 213*a* of slidewire 213 to apply to a balanceable circuit including detector 214 a voltage representative of λ for source 1 at its said given level of generation. The detector 214 also has applied to it the voltage of the λ busses 210*a* and 210*b*. Thus, if the λ for the station at the given level of generation differs from the system-λ at the desired level of generation for the system as a whole, the detector 214 responds to adjust contact 64*a* in computing network 63 to change the value of $P_1$ in that network. The detector 214 also relatively adjusts the contact 215*a* of slidewire 215 which develops the voltage $e_{153}$ (corresponding with the like voltage similarly labeled in Fig. 2). The voltage $e_{153}$ is representative of a desired level of generation for source 1. Detector 158 responds to any change in the voltage $e_{153}$ for operating recorder 160 to show the desired level of generation for source 1. The detector 158 also functions through mechanical connection 182 to adjust slidewire contact 131*a* in the first column of computer 25 correspondingly to change the voltage respresentative of $P_1$ in that network.

Detector 185 responds to a change in the voltage $e_{153}$ and adjusts slidewire contacts 186*a* and 189*a* and also positions cam 190 to route pulses from the pulse generator 97 to raise or lower the generation of source 1 to meet the changed requirements of generation for that source.

From the foregoing it will be seen that at any time $\lambda_1$, the incremental cost of delivered power from source 1, differs from the system-λ represented by the voltage between system busses 210*a* and 210*b*, a change in generation level of that source takes place. The generation of source 1 is changed until its incremental cost of delivered power is equal to that of the other sources, thus meeting the requirements for the most economical operation of the system as a whole in terms of delivered power.

With the above understanding of the operation of Fig. 2A, but one example will be given of the operation as a whole. It will be assumed that a change on the system takes place, reducing the frequency as detected by the meter 95 for adjustment of slidewire contact 171*a*. Detector 177 responds to adjust slidewire contact 180*a*. Detector 138 responds to adjust contact 211*a* of slidewire 211 to change the voltage between the λ busses 210*a* and 210*b*. The new value of λ represents the value it will have with the generation of all the sources increased to meet the new level of generation required. With the change in system-λ, detector 214 responds to adjust slidewire contacts 64*a* and 215*a*, the said adjustments representing a new level of desired generation for the source 1. The exact level of generation for source 1, however, is determined as a result of computations which then take place. The network 63 computes the incremental cost of generation at source 1 at the new level and the response of detector 158 to the change in the voltage $e_{153}$ adjusts slidewire contact 131*a* to apply the new level of generation to the first column of network 25.

Accordingly, detector 77 will respond in accordance with the computed value of λ for the new level of generation. If this value of λ does not equal that represented by the potential across the λ-busses 210*a* and 210*b*, the adjustment of slidewire contact 213*a* will not balance the voltage applied to detector 214, and it will respond further to adjust slidewire contacts 64*a* and 215*a*. It will continue to function until the λ for the source 1, through change in computed generation therefor, equals the λ represented by the voltage across λ-busses 210*a* and 210*b*. When $\lambda_1$ equals $\lambda_s$ (system-λ), the computations for the source 1 will have been completed. Change in actual generation of source 1 will thereafter be made through the operation of the impulse-routing cam 190 and its associated switches. They regulate the operation of the generation control 206 for source 1.

The system does not function step-wise as might be inferred from the above description. Instead, as soon as the frequency meter 95 responds to a change in frequency from a desired value, changes in generation are initiated by operation of slidewire contact 180*a* to unbalance network 181. This unbalance produces operation of detector 138 to change the voltage on the λ-busses. The detector 214 thereupon changes the voltage $e_{153}$, and detector 185 immediately moves contact 189*a* in a direction to rebalance network 181. When this network is rebalanced by the concurrent adjustments of slidewire contacts 191*a* and 192*a*, taking place for each of the other sources, the detector 138 is brought to standstill with contact 211*a* in a new position for a new value of system-λ. As soon as voltage $e_{153}$ changes, the cam 190 will be perated to initiate change in level of generation of source 1. As soon as there is an actual change in generation of source 1, the wattmeter 29 responds to adjust, through mechanical connection 209, slidewire contact 187*a* in a direction for return of slidewire contacts 186*a* and 189*a* toward their illustrated positions representative of operation of source 1 with its generation at a value making the λ for that source equal to the system-λ.

The other sources 2 and 3 have slidewires 216 and 217 each with associated slidewire contacts. These sources 2 and 3 also have circuitry the duplicate of that located in Fig. 2A, to the right of slidewire 212 for the source 1. The blocks 218 and 219 represent the network circuitry for sources 2 and 3. There extend from blocks 218 and 219 mechanical connections 197 and 198 for the operation respectively of the slidewire contacts 191*a* and 192*a*, and the pulse-directing cams 201 and 202, all for the purposes fully explained in connection with the operation of source 1.

In Fig. 3 there has been illustrated a modified computer network together with certain other modifications of the system of Fig. 1. More particularly, instead of the transformers associated with each of the resistors of the matrix network, provision is made in Fig. 3 for direct connection of the summing circuits to or across the respective resistors, first in one row and then in the succeeding rows. More particularly, switches 221–223 will be simultaneously closed as by a common mechanical connection 224, the result of which will be to connect its series-circuit relation with detector 36 the resistors $R_{11}$, $R_{12}$ and $R_{13}$. Accordingly, the detector 36 will respond in the manner already fully described in connection with Fig. 1. In Fig. 3, a motor 35 will operate the slidewire 37 to a balancing position for the measurement and recording at recorder 34 of the incremental transmission loss for powder source 1. The motor 35 will at the same time adjust contact 75*a* of slidewire 75 in the second computing network 70. When switches 221–223 are open, the circuit of motor 35 is broken so that it remains at standstill.

Switches 225–227 are then closed to complete the summing circuit for the measuring system shown by the block 40. When measurement and rebalancing has taken place, the aforesaid switches are opened, and switches 228–230 are closed to complete the third summing circuit for power source 3. This summing circuit is illustrated as including a detector 36*a*, associated motor 35*a* and balancing slidewire 37*a*, the functions of which correspond with parts already described.

In this connection, the description for the computing networks 63 and 70 will not be repeated, it being understood that they function in the modification of Fig. 3 in exactly the same way as they have been described for Fig. 1.

However, Fig. 3 includes a further variation which has been shown in association with detector 36*a* and motor 35*a*. That motor adjusts contact 75*c* of slidewire 75*b* for the same purposes as the adjustment of contact 75*a* in computer network 70. However, the output from slidewire 75*b* is taken from the opposite end-portion of the slidewire 75*b* rather than from the portion of the slidewire 75 used in Fig. 1. By this simple change in circuitry there is achieved the development of a voltage between conductors 231 and 232, a voltage corresponding with unity minus the incremental transmission loss. Thus, there has been eliminated the need for the transformer $T_1$ of computer network 70 shown in Fig. 1.

The remaining portion of computer network 770B for source 3 also includes a variation from that of network 70. Instead of providing the two slidewires 65 and 66 of Fig. 1, with ganged operation of contacts, only one slidewire 233 is needed in network 70B with its contact manually operable by a knob 234. This result is achieved by connecting slidewire 64, itself energized from the alternating-current source 28 (through a resistor which is optional) in series with an alternating-current supply 28*d* with its selected and predetermined voltage added to that developed by slidewire 64 and the sum applied to slidewire 233. Thus, the voltage from source 28*d* corresponds with the "*b*" term of Equation 10 and the voltage derived from the slidewire 64 and its contact 64*a* represents the "$2cP_{Gm}$" term of Equation 10. The multiplication of the right-hand side of Equation 10 by "*f*" where the latter represents a selected reference cost, is accomplished by slidewire 233 with its contact adjustable by knob 234. The setting of the slidewire contact by knob 234 provides any desired fraction of the resultant voltage for developing an output representative of the incremental cost of generation for the then existing cost of fuel. Either of the arrangements respectively shown for power sources 1 and 3 of Fig. 3 may be used. The remaining portions of Fig. 3 correspond with those of Fig. 1 and description thereof need not here be repeated.

Referring now to Fig. 4, a further modification of the computer network 25 has been illustrated in which each of the respective columns of the matrix comprises transformers 241–243, each with single primary windings respectively connected to adjustable sources of alternating-current supply (adjustable by the slidewire contacts) as in the preceding modifications. Each transformer has a number of secondary windings corresponding with the number of rows in the matrix. Thus, transformer 241 includes three secondary windings, each having series-resistors 241*a*, 241*b* and 241*c*, and output resistors 241*d*, 241*e* and 241*f*. While each secondary winding could be designed with a turns ratio to yield an output voltage corresponding with $e_{11}$, $e_{21}$ and $e_{31}$ respectively, it is more convenient to provide the voltage-dividing resistors 241*a* and 241*d* to provide the voltage $e_{11}$. The corresponding resistors 241*b* and 241*e* provide the voltage $e_{21}$, and resistors 241*c* and 241*f* provide the voltage $e_{31}$. Like resistors are provided for transformers 242 and 243 and for a fourth column, transformer 244, to provide the corresponding output voltages shown in the drawing.

In the interest of simplicity, power sources 1–3 in Figs. 1 and 2 were illustrated as single generators. Each power source may be taken as representative of a station having many generators contributing power and also as representative of power interchange as through tieline connections with adjacent systems.

Where the station has two generators with substantially the same operating characteristics, the same kw. rating, and particularly the same as regards incremental cost of generation, a single computing network represented by the network 63 of Fig. 1 may be utilized. In that event, the voltage introduced by the slidewire 64 will be proportional to half the station output. This will represent the output of each of the two units; i. e., one-half of the station output. Thus, the raise and lower impulses will be routed to source 1 which, under the foregoing assumption, can be taken as representing one of the two generators of a single station. The second generator, a duplicate of generator 1, is similarly controlled. Thus, the generation of the two generators is raised and lowered in exactly the same manner as described for source 1 of Fig. 1.

If the two generators or power sources of a power station are dissimilar in their respective incremental costs of generation, there will be provided duplicates of the computing circuit 63, one for each generator, and with the resistors 64, 65 and 66 proportioned respectively in accordance with Equation 10 for each of them. The setting of knob 67 will be dictated as described in connection with Fig. 1.

The foregoing principles are equally applicable to all modifications and the manner in which they have been applied to Fig. 2 is illustrated in the fractional diagram of Fig. 5. In Fig. 5 there have been shown the conductors of summing circuits of the computer network 25 of Fig. 2 across which are developed the voltages proportional to one minus incremental transmission loss $$\left(1-\frac{\partial P_L}{\partial P_1}\right) \text{ and } \left(1-\frac{\partial P_L}{\partial P_2}\right)$$

The transformers $T_4$ and $T_5$ for introducing the voltages of unity value are also illustrated in association with the equal-lambda-multiplying slidewires 134 and 135.

It will first be assumed that the power source 1 has two generators 1A and 1B having different incremental costs of power generation. Accordingly, the voltage developed from the slidewire 134 is applied to the primary winding of a transformer 251 having two secondary windings 252 and 253. In this manner the voltage from slidewire 134 is separated for application to two computing networks. It is applied to computing network 254, identical with that illustrated in Fig. 2 with like parts and circuit components bearing the same numbers with the additional subscript "*c*." The values of such components 141*c*, 142*c* and 150*c*, however, are selected in accordance with the values of Equation 10 for one of the generators of the station. Associated with secondary winding 252 is a second computing network 255 identical with network 254 except that the values for like circuit components, with "*d*" subscripts, are selected in accordance with the constants of Equation 10 for the other generator of the station.

Thus, voltages $E_1$ and $E_2$ are developed by the respective computing networks 254 and 255. The voltage $E_1$ has a magnitude representative of the desired generation of the first generator of source 1 which, for convenience, will be referred to as generator 1A. Similarly, the voltage $E_2$ will have a magnitude representative of the desired generation of the other generator of source 1 which, for convenience, will be referred to as generator 1B. Voltages $E_1$ and $E_2$ are added together, the sum of the two voltages being indicated by the arrows as appearing between conductors 149 and 151. Accordingly, the detector 158*c* responds to changes in desired generation levels for source 1 comprising the two generators 1A and 1B. Detector 158*c* functions as described in connection with Fig. 2 to rebalance its own measuring circuit by slidewire 157*c* and through mechanical connection 182 to vary the input to the computer 25 in accordance with the sum of the desired changes in power output of the generators 1A and 1B.

Since the characteristics of the two generators are different, the change of generation for each of them is under separate control means illustrated as including detector 185*c* which responds to changes in the voltage $E_1$ representative of the desired generation for source 1A. When a change in the voltage $E_1$ occurs, detector 185*c* responds to adjust the slidewire contacts of slidewire 186*c* to rebalance the detecting circuit and at the same time through mechanical connection 188*c* adjusts the cam 190*c* of the impulse-controlling switches provided for generator 1A. Thus, the cam 190*c* is driven by detector 185*c* in the same manner as cam 190 is driven by detector 185 in Fig. 2, the association of the cam 190*c* with the impulse generator 97 and the associated control for generator 1A being the same as in Fig. 2.

Included in the circuit of detector 185*c* is the "actual generation" slidewire 187*c* whose contact is adjusted by mechanical connection 209*c* by a wattmeter responsive to the generation of generator 1A. Accordingly, as the power output of generator 1A is increased under the control of cam 190*c* the contact is moved along its associated slidewire 187*c* in the direction to unbalance the detecting circuit for return of the slidewire contact of slidewire 186*c* toward its mid-position. It arrives at its mid-position when actual generation is equal to the computed or desired generation.

For the generator 1B there is provided a detector 185*d*, included in circuit with $E_2$, slidewires 186*d* and 187*d*, which responds to any change in the voltage $E_2$. The detector operates impulse-controlling cam 190*d* in the same manner as described for cam 190*c* to control the power output of generator 1B until the actual generation represented by movement of the contact of slidewire 187*d* through the mechanical connection 209*d* is equal to the computed or desired value thereof.

As applied to Fig. 2, the slidewire 189 in the network 181 will be replaced by two slidewires whose contacts will be respectively adjusted through the mechanical connections 188*c* and 188*d*. Thus, the required or computed change in generation of generators 1A and 1B will be included in network 181 and will represent therein the total computed change in generation for the station or power source 1 having the two generators 1A and 1B.

When a station has two generators whose operating characteristics are expressed by like coefficients of Equation 10 only a single computing network need be used, such as illustrated by the network 258 of Fig. 5 which again has circuit components connected in identical manner with those of networks 254 and 255. When both generators are operating, a single-pole double-throw switch 259 will be in its illustrated position to apply to the balanceable networks shown in block diagram, the voltage developed across series-connected output resistors 261 and 262. That voltage is then representative of the total desired generation for both generators. However, if one generator is disconnected from the distribution network, the switch 259 is operated to its lowermost position to apply to network 260 the voltage develped across but one of the resistors, i. e., the resistor 262. Thus, with the generating capacities of the two generators equal, resistors 261 and 262 will have equal values and with switch 259 in its lowermost position the voltage applied to network 260 will be 50% of its previous value and thus is representative of the generation of one generator instead of two.

Mathematically, the foregoing may be expressed as follows:

$$P_2=N_i\left(\frac{\frac{dF_2}{dP_2}}{C_2}-K_2\right) \qquad (16)$$

where $N_i$=the number of identical generators (or sources).

[Also, see Equation 15, column 15, lines 18 and 19, where $$\lambda_2\left(1-\frac{\partial P_L}{\partial P_2}\right)=\frac{dF_2}{dP_2}\Big] \qquad (16A)$$

It will be recalled that the network 258 performs the operations shown in that part of the above Equation 16 coming within the parentheses. The voltage or potential difference developed across both resistors 261 and 262 will be taken as that representative of the two generators in operation. Half that voltage as developed across resistor 262 may then be taken as representative of but one generator in operation. The multiplication represented by $N_i$ times the above quantity appearing in parentheses is then taken care of by suitable calibration of the components appearing in network 260, for example, as by establishing the required relationship between volts per megawatts of slidewires 157, 186 and 187 of Fig. 2.

Only a single impulse-routing cam 201 need be provided. For two generators, an additional generator control will be provided for the additional generator, both controls including control 207 operating from cam 201.

With an understanding of how the invention may be extended to apply to pairs of generators respectively of like and dissimilar characteristics, it will be quite obvious how to extend the application of the invention to a multiplicity of generators in one station. Power sources of like characteristics will be combined as indicated for network 258 and those of dissimilar characteristics will be treated as indicated by networks 254 and 255 of Fig. 5.

Referring now to Figs. 1 and 6, it will be recalled that in the computer network 63 of Fig. 1, the slidewire 66 and its associated source of supply developed a voltage for computer network 63 representative of the constant *bf* of Equation 10. Similarly, slidewires 64 and 65 developed a voltage varying with the term "$2cfP$" of Equation 10. Equation 10 is linear in character. In practice, however, the relationship between incremental cost of power generation with change in generation may not be linear in character. To take into account a changing rate of incremental cost of generation there may be associated with slidewire 64*b*, as shown in Fig. 6, power sources 28*a*, 28*b* and 28*c* of respectively differing voltages. Such system produces an output voltage between conductors 69 and 263 which increases at one rate as the slidewire contact 64*a* moves along the segment of slidewire 64*b* which is energized from source 28*a*. There is produced a voltage output varying at a different rate as contact 64*a* moves along the segment energized by source 28*b*; and there is produced a voltage output which changes at a still different rate for the segment of the slidewire 64*b* powered by the source 28*c*.

Curvilinear relationships between incremental costs of power generation and magnitude of generation may also be approximated by connecting adjustable resistors across several segments of slidewire 64*b* as illustrated in Fig. 7. Thus, resistors 264–266 may have different values for producing an output voltage which varies at different rates as the slidewire contact 64*a* moves over the respective segments shunted by said resistors. Thus, by changing the values of resistors 264–266 and the lengths of the segments of slidewire 64*b* which each shunts, widely different characteristics may be closely approximated by the arrangement of Fig. 7. Of course the slidewire 64 of Fig. 1 itself may consist of a resistor having resistance values which change non-linearly with unit lengths thereof.

Another condition of operation which is not unusual is represented by incremental cost relationships which are discontinuous. To take care of them, the arrangement of Fig. 8 may be utilized which, it will be seen, is quite similar to Fig. 6 except that the source 28*a* is connected through resistor 267 in series with a first segment 268 of the slidewire. A source of voltage 28*d* extends between the first segment 268 and the second segment 269 for displacing the voltage output of the slidewire when moved from the first to the second segment. The source 28*b* serves the same purposes in Fig. 8 as in Fig. 6 and so does the source 28*c* which is connected in series with the third segment 270 of the slidewire through a resistor 271.

Another source, however, 28*e* connected between the second segment 269 and the third segment 270, displaces the voltage outputs one from the other. The resistors 267 and 271 are provided to limit current flow from the respective sources 28*d* and 28*e* when slidewire contact 268*a* completes a connection which would otherwise have a low-resistance or short-circuit connection for the respective sources, i. e., when transfer is made between the first and second and between the second and third segments of the slidewire.

Where a power source has the characteristics illustrated in Fig. 8A, the modification of Fig. 8 is particularly useful. As generation changes, the incremental cost of generation $$\left(\frac{dF}{dP}\right)$$

may rise as indicated by the graph 268*b*. Such a change in $$\frac{dF}{dP}$$

is provided by movement of slidewire contact 268*a* along the first segment 268 of the slidewire. By reason of the opening of the valve or some other operating characteristic associated with the power source, there may be a relatively abrupt change in the incremental cost of generation. When such relatively abrupt change occurs, the slidewire contact 268*a* will then be moving from segment 268 to the second segment 269 of the slidewire. The incremental cost will then change at a different rate as indicated by the graph 269*b*. Though there may be any number of abrupt changes in incremental cost of generation, only three have been shown in the modification of Fig. 8, the third corresponding with the section 270 of the slidewire and the change in the incremental cost of generation being illustrated by the graph 270*b*. Abviously, the slidewire will have as many segments as required to meet the particular cost of generation characteristics of a given source.

In some cases the cost of generation characteristics for a given source will be such that there will be a relatively sharp decrease in cost of generation, such abrupt changes being illustrated in Fig. 9 at the intersections of graphs 277*a*, 277*c* and 277*e*. If generation of a source is increasing along graph 277*a*, as soon as it arrives at a point where the broken line 277*b* intersects it, the incremental cost of generation will then have risen to a value equal to the same value it will again be at a much higher level of generation, or where the broken line 277*b* intersects on graph 277*c*. Since under such conditions there will be two values of P (generation) for one value of $$\frac{dF}{dP}$$

an indeterminate is introduced.

Fig. 10 is provided so that as soon as the generation reaches a level where the incremental cost is indicated by the broken line 277*b*, there will be no further change in such incremental cost until the generation has increased to the point where broken line 277*b* intersects graph 277*c*. This is readily accomplished in Fig. 10 by providing a slidewire segment 278 of constant voltage, thus to represent the incremental cost of broken line 277*b* during change in position of slidewire contact 275*a* as it traverses that section of the slidewire. Again, there may be a plurality of such abruptly changing incremental costs of generation, and the slidewire may be provided with any desired number of constant voltage sections, the second one 279 being illustrated to correspond with the broken line graph 277*d* of Fig. 9.

Fig. 11 illustrates the manner in which the invention may be utilized with still further variations in the requirements of certain systems. The computing network 280 is similar in character to the network shown in Fig. 4, but in Fig. 11 there have been shown five columns and five rows. The columns 282-285 respectively energized from the primary windings of transformers 287–290 function in the same manner as the three columns described in Fig. 2. However, where an area A is connected to a tieline 291 extending to another area, that tieline is treated as a further source of power. It may be either negative or positive. When power is being supplied by tieline 291 to area A it is considered as a positive power source. By means of the wattmeter or instrument 292 the "generation" of said source adjusts slidewire contact 293*a* of slidewire 293 for energization of the secondary windings of transformer 286 respectively connected in the five rows of column 281. The direction of adjustment of contact 293*a* from its mid-point will depend upon the direction of said power flow and the extent of the adjustment upon the magnitude of the power flow. Accordingly, the computer network 280 includes components necessary for the calculation of the respective incremental transmission losses for all five of the power sources.

The summing circuit for the power source represented by the tieline 291 may have included in it a transformer 294 for introduction of the voltage unity minus $B_{no}$ from which there is subtracted the sum of the voltages developed in the first row of network 280. Thus, by means of movable contacts 295 and 296 a voltage representative of one minus the incremental transmission loss is applied to a measuring instrument 297 for indicating and recording on the chart 298 the percentage of generation delivered to the load; i. e., one minus the incremental transmission loss. The contacts 295 and 296 may be moved to successive positions for indicating and recording corresponding outputs from the remaining four summing circuits of network 280, each including the unity-voltage transformers.

Since the tieline 291 may be representative of either a positive or a negative source of power, there is provided a connection of the primary winding of transformer 286 between the slidewire contact 293*a* and between the two equal-valued resistors. Hence, the voltage applied to that winding will be either "positive" or "negative" with reference to the voltages applied to the remaining transformers 287–290 energized in accordance with the level of generation from "positive" sources. When power is being delivered over tieline 291 from area A, it then being representative of a negative source of power, the phase of the voltage applied to transformer 286 is 180° out of phase with that applied to the remaining transformers 287–290. Thus, the network 280 takes into account the fact that the tieline 291 is a negative source of power. The phase of the current flow through the secondary windings of column 281 brings into the calculator a "negative" current flow.

In Fig. 11 there has been omitted the detailed showing of the additional computing networks, these being symbolically represented by the blocks 302, 303, 304, 305 which, of course, will be respectively associated with a required generation network corresponding with the network 181 of Fig. 2. There will also be provided the raise and lower pulse generator 97 and the associated routing switches operable in the same manner as described for Fig. 2. In Fig. 11, however, there has been shown the frequency-responsive meter 95 in a network 172*a* generally similar to the one shown in Fig. 2. There has been added an additional bridge-section 172*b* including slidewires 306 and 307 connected to the source of alternating current. Slidewire contact 306*a* is adjusted in accordance with the "generation" supplied area A by tieline 291. Slidewire contact 307*a* is manually adjusted by knob 307*b* to establish a scheduled transfer of "generation" by way of tieline 291 with area A. Thus, the bridge network 172*b* introduces a further variable into the operation of the network 172*a* to take into account the presence of the tieline 291 and whether or not power is flowing to or from area A by way of said tieline. The direction of movement of contact 307*a* from its illustrated mid-point on slidewire 307 will be determined by the direction of power flow desired by way of tieline 291. The extent of the movement of contact 307*a* will be representative of the magnitude of that desired power flow. When the power or "generation" flowing by way of tieline 291 is in the same direction and of the same magnitude corresponding with the setting of contact 307*a*, the wattmeter 292 will have moved contact 306*a* of slidewire 306 to a network-balancing direction and no voltage will be introduced by network 172*b* into network 172*a*. However, assuming the frequency of the system at its present set value, if the actual power flow by way of tieline 291 differs from the scheduled flow, a voltage will be introduced into network 172*a* for change in generation of the power sources to meet the excess or deficiency as indicated by wattmeter 292. As far as detector 177 is concerned, the failure to meet the scheduled interchange over tieline 291 is the same as a change in frequency of the system, i. e., the detector 177 will increase the generation when the power flow from area A to the tieline 291 is not sufficient to meet the scheduled requirement. Generation will be decreased when the power flow by way of tieline 291 is greater than that scheduled.

Certain large loads which do not conform with the normal load pattern may be introduced into the computer as sources of negative generation in the same way as tieline 291 with another column for each such load in computer 280. Their effect can thereby be removed from the general load pattern, but their presence retained in the overall control system. In this manner a greater accuracy in the computation of the incremental transmission losses is achieved.

While high impedance detectors of any suitable type may be employed, there has been shown in Fig. 12 the details of one satisfactory form of phase-sensitive detector. The input circuit is connected to input terminals 310 and 311 which are connected to a primary winding of a transformer 312 of the high impedance type. The secondary winding of transformer 312 is connected across a resistor 313 and a slidewire 314, the movable contact 314*a* of which is adjutsable by a knob 315. The voltage appearing across the lower part of slidewire 314 and resistor 313 is applied by way of a grid resistor 316 to the input circuit of vacuum tube 317. The input signal is amplified and applied by way of coupling capacitor 318 to the grids of a double triode 319. The grids for each triode have been illustrated as internally connected together and to a grid-leak resistor 320. The anodes are respectively connected to windings 321 and 322, one of which operates the movable contact of the single-pole, double-throw switch 323 against one stationary contact, and the other coil operates it against the other stationary contact. When neither coil is energized, centering springs 324 maintain the movable contact in an intermediate position in spaced relation with both stationary contacts.

With the terminals 310 and 311 connected, for example in Fig. 3 in the first summing circuit in place of detector 36, and with the same source of alternating current 28 applied to the primary winding of a plate supply transformer 325 of Fig. 12, it will be seen that when zero potential difference appears at the input terminals there will be zero output from the tube 319. Suitable cathode-biasing means 327 is provided for the tube 317 and a fixed biasing means 326 is provided for tube 319. The fixed bias is produced by current flow through the resistor of the biasing means 326 by way of restisor 328 supplied from B+. However, when a potential difference appears, one of the triode sections of tube 319 will be rendered conductive depending upon the phase relation between the input signal and the alternating current applied to the respective anodes. Thus, if the phase is in one direction, the left-hand triode will be rendered conductive to energize coil 321 to operate the switch 323 of Fig. 12, or switch 38 of Fig. 3, to complete a circuit with one of its contacts. Upon 180° reversal of phase, the other or right-hand section will become conductive for energization of coil 322 to operate the movable contact against the other stationary contact. In this way the motor windings of motor 35 of Fig. 3 will be energized to drive the motor in one direction or the other and for purposes previously described.

The detector of Fig. 12 may be used for the detectors (including detector 36 of Fig. 3) associated with each of the summing circuits of Fig. 1; and it may be used for the detectors 88 and 90 and their associated three-position relays 89 and 91 of Fig. 1, and in Fig. 2 for amplifiers 161 and 163 and their associated relays 154 and 155. For the latter applications the switch contact 323 will be normally biased to one of its circuit-closing positions.

Figs. 13A and 13B diagrammatically illustrate a further modification of the invention having some of the features of the systems of Figs. 1 and 2 and embodying a number of the advantages of both systems. In Fig. 13A there is shown the computer in the form of a matrix network with the corresponding parts having the same reference characters as those of Figs. 1 and 2. Detectors 401, 402 and 403 are provided for indicating and recording the quantities of unity minus the incremental transmission loss for the respective power sources 1, 2 and 3 at the existing or actual generation levels. These detectors also adjust the slidewire contacts of rebalancing slidewires 404, 405 and 406, and through mechanical connections 401*a*, 402*a* and 403*a*, they also adjust the slidewire contacts of slidewires 407, 408 and 409 appearing in Fig. 13B. Adjustment of the contact of slidewire 407 establishes in the form of a voltage in computing network 410 said quantity of unity minus the incremental transmission loss for source 1.

The matrix network of Fig. 13A, while producing the same output voltages corresponding with the respective quantities of unity minus the incremental transmission losses as in Fig. 2, produces them in a slightly different manner. In Fig. 2, the transformers $T_4$, $T_5$ and $T_6$ introduce voltages into the respective summing circuits to take care of both "unity" and the constants $B_{10}$, $B_{20}$ and $B_{30}$ of Equations 4 to 6. In Fig. 1 the constants $B_{10}$, $B_{20}$ and $B_{30}$ were respectively inserted into the summing circuits by transformers $B_{10}$, $B_{20}$ and $B_{30}$.

In the matrix network of Fig. 13A, transformers $T_1$, $T_2$ and $T_3$ insert in the respective summing circuits voltages representative of unity. Voltages representative of the constants $B_{10}$, $B_{20}$ and $B_{30}$ are included by providing a series circuit energized from a transformer 395. The series circuit includes a calibrating resistor $R_0$ and resistors $R_{10}$, $R_{20}$ and $R_{30}$, each having values selected for the development of potential differences or voltages respectively corresponding with the values of constants $B_{10}$, $B_{20}$ and $B_{30}$. The voltages developed across said resistors are applied to isolating transformers $T_{10}$, $T_{20}$ and $T_{30}$ whose secondary windings are respectively included in the summing circuits.

The equations involving the foregoing relationships have already been discussed at length. However, it will be convenient again to refer to Equation 10:

$$\frac{d(fI_{Gm})}{dP_{Gm}}=\frac{dF_{Gm}}{dP_{Gm}}=(b+2cP_{Gm})f \qquad (10)$$

In connection with Equation 15 it will be remembered that $C_{Gm}$ was equal to $2cf$ and that $K_{Gm}$ was equal to $$\frac{b}{2c}$$

Substituting the foregoing in Equation 10 there is obtained the following:

$$\frac{dF_{Gm}}{dP_{Gm}}=[K_{Gm}C_{Gm}+C_{Gm}P_{Gm}] \qquad (17)$$

Substituting Equation 17 in Equation 12, there is obtained the following:

$$\lambda_{Gm}=\frac{[K_{Gm}C_{Gm}+C_{Gm}P_{Gm}]}{\left(1-\frac{\partial P_L}{\partial P_m}\right)} \qquad (18)$$

In Fig. 13B the incremental cost of generating power at each source is computed by the network 410 which corresponds in circuit elements with the network 63 of Fig. 1, the contact of slidewire 64 being adjusted through a mechanical connection 64*m* from the wattmeter 29 responsive to the generation of source 1.

It will be observed the wattmeters 29–31 are shown in Fig. 13B in the same manner as in Figs. 1 and 2. In Fig. 13A they have again been shown, but by broken lines, for convenience in illustrating the operation of the system.

The voltage $e_{40}$ derived from network 410 is representative of the incremental cost of generating power at the source 1. By providing the ratio-determining means in the form of rebalancing slidewire 76, the position of its contact will be representative of the incremental cost of delivered power from source 1 which has, of course, previously been referred to as λ.

In the system of Figs. 13A—13B, there is utilized the weighted average of λ for all of the sources whose generation is under the control of the system, where the λ of each source is given a weight equal to its generation. When the generation of a particular source lies outside its regulating range, the values representative of that particular source are removed from the computing network establishing an output representative of the weighted average of λ for all sources operating within their respective regulating ranges. Mathematically, the weighted average of λ is expressed by the following equation:

$$\lambda\ \text{ave.}=\frac{\Sigma\lambda_{Gm}P_{Gm}}{\Sigma P_{Gm}} \qquad (19)$$

Output values representative of the denominator of Equation 19 may be readily attained by summing means for the wattmeters 29–31. In Fig. 13A an electrical summing means is provided. This summing means takes advantage of the fact that through mechanical connection 64*m* slidewire contact 27*a* of slidewire 27 varies the voltage $e_1$ in the first column of the matrix network in accordance with the generation at source 1. In series with the circuit components of the first column of the matrix network is a resistor 411. The potential difference or voltage across resistor 411 is applied to the primary winding of a transformer $T_{41}$ with its output voltage representative of the generation at source 1. Similarly, resistors 412 and 413 apply to transformers $T_{42}$ and $T_{43}$ voltages representative of the generation at sources 2 and 3. The secondary windings of the transformers $T_{41}$–$T_{43}$ are connected in series in the summing circuit for the development across the output conductors of the algebraic sum and as represented by the arrow labeled $\Sigma P_m$.

The resistors 414, 415 and 416 are respectively connected in the columns for development across the primary windings of transformers $T_{44}$, $T_{45}$ and $T_{46}$ of voltages also respectively representative of generation ($P_1$, $P_2$, and $P_3$) at sources 1, 2 and 3. The secondary windings of each transformer, however, are connected to means for multiplying the generation of each source times the value of λ for each source. As shown, the multiplication is accomplished by applying the output voltages from transformers $T_{44}$–$T_{46}$ to the respective ends of slidewires 417, 418 and 419. The contact of slidewire 417 is adjusted as through a mechanical connection, indicated by the broken lines 420 and 421, by the detector 77 which, it will be remembered, will move the contact in accordance with values of $\lambda_1$ for source 1. Thus, the slidewire output voltage will have a value proportional to and representative of the product $P_1\lambda_1$, voltage arrows with the foregoing label appearing in Fig. 13A. Similarly, the product $P_2\lambda_2$ is obtained from slidewire 418 by reason of adjustment of its contact through mechanical connections 422 by the "lambda detector" 423 for the source 2, said detector functioning in association with slidewire 76*e*. In the same manner, slidewire 419 provides a voltage corresponding with the product $P_3\lambda_3$ by reason of the mechanical connection 424 leading to lambda detector 425 functioning in association with slidewire 76*f*.

The blocks 426 and 427 illustrate networks corresponding with network 410, each such network being provided with adjusting knobs 426*a* and 427*a* performing the same purposes as knob 67 of network 410.

The slidewires 417–419 are connected in series in a summing circuit for the development across the $P_m\lambda_m$ conductors 428 and 429 of the algebraic sum of said voltages, as indicated by the voltage arrows $\Sigma P_m\lambda_m$, where *m* in turn for the three sources of Figs. 13A—13B assumes values of whole numbers from one to three. There is but one generator per source so the subscript "G" is omitted.

It will now be seen that there have been provided solutions for both numerators and denominators of Equation 19. The division indicated by Equation 19 is performed by applying to the respective ends of a slidewire 430 the voltage $\Sigma P_m$. By positioning slidewire contact 430*a* to make $\Sigma P_m\lambda_m$ equal to a fraction of the voltage $\Sigma P_m$, the position of the slidewire contact 430*a* will then be representative of the average value of λ. This is accomplished by providing a detector 431 in the summing circuit for $\Sigma P_m\lambda_m$ for adjustment of slidewire contact 430*a* to a circuit-balancing position, i. e., to make the fraction of the voltage derived from slidewire 430 equal to the voltage $\Sigma P_m\lambda_m$.

Having now established a system-weighted average value for λ, voltages representative of that average value are produced in networks 432–434 (Fig. 13B) by the adjustment of the contacts of slidewires 435–437. The mechanical connection from detector 431 is labeled "λ-average." It will be observed that the network 432 includes a slidewire 438 having its contact adjusted by detector 77 through mechanical connection 421 to introduce into the network a voltage representative of $\lambda_1$, i. e., the incremental cost of delivered power from source 1.

Before further describing networks 432–434, further attention will now be given to the mathematical operations to be performed by them. If the incremental cost of delivered power from the source 1 differs from the average value of the incremental cost of delivered power from all the sources, a change in generation of source 1 should be effected in direction and by an amount which will bring the incremental cost of delivered power from source 1 to a value equal to the average value.

The change in generation from actual generation $P_{Gm}$ to a new value $P_{Gm}'$ may be determined by the following relationship:

$$P_{Gm}'-P_{Gm}=\frac{(\lambda\,\text{ave.}-\lambda_{Gm})}{C_{Gm}}\left(1-\frac{\partial P_L}{\partial P_m}\right) \qquad (20)$$

The foregoing will be readily seen by referring again to Equation 18 and rewriting it to express the conditions with the two different values for λ, i. e.:

$$\lambda\,\text{ave.}-\lambda_{Gm}=\frac{[K_{Gm}C_{Gm}+C_{Gm}P_{Gm}'-K_{Gm}C_{Gm}-C_{Gm}P_{Gm}]}{1-\dfrac{\partial P_L}{\partial P_m}} \qquad (21)$$

$P_{Gm}$ again represents the level of generation of a generator in station *m*, and $P_{Gm}'$ represents the changed level of generation of said generator in station *m*. Simplified, Equation 21 may be written:

$$\lambda\,\text{ave.}-\lambda_{Gm}=\frac{C_{Gm}(P_{Gm}'-P_{Gm})}{1-\dfrac{\partial P_L}{\partial P_m}} \qquad (22)$$

For purposes of explaining the operation of the system of Figs. 13A–13B, Equation 20 will be used.

Returning now to the network 432 of Fig. 13B, there is subtracted from the voltage introduced by slidewire 435 representing the average value of λ, a voltage introduced by slidewire 438 and representative of $\lambda_1$ for the source 1 (which has throughout been assumed to be a single generator). By applying the difference voltage to the series-connected voltage-dividing resistors 439 and 440, there is achieved the multiplication by $$\frac{1}{C_1}$$

as required by Equation 20. The voltage appearing across resistor 440 is applied to the opposite ends of a slidewire 441 whose contact 441*a* is adjusted through mechanical connection 401*a* by the detector 401 so that the position of the contact on the slidewire 441 is representative of the quantity $$1-\frac{\partial P_L}{\partial P_1}$$

Accordingly, the output voltage $e_{41}$ from the slidewire 441 is representative of the product of the two terms on the right-hand side of Equation 20.

By providing a detector 443 in the foregoing circuit 471 together with a circuit-balancing slidewire 444, the position of its contact will represent a solution of Equation 20, i. e., the difference between $P_1'$ and $P_1$. That difference will represent the desired change in generation for source 1 and it may be indicated and recorded as on chart 445. The indication of the desired change of generation may be utilized for the manual adjustment of the governor 93 of the prime mover 92. As shown, however, through mechanical connection 446, detector 443 adjusts impulse-directing contact 447 of an impulse generator 448 of the same general construction as impulse generator 97 of Fig. 1.

If the desired generation is to be increased, contact 447 will be moved to the right to initiate the flow of raise impulses through contacts 450 to the coil of a motor-controlling contactor 452. If the desired generation is to be decreased, contact 447 will be moved to the left to initiate lower impulses by way of contacts 454 to the operating coil of contactor 456. The motor-controlling contactors 452 and 456 function in the same way as described for their counterparts 102 and 117 of Fig. 1.

When generation level is to be increased, the motor 457 through gearing 458 drives, through the slip connection 459, a nut 460 relative to a threaded shaft 461 to move the governor control arm 93*a* in a direction to change the governor bias, as through spring 106, in a direction to increase the generation.

It is here emphasized that the described change in generation of source 1 is produced by the energization of motor 457 independently of any change in system load or of system frequency. A change in generation of source 1 will occur whenever voltage $e_{41}$ has a value other than zero and it will be in one direction or the other depending upon the instantaneous polarity of voltage $e_{41}$. Stated differently, a change in generation will occur whenever the incremental cost of delivered power for source 1 differs from the weighted average of the incremental cost of delivered power for the "N-number" of sources that lie in the regulating range. An inspection of Equation 18 will suggest other changes which may occur in the operation requiring a change in generation in order that equal-lambda operations can be maintained for all of the sources operating within their regulating ranges.

Master controllers of conventional design may be used in conjunction with the system of Figs. 13A–13B. Such a controller can be used for control of a governor-adjusting motor 103. The manner in which the motor 103 operating through gearing 103*g* adjusts the threaded shaft 461 for change of generation of source 1 will be later described, it being sufficient for the moment to say that its presence is not essential to the above described operation of the system of Figs. 13A–13B.

Returning now to the networks 432, 433 and 434 and to the additional associated networks 472 and 473, the latter have components corresponding with those of network 471. They function in conjunction with detectors 474 and 475 to provide indications and records of desired changes in generation as on charts 476 and 477. The detectors 474 and 475 respectively position pulse-directing and pulse-producing contacts 478 and 479 of pulse generator 448. The remaining details of the control circuits for sources 2 and 3 which are identical with source 1 have been diagrammatically indicated by the generator controls 484 and 485. For clarity, sources 2 and 3 are shown by dotted lines at the controls 484 and 485. Similar simplification has been used to indicate the operation of the limit switches as by the broken lines 486 and 487, such switches functioning in the same manner as will be described for the limit switches 450 and 454 for the source 1.

To minimize the number of mechanical connections extending from Fig. 13A to Fig. 13B, the two mechanical connections 497*a* and 498*a* in Fig. 13A have been merged as shown by the bracket, corresponding mechanical connections from limit circuits 508 and 509 as shown by brackets merging in a common broken line, all of them being shown by the single line 515. From the single line 515 representing the mechanical connections in Fig. 13B, the brackets 515*a*–515*d* are shown for the continuance of the individual mechanical connections to the respective generator controls.

Further in connection with the operation, if the detector 443 responds in a direction to indicate a desired increase in generation, it will be because $\lambda_1$ for source 1 is lower than $\lambda$-average. Detector 443 will operate through pulse-directing contact 447 to increase generation of source 1.

If $\lambda_1$ is lower than $\lambda$-average generation of source 1 will be increased. But if $\lambda_1$ is lower than $\lambda$-average there will be another value of $\lambda$ for a different source higher than $\lambda$-average. The result will be that a detector (corresponding with detector 443) for the latter source will respond to decrease generation of the latter source. Thus, as one source increases generation, another source will be decreasing generation. Accordingly, the distribution of generation to meet the area requirement of total generation will be accomplished with a minimum incremental cost of delivered power from all the sources. Such distribution of generation is accomplished without adversely affecting a master controller, if present, or a system frequency controller, which will normally be provided, since total generation is not changed by the above operations.

In all modifications, including that of Figs. 13A–13B, the three sources 1–3 are considerably less in number than will ordinarily be found in a power generating and distributing system to which the invention will be applied. With a multiplicity of sources, twenty or thirty or more, the generation at a number of sources may be increased by the system, while the generation at a number of other sources will be decreased by the control system of Figs. 13A–13B.

Emphasis is made of the fact that in the above-described system, $\lambda$-average is weighted by generation only of those sources operating within their normal regulating ranges. With a large number of sources for a system, it will be readily understood that as loading of the system changes, some of the sources will reach a maximum or minimum limit of their regulating ranges. When that event occurs, the incremental cost of delivered power for each such source should be eliminated from the network which computes $\lambda$-average. This is accomplished in manner somewhat similar to the limit circuits of Fig. 2.

The "limit" network 491, Fig. 13A, for source 1, is provided with a slidewire 492, the contact of which is adjusted through mechanical connection 64*m* from wattmeter 29 to apply voltages to the input circuits of amplifiers 161 and 163 representative of actual generation of source 1. The input circuits to these amplifiers respectively have included in them fractional parts of slidewires 493 and 494 for producing therein voltages of predetermined magnitude. By means of a knob 495, the contact of slidewire 494 is set to a position representative of the upper limit of the regulating range of source 1, while by knob 496 the contact of slidewire 493 is set to a position on its slidewire representative of the low limit of generation of the regulating range.

At this point it may be mentioned that if limit network 491 fails, the relays 497 and 498 remain in their deenergized positions with contacts 454, 499, 450 and 500 closed. Contacts 499 and 500 complete an energizing circuit from a power source for relays 501 and 502 which remain in their energized positions for completion of the circuits to the primary windings of transformers $T_{41}$ and $T_{44}$ so long as relays 497 and 498 are deenergized. This "fail-safe" feature for network 491 is desirable.

As soon as the generation of source 1 increases to the limit of its regulating range, the wattmeter 29 moves the contact of slidewire 492 to a position where the voltage applied to amplifier 163 exceeds that introduced into its input circuit by slidewire 494. The relay 498 is thereupon energized to open its contacts 450 and 500. The opening of contacts 450 interrupts the "raise" circuit from pulse producer 448. The opening of contacts 500 deenergizes relays 501 and 502 for the interruption of the circuit to the primary windings of transformers $T_{41}$ and $T_{44}$. To minimize any effect upon the summing circuit of the impedance of the transformers, the relays 501 and 502 are provided with additional contacts 507 and 504 which are closed to complete short-circuit connections around the secondary windings thereof.

From the foregoing, it will be seen that as soon as source 1 reaches the upper limit of its regulating range, the slidewire 417 in the summing circuit is deenergized and the value of $P_1\lambda_1$ immediately drops to zero. However, the voltages representing $P_2\lambda_2$ and $P_3\lambda_3$ remain effective to produce an output voltage representing $\Sigma P_m\lambda_m$ involving the remaining sources 2 and 3.

The opening of contacts 506 and the closing of contacts 507 perform similar functions in the generation-summing circuit, thus reducing to zero at the secondary winding of transformer $T_{41}$ the voltage theretofore representative of the generation of source 1. The summing circuit, however, continues to produce a voltage representative of $\Sigma P_m$, the sum of the generation of sources 2 and 3. Thus, the position of contact 430*a* with respect to its slidewire 430 represents $\lambda$ ave., an average value of $\lambda$ weighted by the generation and involving only the sources 2 and 3 operating within their respective regulation ranges.

Whenever the generation at source 1 decreases below the lower limit of its regulating range corresponding with the position established by knob 496 on the slidewire 493, the input voltage at amplifier 161 reverses and relay 497 is energized to open its contacts 454 and 499. The opening of contacts 454 interrupts the "lower" pulse circuit from pulse producer 448. The contacts 499 open the energizing circuits for the relays 501 and 502, which thereupon function in the same manner as described above when the upper limit of generation had been attained.

Limit circuits 508 and 509, shown by blocks in Fig. 13A, are provided respectively for the sources 2 and 3, these functioning in the the same manner as described for the limit circuit 491.

System frequency, in general, is closely regulated, and change in system frequency from its predetermined value has been used to substantial extent to control generation, an illustrative system of this kind having been described for the network 172 of Fig. 2, and one with additional features having been illustrated in Fig. 11.

It is to be understood that any type of master control or load-controlling system may be used in Figs. 13A–13B. The output from the frequency meter 95 is intended generically to represent the output from such systems. With a change in system frequency, the contact 96 of impulse generator 97 is moved to initiate the flow of raise or lower impulses to the motor 103 through the appropriate one of field windings 103*a* and 103*b*. If raise impulses are produced, field winding 103*a* will be energized for rotation of the motor 103 in a direction to decrease the bias on spring 106 for the opening of the valve 94 of turbine 92 to increase generation of source 1. The converse action will occur when decrease degeneration is desired.

It is important to observe that the operation of motor 103 is entirely independent of the operation of motor 457, though both vary generation by varying the governor bias. Stated differently, frequency or frequency-responsive systems may be utilized to control generation to maintain system frequency constant in the absence of the present invention; and the present invention may be utilized for distribution of generation for minimum total cost of delivered power in the absence of the frequency-regulating system. When both are utilized together, however, the frequency-controlling system functions to maintain system frequency, and without any adverse effects upon its controlling actions the system embodying the present invention functions continuously to adjust generation between the several sources to maintain equal-λ-operation, i. e., to maintain equal the incremental costs of delivered power from all of the sources operating within their respective regulating ranges.

One of the advantages of the system of Fig. 2A and of Figs. 13A–13B not so readily attainable as in the system of Fig. 2, is the manner in which the networks 410, 426 and 427 of Figs. 13A and 13B and corresponding networks 63, 218 and 219 of Fig. 2A cooperate with the other parts of the computing system. For example, the networks or computers 410, 426 and 427 may take the form shown in Fig. 6, and the slidewire 64 may take any of the forms shown in Figs. 7, 8 and 10. Thus, the incremental cost of generation in Figs. 13A–13B may be determined by other than linear relationships, i. e., they may be curvilinear, or even discontinuous functions, all as explained in connection with Figs. 6–10.

In Figs. 14–16C there is disclosed a still further modification of the invention in which power sources having the lowest λ's have their generation preferentially increased and power sources having the highest λ's have their generation preferentially decreased. By providing two λ busses for developing on one bus potentials representing the average value of $$\frac{1}{\lambda}$$

for power sources having the highest λ's and developing on the other bus potentials representing the average value of $$\frac{1}{\lambda}$$

for power sources having the lowest λ's, and by comparing the potential representative of $$\frac{1}{\lambda}$$

for each power source with the potential of each of the busses, a determination is readily made as to which of the power sources have the highest λ and which of such sources have the lowest λ. Accordingly, the generating plants or power sources having the highest λ's have their generation preferentially decreased and the generating plants or power sources having the lowest λ's have their generation preferentially increased.

Further, in accordance with the invention both the high λ-bus and the low λ-bus develop potential differences respectively representing the weighted average of $$\frac{1}{\lambda}$$

of all power sources functioning within the limits of their respective regulating ranges. The $$\frac{1}{\lambda}$$

potential developed under the control of each source and connected to the high λ-bus is so weighted that the potential level of this bus closely approximates the potential representative of $$\frac{1}{\lambda}$$

of the power source having the highest λ or the two or more power sources having the highest λ's where two or more such sources have the same or approximately the same λ's. Upon the occurrence of any restraints upon a given source, the potential factor for that source as effecting the voltage of the respective λ busses is effectively removed, such removal being selective. For example, when a power source reaches the upper limit of its regulating range, its effect in determining the potential level of the low λ bus is made negligible by reducing its weighting factor in determining the weighted average level of this bus for all power sources. Also when a power source reaches the upper limit of its regulating range, its control circuits are opened so that generation-increasing impulses cannot be sent to it, but such control circuits remain closed to receive generation-lowering impulses routed to its by the high λ bus whenever $$\frac{1}{\lambda}$$

of the power source becomes lower than the weighted average $$\frac{1}{\lambda}$$

of the high λ bus. In a like manner, when a source reaches the lower limit of its regulating range, control circuits are opened to prevent it from receiving generation-lowering signals, but such circuits remain closed to receive generation-raising impulses whenever its $$\frac{1}{\lambda}$$

becomes higher than the weighted average $$\frac{1}{\lambda}$$

of the low λ bus.

The system also preferably includes means responsive to desired changes in total system generation for adjusting the potentials of both the high and low λ busses in the proper directions to increase the number of sources whose generation is to be placed under automatic control. Thus, if a large increase or decrease in total system generation is desired, additional power sources will be placed under automatic control. In event such desired change in total system generation is abnormally large, all power sources will be placed under automatic control to receive either raising or lowering impulses as desired except for those sources which have reached the limit of their regulating ranges. After the desired change in total system generation has been attained, normal conditions are restored and generation among the power sources will be adjusted in accordance with a comparison of $$\frac{1}{\lambda}$$

of each individual station with the average $$\frac{1}{\lambda}$$

for all stations.

In Figs. 16A to 16C, five sources 1–5 have been illustrated because a full appreciation of the operation of this modification requires more than three sources. For the most part, where in Figs. 16A to 16C the parts correspond with those previously described in connection with earlier modifications including but three sources, like reference characters have been used. In the interest of simplicity, new reference characters have not been added for duplicate equipment for the additional two sources. Even five sources will ordinarily be a smaller number than will be encountered in practice.

Further in the interest of simplicity, tie-lines have not been illustrated in association with area A of Fig. 16B, though the modification to be described may be applied to areas interconnected by tie-lines.

The computing network 25A is, in general, similar to the computing networks of Figs. 1, 2 and 13A, there being provided five rows of resistors corresponding with the five sources 1–5. There are six columns which together with the associated isolating transformers and summing circuits provide for the computation of the quantities of unity minus the incremental transmission loses. Fewer circuit elements are provided in the network 25A than in the corresponding network of Fig. 13A by combining the functions of the unity voltage transformers $T_1$–$T_3$ of Fig. 13A, in the sixth column thereof.

More particularly, in Fig. 16A the resistors $R_{10}$, $R_{20}$, $R_{30}$, $R_{40}$ and $R_{50}$ are selected for the development across the respective secondary windings of the isolating transformers, voltages which when added into the respective summing circuits will provide an output voltage from each summing circuit corresponding to the quantity of unity minus the incremental transmission loss for each source. In the sixth column, the values of the respective resistors take into account the constants $B_{10}$, $B_{20}$, $B_{30}$, $B_{40}$ and $B_{50}$ to yield an output at each secondary of transformers $T_{10}$, $T_{20}$, $T_{30}$, $T_{40}$ and $T_{50}$ which, when added into each summing circuit, provides the foregoing quantity. Such quantity appears in Fig. 16A for source 1 as $$\left(1-\frac{\partial P_L}{\partial P_1}\right)$$

In terms of Equations 4 to 6, column 5, lines 53–61 hereof, each side thereof is subtracted from the value unity. Accordingly, in Fig. 16A each transformer in the sixth column provides the quantity $(1-B_{mo})$. The subtraction is indicated in the summing circuit by the reversal of the secondary windings of transformers $T_{10}$, $T_{20}$, $T_{30}$, $T_{40}$ and $T_{50}$ relative to the other isolating transformers in the respective summing circuits.

For the source 1 it will be observed that there is also included in the summing circuit resistors 551 and 552 together with a rheostat 553 whose movable contact 553*a* is adjusted by a wattmeter 29 of source 1. The reasons for the provision of the foregoing resistors, the rheostat and a potentiometer 554 in the output circuit extending from opposite sides of resistor 551 will now be explained in terms of the applicable equations.

It is desired to produce a voltage between conductors 555 and 556 equal to $$\frac{1}{\lambda_1}$$

Such voltage is labeled on the drawing as $$\left(\frac{1}{\lambda_1}\right)$$

Referring now to Equation 12, column 9, lines 21–25 hereof, it will be seen by inspection that if the value of $$\frac{1}{\lambda_{Gm}}$$

is desired, the following equation may be written:

$$\frac{1}{\lambda_{Gm}}=\frac{1-\dfrac{\partial P_L}{\partial P_m}}{\dfrac{dF_{Gm}}{dP_{Gm}}} \qquad (23)$$

It will be remembered from Equation 10 that the denominator on the right-hand side of Equation 23 is equal to $(b+2cP_{Gm})f$. If the latter be substituted in Equation 23 and both the numerator and denominator of the right-hand side be divided by $(b+2cP_{Gm})$, the following equation is obtained:

$$\frac{1}{\lambda_{Gm}}=\frac{\dfrac{1-\dfrac{\partial P_L}{\partial P_m}}{b+2cP_{Gm}}}{f} \qquad (24)$$

Referring now to Fig. 16A, resistor 551 is given a value corresponding to unity, resistor 552 a value corresponding to the factor $(b-1)$, and the rheostat 553 adjusted in accordance with $P_1$, provides in the circuit a resistance varying in the same maner as $(2cP_{Gm})$. Therefore, the total resistances in the circuit due to resistors 551, 552 and rheostat 553 is equal to $(b+2cP_1)$. Since there is applied to the foregoing resistors and the rheostat a voltage corresponding with unity minus the incremental transmission loss, the voltage-dividing function performed may be expressed mathematically in terms of the voltage drop across resistor 551 as a solution of the numerator of Equation 24. Thus, in order to complete the solution of Equation 24 for $$\frac{1}{\lambda_{Gm}}$$

it is necessary only to divide the potential difference across resistor 551 by "*f*." The value of resistor 551 will be selected on the basis of the minimum cost of fuel, say 10¢ per million B. t. u.'s. Higher values will be set by taking less than the total voltage across resistor 551. This is readily accomplished by the voltage divider or potentiometer 554 to the ends of which is applied the potential difference developed across resistor 551. By means of a knob 557, a movable contact is set to a position on the potentiometer 554 corresponding with the cost of fuel per million B. t. u.'s. Accordingly, between conductors 555 and 556 there is developed a potential varying in accordance with the quantity $$\frac{1}{\lambda_1}$$

The foregoing quantity of $$\frac{1}{\lambda_{Gm}}$$

is used in the operation of the system as a whole. Accordingly, a recorder 558 may be provided with the usual detector, balancing slidewire, pen index and chart which, through operation of a selector switch 559, may in succession record the quantity $$\frac{1}{\lambda_{Gm}}$$

for the respective power sources.

From the above, it will now be seen why the quantity $$\frac{1}{\lambda_{Gm}}$$

is preferred. In Figs. 13A–13B it was necessary to provide the slidewires 76, 76*e* and 76*f* together with the detectors 77, 423 and 425 for relatively adjusting the movable contacts associated with said slidewires in order to produce a positional output corresponding with $\lambda_{Gm}$. It will be observed that in obtaining the quantity $$\frac{1}{\lambda_{Gm}}$$

the voltage-dividing slidewires and detectors corresponding with the foregoing have not been utilized.

The modification of Fig. 16A also retains other advantages in that the rheostat 553 may introduce a curvilinear relationship, such for example, as those described in connection with Figs. 6–10. More specifically, a discontinuous relationship, such as shown in Fig. 8A, is readily obtained by providing the rheostat 553 of Fig. 16A with interrupted segments. Referring to Fig. 8, no sources of supply, of course, will be associated with the rheostat 553. The broken section between adjacent segments 268 and 269 would be shunted by resistor 267 of suitable value. Similarly, the other broken section would be shunted by a resistor 271 of suitable value. For the reverse discontinuous relationship of Fig. 9, the circuit connections will be the same as in Fig. 10 with the omission of the source of supply. For other curvilinear relationships, rheostats with tapered windings may be used, and where there is an abrupt change in characteristic, the several segments of the rheostat may have resistance values which respectively differ with like incremental changes of position of the movable contact.

Reference will now be made to the simplified diagram of Fig. 14 where the respective voltages $$\frac{1}{\lambda_1}, \frac{1}{\lambda_4} \text{ and } \frac{1}{\lambda_5}$$

have been illustrated as applied to branches of the network leading to the high-voltage low-λ floating bus 560. The conductor 555 is common to the several branches. From conductor 556 the circuit of the first branch extends by way of limit contacts 562*b* of a limit relay through resistors 563 and 564 to the hight-voltage low-λ floating bus 560. There are provided similar branches for each of the sources, only two additional ones being shown in Fig. 14. Specifically, the branch including the voltage representing the quantity $$\frac{1}{\lambda_4}$$

includes limit contacts 565 of a limit relay, thence by way of resistors 567 and 568 to the λ-bus 560. The third branch shown in Fig. 14 includes the connections for application thereto of a voltage representative of the quantity $$\frac{1}{\lambda_5}$$

and includes limit contacts 569 of a limit relay as well as resistors 571 and 572. Between the common conductor 555 and the high-voltage low-λ bus 560 there is an additional connection by way of a potentiometer bridge 573 energized from a suitable source and including equal-valued resistors 574 and 575, the bus 560 being connected to their midpoint. The circuit continues by way of the contact 576*a* of slidewire 576 through a resistor 577 to the common conductor 55. With the contact 576*a* in its mid-position, no voltage is developed by the bridge 573 between contact 576*a* and the low-λ bus 560.

It will be obvious from an inspection of Fig. 14 that with voltages applied to each branch of the network a potential difference will appear as between conductor 555 and the λ-bus 560. If each of the voltages $$\frac{1}{\lambda_1}, \frac{1}{\lambda_4} \text{ and } \frac{1}{\lambda_5}$$

is different or is at the same value, the potential difference between conductor 555 and low-λ bus 560 will be representative of their average.

There are provided in Figs. 14–16C for each of the branches, amplifiers 578–582 for controlling the energization of relays 583–587, the relays having "*a*" contacts for short-circuiting one of the resistors in each of the branch networks and having "*b*" contacts for routing raise pulses to the generation controls for each of the sources. The contacts of relays 583–587 are in a closed position when ever there is no current flow in the branch, and consequently no voltage developed across the series resistors or when the current flow in the branch is from conductor 555 to the low-λ bus 560. When the current flow in a branch is from the low-λ bus 560 to conductor 555, which occurs when the potential representative of $$\frac{1}{\lambda}$$

for the branch is less than the potential difference between conductor 555 and the low-λ bus 560, relays 583–587 are energized by amplifiers 578–582 to open their "*a*" and "*b*" contacts.

The voltage applied to the input of amplifier 578 will be the difference between the voltage $$\frac{1}{\lambda_1}$$

and the voltage between conductor 555 and the low-λ bus 560. Since the conductor 555 is common to all λ voltages or potential differences, reference can hereafter be made to the potentials of the low-λ bus 560 and the potential representative of the quantity $$\frac{1}{\lambda_m}$$

Bearing now in mind that when λ decreases, it will be seen that when the potential representative of $$\frac{1}{\lambda_1}$$

is equal to or greater than the potential of the low-λ bus 560, contact 583*b* of relay 583 will be closed to route raise pulses to the governor control 206 of source 1 and relay contact 583*a* of relay 583 will be closed to short-circuit the resistor 564. The removal of the I. R. drop across resistor 564 increases the effect of the voltage representative of $$\frac{1}{\lambda_1}$$

in establishing the potential of the low-λ bus 560.

As raise pulses are produced by pulse generator 97, Fig. 16C, they flow by the way of relay contacts 583 *b*, condutor 588, limit contacts 562*a* to the raise relay or contactor 102 of generator control 206, which raises the generation of source 1. With increased generation, the wattmeter 29, through the mechanical connections indicated by the broken lines, adjusts slide-wire contact 27*a* in the computing network 25A and at the same time adjusts the rheostat 553. Accordingly, a new and lower value of $$\frac{1}{\lambda_1}$$

is computed corresponding with an increase in $\lambda_1$.

Returning now to Fig. 14, if the voltage representative of $$\frac{1}{\lambda_1}$$

be decreased, then the potential of the low-λ bus 560 will likewise be decreased. Since the removal of resistor 560 increases the weight given to $$\frac{1}{\lambda_1}$$

relative to the weight given to the voltages representative of $$\frac{1}{\lambda_4} \text{ and } \frac{1}{\lambda_5}$$

the reduction in potential of the bus 560 will be disproportionately larger than if resistor 564 were to remain in the circuit. As the potential representative of $$\frac{1}{\lambda_1}$$

and the potential of the low-λ bus 560 decreases, there soon obtains a condition in which another voltage, say that representative of $$\frac{1}{\lambda_5}$$

becomes equal or greater than the potential of the low-λ bus 560. When this occurs the amplifier 582 deenergizes the operating coil of relay 587 to close contacts **587*a* and 587*b* to short-circuit and remove resistor 572 from the branch of the network, and to route by way of contact 587*b* (Fig. 16C) raise impulses to the generation control 206D for the source 5. Since the described operation of the relay 587 by amplifier 582 resulted from a decrease in the potential level of the low-λ bus 560** to a value of equality with the voltage representative of $$\frac{1}{\lambda_5}$$

the following additional consideration obtains. As the potential $$\frac{1}{\lambda_5}$$

equals the potential of low-λ bus 560, there will be no current flow through the branch including resistors 571 and 572. Accordingly, the closure of contact **587*a* will have no effect upon the potential of the low-λ bus 560. Accordingly, the relay 587 will remain in its closed position. The foregoing operation continues until the potential on low-λ bus 560** decreases to a value representative of $$\frac{1}{\lambda_4}$$

whereupon amplifier 581 deenergizes relay 586 to close contacts **586*a* and 586*b***. The end result with continued increase in desired generation will be the equalization of all voltages representative of $$\frac{1}{\lambda}$$

with continued increasing of λ as determined by the computing means of Fig. 16A.

In brief summary, the system functions selectively to control generation at the sources in order to maintain equality in the incremental costs of delivered power at all times, and particularly during periods of change of generation. Thus far the description has been concerned with a desired increase in generation. The same general approach is made to the control of the generation of the several sources where it is desired to decrease generation.

Before leaving Fig. 14, it will be convenient to refer to the operation of slidewire contact **576*a* adjustable as through a mechanical connection 589 in accordance with a desired change in generation. When an increase in generation is indicated, the contact 576*a* moves in a direction to decrease the potential of the low-λ bus 560** relative to the potentials representative of $$\frac{1}{\lambda}$$

Thus a large change in position of contact **576*a* will to a substantial degree change the potential of low-λ bus 560 for simultaneous deenergization of all relays 583–587. As the increased generation meets the requirement, the contact 576*a* will be returned toward its neutral position. As the new generation level is approached and the voltage inserted by bridge 573** approaches zero, the operation is returned to that involving the weighted average of the $$\frac{1}{\lambda}$$

potentials on low-λ bus 560.

Mention has already been made of the fact that the $$\frac{1}{\lambda}$$

voltages affecting the potential of low-λ bus 560 are applied only during the times the various power sources are operating below the upper limit of their respective regulating ranges. When the generation of source 1 has been increased to the upper limit of its regulating range, the contact **562*b*, Fig. 16B, is opened by relay 562 to interrupt the circuit through the resistors 563 and 564 which are connected to the low-λ bus 560. Thus, contact 562*b* removes from the low-λ bus 560** the voltage representative of $$\frac{1}{\lambda_1}$$

At the same time, contact **562*a* of relay 562 interrupts the circuit to the operating coil of the raise relay 102 of the generation control 206**.

The manner in which the relay 562 is operated need not be described in detail, inasmuch as the limit network 591 of Fig. 16B is substantially identical with the limit network 491 of Fig. 13A, corresponding parts of limit network 591 having the same reference characters as limit network 491. Thus, the output of the amplifier 163 controls the energization of the operating coil of relay 562 as determined by the manual setting of the movable contact of slidewire 494 and by the level of actual generation which, through the mechanical connections shown by the broken lines from the wattmeter 29, determines the position of the slidewire contact of slidewire 492.

Similarly, the amplifier 161 in conjunction with slideway 492 and slidewire 493 determines the operation of the relay 561 having contacts **561*a* and 561*b* which perform generally similar operations to those of relay 562 when source 1** reaches the lower limit of its operating range.

There are preferably provided limit networks 592–595 for the respective power sources 2–5 for the control respectively of a pair of relays provided for each of said sources, each relay having contacts corresponding with those of relays 561 and 562.

It may be mentioned that after source 1 has reached the upper limit of its regulating range, a change in the requirements of generation calling for decreased generation can be effective for energization of the operating coil of relay 117 for routing lowering pulses to the generation control 206. Before describing how relay 117 is energized, consideration will be given to the manner in which the potential of the low-voltage high-λ floating bus 600 is established.

The circuits associated with the bus 600, Fig. 16C, are quite similar to those circuits described in association with bus 560. For example, the common conductor 555 leading to the resistor 577 and network 573 also extends to a resistor 601 leading to a network 602 of the same configuration and type as network 573. The low-voltage high-λ bus 600 is connected to the juncture of the two fixed resistors of network 602 in the same manner that bus 560 is connected to the juncture of the resistors of network 573. The high-λ bus 600 is also connected to a series-circuit or branch including resistors 604 and 603, thence by way of conductor 605 through limit contacts **561*b* and thence by conductor 556 to one side of potentiometer 554**. Thus the voltage or potential difference $$\frac{1}{\lambda_1}$$

is applied to bus 600 through the foregoing circuit.

An amplifier 608 has one side of its input circuit connected to the conductor 605 and the other side of the input circuit connected to the λ-bus 600. It will be observed that the input circuit of amplifier 608 is reversed relative to the input circuit to amplifier 578, i. e., reversed in phase or instantaneous polarity. Accordingly, the amplifier 608 will energize the operating coil of a relay 609 to open its contacts 609*a* and 609*b* during the time the voltage $$\frac{1}{\lambda_1}$$

is greater than the potential of the high-λ bus 600. However, when the potential or voltage representative of $$\frac{1}{\lambda_1}$$

is equal to or less than the potential of the high-λ bus 600, the operating coil of relay 609 is deenergized by the amplifier 608 and its contacts 609*a* and 609*b* are closed. Closure of contact 609*a* short-circuits or removes resistor 604 from the series-circuit and increases the weight given to the potential $$\frac{1}{\lambda_1}$$

in determining the potential of λ-bus 600. The closure of the contact 609*b* completes a circuit from the pulse generator 97 for lowering pulses which flow by way of conductor 610, the contacts 609*b*, conductor 611, and by way of contacts 561*a* to the operating coil of the lower relay 117 of the generation control 206.

Thus, whenever the potential representative of $$\frac{1}{\lambda}$$

is less than the potential of the high-λ bus 600 representative of the weighted average of $$\frac{1}{\lambda_{Gm}}$$

for all the sources, lower pulses will be routed to the relay for decrease in the generation of source 1. It will be understood that like circuits are provided for each of the other sources. A detailed description is believed unnecessary other than to identify them as the control circuits 612–615 for the respective sources 2–5.

In Fig. 16C the relay 616 is shown in the closed position for the routing of lower pulses by way of contacts 616*b* to the generation control 206B.

Since the contacts of relay 616 are closed, the voltage $$\frac{1}{\lambda_3}$$

will be equal to or less than the potential of the high-λ bus 600, thus indicating that the incremental cost of delivered power for the source 3 is higher than the average cost of delivered power as represented by the weighted potential at the bus 600. Accordingly, lower pulses will be delivered by way of contacts 616*b* to decrease generation of source 3. With the decreased generation, the value of the potential of $$\frac{1}{\lambda_3}$$

will increase and so will the potential on the high-λ bus 600. Because resistor 617 is shorted and removed from the circuits by contact 616*a*, increased weight is given to the change in λ for the source 3, and the potential of bus 600 will be affected to greater degree by change in generation of that source than by the generation levels of the other sources. With change of potential at the high-λ bus 600, another of the amplifiers will deenergize corresponding relays whenever the potential of the high-λ bus 600 is made equal to or greater than the respective potentials $$\frac{1}{\lambda_1}, \frac{1}{\lambda_2}, \text{etc.}$$

It will be remembered that the circuit for the "lower" relay 117 was traced through limit contacts 561*a* of limit relay 561. Thus, it will be seen that whenever the generation of source 1 attains its lower limit of generation, relay 561 will be energized to open the contacts 561*a* to interrupt the circuit of relay 117, and also to open contacts 561*b* to remove from the branch circuit the potential $$\frac{1}{\lambda_1}$$

applied to the high-λ bus 600. Thus, the $$\frac{1}{\lambda}$$

potentials which provide the average potential on the high-λ bus 600 are only those representative of the incremental costs of delivered power for the sources operating above the lower limits of their regulating range.

The described operation continues until there is attained generation values at which the incremental cost of delivered power from the respective sources will all be the same, except as limited by the maximum or minimum capability of each source, the condition of minimum cost of total delivered power. Thus, as the generation requirements on the system as a whole change, whether for increased generation or decreased generation, the system functions at all times to maintain equal-λ operation.

For a mathematical approach to the invention, there will now be presented a derivation of equations determining potential level of the high and low-λ busses.

Assume that there are five sources whose potential levels are representative of their respective $$\frac{1}{\lambda}$$

values. Since the high-λ bus will be the low-voltage bus, and since the low-λ bus will be the high-voltage bus, let us assume the following relationship to exist between the potentials of each source and the two λ busses:

$$e_1 > E_{L\lambda B} > e_2 > e_3 > e_4 > E_{H\lambda B} > e \qquad (25)$$

where $e_n$=potential level representative of $$\frac{1}{\lambda}$$

of each of the "*n*" sources, $E_{L\lambda B}$=potential level representative of weighted average of $$\frac{1}{\lambda}$$

for each source connected to the low-λ bus, $E_{H\lambda B}$=potential level representative of weighted average of $$\frac{1}{\lambda}$$

for each source connected to the high-λ bus.

Let $R$=resistance of resistors 563—571, $C$=ratio of resistance of resistors 564 to 563, 566 to 565, 572 to 571, $K$=ratio of resistance of resistor 577 to the sum of the resistance of series resistors (563+564)−(571+572).

Note that when $e_1 > E_{L\lambda B}$ contacts 583*a* will be closed, shorting resistor 564 and removing it from the circuit, and that if $E_{L\lambda B} > e_2 > e_3 > e_4 > e_5$ resistors 566, 568, 570 and 572 will not be shorted and will remain in the circuit.

The voltage drop between the low-λ bus 560 and conductor 555 along each of the source branches and along the shunt circuit containing the bridge circuit 573 and resistor 577 can be expressed by the following equations:

$$E_{L\lambda B} = e_1 - I_1 R \qquad (26)$$

$$E_{L\lambda B}=e_2-I_2(C+1)R \quad (27)$$

$$E_{L\lambda B}=e_3-I_3(C+1)R \quad (28)$$

$$E_{L\lambda B}=e_4-I_4(C+1)R \quad (29)$$

$$E_{L\lambda B}=e_5-I_5(C+1)R \quad (30)$$

$$E_{L\lambda B}=-K(C+1)I_sR \quad (31)$$

$$I_1+I_2+I_3+I_5+I_s=0 \quad (32)$$

where $I_1$, $I_2$, $I_3$, $I_4$ and $I_5$ are the branch circuits for the respective sources and $I_s$ is the shunt circuit current.

Solving the above set of simultaneous equations, we obtain the following expression for the potential level of the low-λ bus:

$$E_{L\lambda B}=\frac{K}{KC+5K+1}[(C+1)e_1+e_2+e_3+e_4+e_5] \quad (33)$$

Note that the term 5K in the denominator becomes ($n$K) when there are ($n$) sources. Also note that source 1 has a weight ratio of ($C+1$) to (1) in determining the potential level of the low-λ bus as would any other source whose potential level was equal to or above that of the low-λ bus.

When K is equal to 100 or more and C is equal to 10 or more, the potential level of the bus will closely approximate that of the source or sources having higher potential levels.

In a similar manner it can be shown that for the general case the potential level of the high-λ bus 600 for ($n$) sources is as follows, where there are $m$ sources having resistors shorted corresponding with resistor 604 of source 1:

$$E_{H\lambda B}=\frac{K}{mKC+nK+1}[e_1+e_2+\dots+(C+1)e_4+\dots+(C+1)e_{(n-1)}+e_n] \quad (34)$$

If other sources in addition to source 4 have potential levels lower than the potential level of the high-λ bus, they would also have a weight of ($C+1$) in determining the potential level of this bus, in which case the product of the constant terms KC in the denominator of Equations 33 and 34 would be multiplied by a factor equal to the number of sources having respectively a potential level higher or lower than the potential levels of the corresponding low-λ and high-λ busses.

In the several modifications of the invention, the same basic equations have been utilized in different ways. With a full understanding of the invention, many additional variations will occur to those skilled in the art. For example, features of one modification can be added to or omitted from other embodiments of the invention. The computer itself, functioning dynamically to provide computation of incremental transmission losses, the quantities of unity minus incremental transmission losses, incremental cost of generation and incremental cost of delivered power, may take various forms either of the analog type shown or of the digital type now in general use. The analog type is preferred on the basis of cost, speed and simplicity of operation.

While the mathematical basis of the present invention has been the subject of study over a period of years, a number of new concepts have been applied to the present invention which greatly extend its usefulness. They add greater flexibility and are more realistic in terms of actual operating conditions. Accordingly, there will now be presented a discussion of mathematical theory together with instructions for the determination of the "B" constants previously described.

*Total and incremental loss equations—Determination of loss equation constants*

The conventional electric power system loss equation as developed by others has the form:

$$P_L=B_{11}P_1^2+B_{22}P_2^2+\dots+B_{nn}P_n^2+2B_{12}P_1P_2+2B_{13}P_1P_3+2B_{23}P_2P_3+\dots 2B_{(N-1)(N)}P_{(N-1)}P_N \quad (35)$$

where $P_L$=total system $I^2R$ transmission losses,
$P_n$=power output of source "$n$."

Reference material relating to Equation 35:

| Publication | Volume | Year | Pages | Author | Title |
|---|---|---|---|---|---|
| AIEE Transactions | 62 | 1943 | 153-158 | E. E. George | "Intrasystem Transmission Losses." |
| Do | 69 | 1950 | 626-632 | J. B. Ward, J. R. Eaton, H. W. Hale. | "Total and Incremental Losses in Power Transmission Networks." |
| Do | 70 | 1951 | 1,197-1,204 | L. K. Kirchmayer and G. W. Stagg | "Analysis of Total and Incremental Losses in Transmission Systems." |
| AIEE Technical Paper 54-67. | | Dec. 1953 | | E. L. Harder, R. W. Ferguson, W. E. Jacobs, D. C. Harker. | "Loss Evaluation—II—Current—Power—Form Loss Formulas." |

The partial derivatives of Equation 35 give the incremental loss of each of the sources as shown below:

$$\frac{\partial P_L}{\partial P_1}=2B_{11}P_1+2B_{12}P_2+2B_{13}P_3+\dots+2B_{1N}P_N \quad (36)$$

$$\frac{\partial P_L}{\partial P_2}=2B_{22}P_2+2B_{21}P_1+2B_{23}P_3+\dots+2B_{2N}P_N \quad (37)$$

$$\frac{\partial P_L}{\partial P_N}=2B_{NN}P_N+2B_{N1}P_1+2B_{N2}P_2+\dots+2B_{(N)(N-1)}P_{(N-1)} \quad (38)$$

Various methods of determining the "B" constants of Equations 35 to 38 are described in the above references. All of them are determined from an A. C. Network Analyzer study of the electrical characteristics of the transmission system involving real and reactive power flows, load distribution, generator phase angles, source and load voltage levels, etc., for a single system load and for a single distribution of power supply by sources. In theory, it is claimed that the above loss Equations 35 to 38, derived from a study of a single system load, are applicable to any system load, based upon premises of the following type, most of which are unrealistic in terms of actual operation of the system.

($a$) All substation loads vary in proportion to total system load. (On most systems there will be substantial variation in load pattern between peak and valley conditions.)

($b$) The ratio of reactive power to real power of each power source remains constant. (An inverse variation of reactive power with real power is more common.)

($c$) Generator bus voltage phase angles are assumed to remain constant. (Actually such angles vary widely with changes in load pattern and generation and in fact such changes form the basis of still another method, to be explained later, of determining incremental transmission losses.)

In practice it has been found that total system losses given by Equation 35 with its constants determined by the methods described in the above references are accurate only for the single base condition of load and distribution of power supply and that errors of five percent or more are common when the generation pattern is changed but with no change in system load. With changes in system load and reactive power requirements the loss equation becomes more inaccurate. For improved accuracy utilizing the foregoing approach, separate sets of constants for various load levels and seasons of the year have been used in computing losses over a wide range of system loads and reactive conditions. This multiplicity of equations makes the practical application of prior methods to intermediate conditions very difficult and inaccurate.

Equation 35 for total system losses has little practical application, but Equations 36 to 38 giving incremental losses are at present on the threshold of finding widespread use in loading power sources for maximum economy of power supply. Unfortunately, there has been no satisfactory measure of the accuracy of the incremental transmission losses given by these equations. Inherently such incremental losses cannot be any more accurate than the total losses given by Equation 35, and it is certain that the error in the incremental loss of certain sources will be greater than the error in total system losses and will be correspondingly less for other sources. In fact, even for the base condition where Equation 35 is set equal to total system losses, it has been shown that the partial derivatives do not give the accurate incremental loss of each of the sources, the incremental losses being high for certain sources and low for others.

An extensive study of the conventional loss equation has convinced me that this equation in its present form is incapable of adequately representing both total system losses and incremental losses by sources over a wide range of system conditions and that satisfactory results can be obtained only by developing a plurality of such equations representing a wide range of system conditions, determining the incremental loss of each source for each such system condition for various source loadings and then developing a set of equations (a separate equation for each source) representing the incremental loss of each source over a wide range of system conditions expressed in terms of its own generation and the generation of all other sources plus any additional parameters that are found to be applicable.

In an AIEE Technical Paper, 54–65, December 1953, entitled "Co-ordination of Incremental Fuel Costs and Incremental Transmission Losses by Functions of Voltage Phase Angles," Mr. W. R. Brownlee discloses a method of determining the incremental transmission loss involved in the transfer of power from one power source to another power source. He has also developed a method of expressing the incremental loss from source to load of source ($m$) in terms of a known incremental loss from source ($n$) to load. I have applied the Brownlee method and the conventional loss equation to actual systems for various conditions of load, generation and reactive requirements, and on the basis of comparative results, the Brownlee method appears to be more accurate (based upon physical considerations).

In the Brownlee method, no assumptions are made relative to size of system load, distribution of system load by substations, ratio of reactive to real power or maintenance of constant generator phase angles as system load changes. Instead, it uses actual system loads and load pattern, actual reactive power generation and flows and is based upon the changes in source phase angles which actually occur as total generation, distribution of generation and load, and reactive power generation change.

However, the Brownlee method determines only the incremental transmission loss of one plant in terms of the incremental transmission loss of another plant. I have developed several methods of equating the Brownlee relative incremental transmission losses of each source to total system losses in order to obtain the absolute value of the incremental transmission loss of each source for a given condition. All of my newly developed methods are based upon the relationship that the summation of the incremental transmission loss of each source times its power output is equal to twice total system losses, a known quantity for each condition. (Equations 35 to 38 illustrate this relationship.)

There will now be presented my preferred method of determining incremental loss from source to load for each source directly from total sysetm $I^2R$ losses and functions of the voltage phase angles of the various sources based upon the Brownlee method of determining the incremental loss of transferring power from one source to another. In this method the incremental loss from any source "$j$" to load is expressed by the following equation $$\frac{\partial P_L}{\partial P_j}=\frac{2P_L+M_j}{P_T+M_j} \qquad (39)$$

where $P_L$=system total $I^2R$ transmission losses, $P_T=P_1+P_2+\ .\ .\ .\ +P_{(N-1)}+P_N$ $$M_j=P_1K_{1\leftarrow j}+P_2K_{2\leftarrow j}+\cdots+P_{(j-1)}K_{(j-1)\leftarrow j}+P_{(j+1)}K_{(j+1)\leftarrow j}+\cdots P_NK_{N\leftarrow j} \qquad (40)$$

where:

$$K_{m\leftarrow j}=\frac{4\left(\frac{X}{R}\right)_{m\leftarrow n}\tan\frac{1}{2}\theta_{n\rightarrow m}}{\left[\left(\frac{X}{R}\right)_{m\leftarrow n}-\tan\frac{1}{2}\theta_{n\rightarrow m}\right]^2} \qquad (41)$$

$\theta_{n\rightarrow m}$=Phase angle by which sending source ($n$) leads receiving source ($m$);

$\left(\frac{X}{R}\right)$=Reactance-resistance ratio of transfer impedance between sources ($m$) and ($n$); and $$\left[\left(\frac{X}{R}\right)_{m\leftarrow n}=\left(\frac{X}{R}\right)_{n\rightarrow m}\right]$$

(The arrows in the subscripts indicate direction in which power is being transmitted between plants.)

*Derivation of Equation 39*

In the Brownlee method, it is shown that the incremental loss incurred in transferring power from one source to another expressed in terms of power received is given by the following equation for the one-step method.

$$\frac{dP_L}{dP_R}=\frac{2\tan\theta}{\frac{X}{R}-\tan\theta} \qquad (42)$$

where $\theta$ is the phase angle by which the voltage of the sending source leads the voltage of the receiving source. (See Equation 8 of the AIEE Technical Paper 54—65—Brownlee). In the two-step method, this equation becomes $$\frac{dP_L}{dP_m}=\frac{4\left(\frac{X}{R}\right)_{m\leftarrow n}\tan\frac{1}{2}\theta_{n\rightarrow m}}{\left[\left(\frac{X}{R}\right)_{m\leftarrow n}-\tan\frac{1}{2}\theta_{n\rightarrow m}\right]^2} \qquad (43)$$

where $\theta_{n\rightarrow m}$=Phase angle by which sending source ($n$) leads receiving source ($m$), $\left(\frac{X}{R}\right)_{m\leftarrow n}$=Reactance-resistance ratio of transfer impedance between sources ($m$) and ($n$).

$$\left[\left(\frac{X}{R}\right)_{m\leftarrow n}=\left(\frac{X}{R}\right)_{n\rightarrow m}\right]$$

(Note—See Equation 13 of the AIEE Technical Paper 54—65—Brownlee.)

Expressing Equation 16 of the Brownlee paper in terms of receiving end power, $$\frac{dP_L}{dP_m}=\frac{\frac{\partial P_L}{\partial P_n}-\frac{\partial P_L}{\partial P_{mn}}}{1-\frac{\partial P_L}{\partial P_n}} \quad (44)$$

Therefore, by equating Equations 43 and 44, $$K_{m\leftarrow n}=\frac{\frac{\partial P_L}{\partial P_n}-\frac{\partial P_L}{\partial P_m}}{1-\frac{\partial P_L}{\partial P_n}} \quad (45)$$

where $$K_{m\leftarrow n}=\frac{4\left(\frac{X}{R}\right)_{m\leftarrow n}\tan\frac{1}{2}\theta_{n\rightarrow m}}{\left[\left(\frac{X}{R}\right)_{m\leftarrow n}-\tan\frac{1}{2}\theta_{n\rightarrow m}\right]^2} \quad (46)$$

and $$\frac{\partial P_L}{\partial P_m}=\frac{\partial P_L}{\partial P_n}(1+K_{m\leftarrow n})-K_{m\leftarrow n} \quad (47)$$

Starting with source $(m)$ and continuing source by source, the incremental loss of each source can be expressed in terms of the incremental loss of source $(m)$ by means of Equation 47, as follows:

$$\frac{\partial P_L}{\partial P_{(m+1)}}=\frac{\partial P_L}{\partial P_m}(1+K_{(m+1)\leftarrow m})-K_{(m+1)\leftarrow m} \quad (48)$$

$$\frac{\partial P_L}{\partial P_{(m+2)}}=\frac{\partial P_L}{\partial P_m}(1+K_{(m+2)\leftarrow m})-K_{(m+2)\leftarrow m} \quad (49)$$

et cetera.

Substituting equations of the type of Equations 48 and 49 for the incremental loss of each source in the relationship, $$\frac{\partial P_L}{\partial P_1}P_1+\frac{\partial P_L}{\partial P_2}P_2+\ldots+\frac{\partial P_L}{\partial P_N}P_N=2P_L \quad (50)$$

we obtain $$\frac{\partial P_L}{\partial P_1}P_1+\frac{\partial P_L}{\partial P_1}(1+K_{2\leftarrow 1})P_2-K_{2\leftarrow 1}P_2+\ldots+\frac{\partial P_L}{\partial P_1}(1+K_{N\leftarrow 1})P_N-K_{N\leftarrow 1}P_N=2P_L \quad (51)$$

which when the terms are rearranged produces equations of the following type $$\frac{\partial P_L}{\partial P_1}=\frac{2P_L+K_{2\leftarrow 1}P_2+K_{3\leftarrow 1}P_3+\ldots+K_{N\leftarrow 1}P_N}{P_T+K_{2\leftarrow 1}P_2+K_{3\leftarrow 1}P_3+\ldots+K_{N\leftarrow 1}P_N} \quad (52)$$

$$\frac{\partial P_L}{\partial P_2}=\frac{2P_L+K_{1\leftarrow 2}P_1+K_{3\leftarrow 2}P_3+\ldots+K_{N\leftarrow 2}P_N}{P_T+K_{1\leftarrow 2}P_1+K_{3\leftarrow 2}P_3+\ldots+K_{N\leftarrow 2}P_N} \quad (53)$$

$$\frac{\partial P_L}{\partial P_j}=\frac{2P_L+K_{1\leftarrow j}P_1+\ldots+K_{(j-1)\leftarrow j}P_{(j-1)}+K_{(j+1)\leftarrow j}P_{(j+1)}+\ldots+K_{N\leftarrow j}P_N}{P_T+K_{1\leftarrow j}P_1+\ldots+K_{(j-1)\leftarrow j}P_{(j-1)}+K_{(j+1)\leftarrow j}P_{(j+1)}+\ldots+K_{N\leftarrow j}P_N} \quad (54)$$

where $P_T=P_1+P_2+\ldots+P_N$

Substituting relation 40, one obtains:

$$\frac{\partial P_L}{\partial P_j}=\frac{2P_L+M_j}{P_T+M_j} \quad (39)$$

Equation 39 has interesting and important connotations. The ratio $$\frac{2P_L}{P_T}$$

is the incremental transmission loss for the entire system. Equation 39 says that the incremental loss of any source is the system incremental loss ratio to which has been added to both numerator and denominator a constant $(M_j)$, which constant, Equation 40, is a summation of a function of the power output of every other source and the phase angle between the voltages of such other sources and the subject source. When all sources are operating at the same phase angle $(M_j)$, becomes zero since $$\left(\tan\frac{1}{2}\theta_{n\rightarrow m}\right)$$

becomes equal to zero. Under this condition the incremental loss of each source is equal to the system incremental loss and all sources have the same incremental loss which is the condition for minimum system transmission losses. This relationship has been known to exist for some time (see "Evaluation of Methods of Co-ordinating Incremental Fuel Costs and Incremental Transmission Losses," L. K. Kirchmayer, G. W. Stagg, AIEE Transactions, vol. 71, 1952, Part III, pages 513–520) and has been demonstrated on the A. C. Calculating Board within the limits of the accuracy of such equipment. However, I believe I am the first to provide a mathematical derivation of the relationship between source phase angles and system transmission loss.

*The least squares method of determining the constants for the total transmission loss equation*

The conventional loss equation has $$\left(\frac{N^2+N}{2}\right)$$

terms (where $N$=number of sources). Consequently, if we have $$\left(\frac{N^2+N}{2}\right)$$

or more cases of system loads and power supply by sources together with system $(I^2R)$ losses for each case as determined from an A. C. Network Analyzer study, it is possible to determine the one and only set of values of the loss equation constants which will best satisfy the data. It is important to call attention to the fact that in practice more cases than $$\left(\frac{N^2+N}{2}\right)$$

cases should be used in determining loss equation constants by this method to minimize minor inaccuracies arising from the reading of the power output of the various sources or the $(I^2R)$ losses. Unless minimized, such inaccuracies can seriously distort some of the loss equation constants. When the number of cases made available is greater than $$\left(\frac{N^2+N}{2}\right)$$

an equation is first set up for each case. These equations are then normalized by conventional methods and reduced in number to $$\left(\frac{N^2+N}{2}\right)$$

the number of unknowns in the loss equation. The solution of the normalized equations will give loss equation constants that best fit the data, by which is meant that the sum of the squares of the deviations between computed and test data values will be a minimum. This method is known as the method of "Least Squares" and is a widely used tool in statistical analysis of test data. The use of this method substantially reduces the distorting effect of inaccuracies in the data.

In order to establish a comparison of the results which may be obtained from the several methods thus far described, advantage was taken of a study of an actual system made on an A. C. Network Analyzer. A total of eight cases were studied, all of which were for the same total load and same distribution of load at distribution centers or substations with only the power supply by the sources varied. The basic data used in and obtained from this study will now be presented.

TABLE I

| Case Number | Generation in Megawatts | | | Voltage Phase Angle in Degrees | | | System $I^2R$ Losses, Megawatts |
|---|---|---|---|---|---|---|---|
| | Source 1 | Source 2 | Source 3 | Source 1 | Source 2 | Source 3 | |
| 1 | 129 | 102 | 60 | 0 | +1.0 | +20.0 | 9.23 |
| 2 | 148 | 100 | 41 | 0 | 0 | +0.5 | 5.73 |
| 3 | 156 | 101 | 35 | 0 | 0 | +7.0 | 6.15 |
| 4 | 156 | 78 | 60 | 0 | −4.0 | +19.0 | 10.13 |
| 5 | 131 | 125 | 35 | (*) | (*) | (*) | 6.84 |
| 6 | 81 | 159 | 59 | (*) | (*) | (*) | 13.07 |
| 7 | 130 | 90 | 85 | 0 | −1.0 | +53.0 | 22.91 |
| 8 | 108 | 113 | 86 | (*) | (*) | (*) | 24.20 |

*Phase angles were not read for these cases.

Utilizing the data in the above table for an actual system including three power sources and applying the applicable equations, there will be presented in the following Table II a comparison of the incremental transmission losses as determined by three different methods. In the following table, the designation "Conventional" refers to the incremental transmission losses as determined by the partial derivatives of the conventional loss Equation 35 developed for this system. The heading "Brownlee-Early" shows the incremental transmission losses as determined by the Brownlee phase angle method and Equation 39. The heading "Least Squares" refers to incremental transmission losses as determined by the partial derivatives of the total transmission loss Equation 35 in which the $B_{mn}$ constants are determined by least squares fitting of this Equation to the total system $I^2R$ losses.

TABLE II

| Case No. | Incremental Transmission Loss (Percent) | | | | | | | | |
|---|---|---|---|---|---|---|---|---|---|
| | Source 1 | | | Source 2 | | | Source 3 | | |
| | Conventional | Brownlee Early | Least Squares | Conventional | Brownlee Early | Least Squares | Conventional | Brownlee Early | Least Squares |
| 1 | 2.42 | −0.50 | −1.31 | −1.47 | 1.00 | −.42 | 28.01 | 30.14 | 34.66 |
| 2 | 6.30 | 3.85 | 4.21 | 1.82 | 3.84 | 3.36 | 6.03 | 4.70 | 4.99 |
| 3 | 7.67 | 5.73 | 6.12 | 3.03 | 5.74 | 4.76 | −1.48 | −6.96 | −5.14 |
| 4 | 5.40 | 2.65 | 1.44 | −5.45 | −3.53 | −4.19 | 30.05 | +31.49 | 34.73 |
| 5 | 4.86 | (*) | 3.55 | 6.97 | (*) | 8.50 | −3.74 | (*) | −5.60 |
| 6 | −3.11 | (*) | −6.17 | 7.84 | (*) | 8.56 | 20.30 | (*) | 29.91 |
| 7 | −0.01 | −3.25 | −6.03 | −8.44 | −4.97 | −7.80 | 57.10 | +64.13 | 71.84 |
| 8 | −2.64 | (*) | −8.50 | −4.92 | (*) | −4.46 | 55.78 | (*) | 72.39 |

*Not available since source phase angles were not read for these cases.

I have developed a method of determining the "B" constants for a set of "$n$" independent equations giving the incremental loss of each source directly from incremental loss values for each source for various system loads obtained either from the partial derivatives of the conventional loss equation developed for each of such loads, or by the Brownlee-Early method, or by any other method that may be developed in the future. These equations are not based upon any assumptions as to the variation of substation loads with total system load or with the variation of reactive power with real power, since they are determined from incremental losses determined for various actual system conditions. This is possible since instead of having a single loss equation whose partial derivatives give the incremental loss of each source, there are "$n$" independent equations, each of which is determined to represent the incremental loss of a single source over a wide range of system conditions.

*The new incremental transmission loss equations*

It has been previously stated that experience in applying the conventional loss Equation 35 to various system conditions and to different systems has shown that this equation and its partial derivatives are not capable of adequately representing both total system ($I^2R$) losses and incremental transmission losses of each source over a wide range of system conditions. However, if a different loss equation is developed for each of several representative system loads, load patterns, and reactive power requirements and if conventional assumptions are judiciously made, incremental transmission loss values for each source for the several representative system conditions can be determined with an acceptable degree of accuracy. Also corresponding incremental transmission loss values can be determined by the Brownlee-Early method, explained above, without the necessity of making any assumptions regarding variation of load pattern with system load, ratio of reactive power to real power, etc. A comparison of the two sets of incremental transmission loss values together with system physical considerations will permit the selection of a set of incremental transmission loss values having a degree of accuracy adequate for practical application in the economic loading of power sources.

Having determined incremental loss values for each source for a representative set of system conditions, it is then necessary to develop a type of equation that will adequately represent the incremental loss values of a source in terms of known system quantities over a wide range of system conditions. It has been found by experiment that a set of equations of the type of Equations 4 to 6, column 9, lines 53–61 will meet this objective with a high degree of accuracy. These equations are:

$$\frac{\partial P_L}{\partial P_1}=2B_{11}P_1+2B_{12}P_2+\cdots+2B_{1N}P_N+B_{10} \qquad (55)$$

$$\frac{\partial P_L}{\partial P_2}=2B_{22}P_2+2B_{21}P_1+\cdots+2B_{2N}P_N+B_{20} \qquad (56)$$

$$\frac{\partial P_L}{\partial P_N}=2B_{NN}P_N+2B_{N1}P_1+\cdots+2B_{N(N-1)}P_{(N-1)}+B_{NO} \qquad (57)$$

where $B_{mn}\neq B_{nm}$.

It will be noted that the above equations are similar to the partial derivatives of the conventional loss Equation 2 except that the constants of the mutual terms are not symmertical ($B_{mn}\neq B_{nm}$ and that a constant $B_{NO}$ has been added to each equation.

Determination of the constants of Equations 4 to 6 and 55 to 57 requires incremental loss values fo reach source for $(N+1)$ different system conditions. However, for reasons previously explained, it is essential that data for additional cases be obtained and used in order to make negligible the distorting effect of minor inaccuracies in the data. It is also desirable that sufficient cases be studied on the A. C. Network Analyzer so that a wide range of system loads and conditions and a variation in the power output of each source be adequately represented. It should be kept in mind that Equations 4 to 6 and 55 to 57 are empirical and consequently the cases used should represent the maximum and minimum system loads and power supply by sources likely to be encountered in operation in order that in the use of the equations there will be involved a process of interpolation rather than extrapolation.

It is recognized that the empirical equations representing incremental losses for each source cannot be considered as a system of partial derivatives and solved to obtain an equation representing total system losses since such a solution of these equations is impossible, there being no single equation whose partial derivatives would be equal to Equations 4 to 6 or 55 to 57. This fact confirms the previous statement that the total system loss equation is not adequate to represent both total system loss and the incremental loss of each source over a wide range of system conditions.

In order to insure the highest degree of accuracy of the incremental loss values determined by the equations, it is desirable that equations representing total system losses for each case be included with the incremental transmission loss equations when solving for the constants. In order to do this, it is necessary to express the total system loss equation in the following form:

$$P_L = B_{11}P_1^2 + \ldots + B_{NN}P_N^2 + B_{12}P_1P_2 + B_{21}P_1P_2 + \ldots + B_{(N-1)N}P_{(N-1)}P_N + B_{N(N-1)}P_{N-1}P_N \quad (58)$$

(Note that the constant terms $B_{NO}$ of Equations 55 to 57 are not included; also, the term $2B_{mn}P_mP_n$ of Equation 35 has been divided into $(B_{mn}P_mP_n + B_{nm}P_mP_n)$, where $B_{mn} \neq B_{nm}$.)

Inclusion of equations representing total system losses in solving for the "B" constants not only insures that the incremental losses computed from Equations 55 to 57 will satisfy the following relationship between incremental losses and total system losses with a reasonable degree of accuracy, $$\frac{\partial P_L}{\partial P_1}P_1 + \frac{\partial P_L}{\partial P_2}P_2 + \cdots + \frac{\partial P_L}{\partial P_N}P_N = 2 \times P_L \quad (59)$$

but also has a strong tendency to bring into line incremental loss values which are out of line.

The A. C. Network Analyzer data for $(N+1)$ cases for a system peak load and $(N+1)$ cases for a system valley load condition (where $N$=number of sources) are considered a minimum for acceptable accuracy in determining the "B" constants. Since there are only $(N+1)$ unknowns in these equations, the $2(N+1)$ or more equations are normalized and reduced to $(N+1)$ equations. The solution of the $(N+1)$ normalized equations provides computed values for both system loss and the incremental loss of each source which best fits the test data (that is, the sum of the squares of the deviations of computed values from test data values of both total system loss and incremental transmission loss of each source will be a minimum).

The following tabulation shows the "B" constants for the incremental loss equations determined in the above-described manner (using the Brownlee-Early incremental loss and system $I^2R$ loss values shown in Table II for the above-assumed example).

| | Constant | Source 1 | Source 2 | Source 3 |
|---|---|---|---|---|
| The Self-Constants | $B_{11}$ | +.041537 | | |
| | $B_{22}$ | | +.074623 | |
| | $B_{33}$ | | | +.633436 |
| The Mutal Constants | $B_{12}$ | −.012141 | | |
| | $B_{21}$ | | −.010510 | |
| | $B_{13}$ | −.069470 | | |
| | $B_{31}$ | | | −.034222 |
| | $B_{23}$ | | −.093904 | |
| | $B_{32}$ | | | −.118413 |
| The Added Constants | $B_{10}$ | −.001548 | | |
| | $B_{20}$ | | −.000665 | |
| | $B_{30}$ | | | +.000322 |

and the following tabulation shows the total system loss and incremental transmission loss values computed from Equations 55, 56 and 57:

| Case Number | Computed Values | | | | Test Data $I^2R$ Loss |
|---|---|---|---|---|---|
| | $\frac{\partial P_L}{\partial P_1}$ | $\frac{\partial P_L}{\partial P_2}$ | $\frac{\partial P_L}{\partial P_3}$ | Total Loss from Eq. (59) | |
| 1 | −.25 | 1.18 | 30.16 | 9.49 | 9.23 |
| 2 | 4.02 | 4.05 | 3.36 | 5.68 | 5.73 |
| 3 | 5.49 | 5.15 | −5.82 | 5.87 | 6.15 |
| 4 | 2.57 | −2.97 | 31.29 | 10.24 | 10.13 |
| 5 | 2.83 | 9.26 | −7.30 | 6.37 | 6.84 |
| 6 | −5.48 | 10.88 | 23.48 | 13.36 | 13.07 |
| 7 | −3.35 | −5.33 | 64.50 | 22.84 | 22.91 |
| 8 | −5.88 | −1.62 | 61.03 | 23.44 | 24.20 |

Incremental loss values obtained from a set of conventional loss equations representing a wide range of system conditions could be used instead of the Brownlee-Early incremental loss values or any other set of predetermined incremental loss values for each source covering a wide range of system conditions could be used in determining the "B" constants for Equations 55 to 57.

Having now determined the numerical values of the "B" constants together with the correct signs therefor, the resistor values for the computer networks and the correct relative connections of the secondary windings of the transformers may be readily determined. When the numerical values of the "B" constants are quite small, resistors for values at or near zero need not be included in the computer. The self "B" constants are always positive, but the mutual "B" constants and the "added" constants may be either positive or negative or zero.

In the above description and in the claims, reference has been made to series-circuits. For example, one group in Fig. 1 includes the series-connected resistors, to which series-circuits there are respectively applied the voltages $e_1$–$e_3$. Another group of series-circuits includes the summing circuits which have effectively applied to them the potentials of the secondary windings of transformers $T_{11}$–$T_{13}$ and $B_{10}$. In Fig. 3 the summing circuits are disclosed as literally including the resistors $R_{11}$, $R_{12}$ and $R_{13}$ in series-circuit relation upon closure of the switches 221 and 222, whereas in Fig. 1 the resistors $R_{11}$–$R_{13}$ are effectively in series through the isolating transformers.

Electrically the computer of Fig. 4 is the equivalent of the computing means of Figs. 1 and 3, though in Fig. 4 there have been utilized a plurality of transformers each having a single primary winding and a plurality of secondary windings excited by the same flux. Thus, each transformer with the single primary winding and the plurality of secondary windings effectively forms a series-circuit in which the circuit components are effectively in series one with the other. Similarly, in the summing circuits which include the secondary windings, the resistors in circuit therewith are in series one with the other, each summing circuit including a secondary winding of a different one of the transformers. Thus, in the claims where reference is made to the respective groups of series-circuits, it is to be understood such claims are intended to cover computing systems which are equivalent one to the other and of which the modifications of Figs. 1, 3, 4 and 11 may be taken as exemplary.

A further modification illustrative of obvious variations involves adjustment of slidewire contacts 131*a*, 132*a* and 133*a* of Figs. 2 and 2A in response to actual generation, as through mechanical connections corresponding with connection 209 for source 1 and omitting the connection 182. Thus, the incremental transmission losses will be computed on the basis of actual generation, while the incremental costs of generation will be based on computed values of generation. This arrangement is preferred over those of Figs. 2 and 2A.

While explanation has already been made as to how there is taken into account a plurality of generators in a single station of similar or dissimilar characteristics between incremental costs of generation and power output (generation), further brief mention of this aspect will be made in connection with Figs. 14–16C. Where a station has generators which are dissimilar, the circuit of Fig. 16A from the output of the computing means 25A will be duplicated. Thus, there will be resistors corresponding with resistors 551, 552 and 553 for each generator connected in parallel circuits with separate circuits the duplicate of that extending from resistor 551 for each said generator. The duplication of circuits will be continued to the final control means as shown in Figs. 16B—16C. Each generator will be provided with its own wattmeter and with a mechanical drive for a slidewire in its column of the computer, such connection also adjusting the contact of the resistor corresponding with resistor 553. The slidewires in the column of the computer will be connected in series with each other (from contact to resistor) and the source, the voltage, such as $e_1$, being their sum and representative of total actual generation of the station.

Where the generators at a station have similar characteristics, then in Fig. 16A, the rheostat corresponding with resistor 553 will have a resistance value equal to $$\frac{1}{N_i}$$

times the resistance for one unit. This value can be readily attained by providing variable resistors equal to the number of identical units in operation in parallel in place of the adjustable resistor 553, or its counterpart for other stations. Switching means for such shunting resistors will be used when there is a change in the number of generators in operation at a station.

The foregoing will be readily seen by rewriting Equation 16 in the following form:

$$\frac{1}{\lambda_n}=\frac{1-\frac{\partial P_L}{\partial P_n}}{CK+\frac{CP}{N_i}} \qquad (16B)$$

it being remembered that $$\frac{dF_n}{dP_n}=\lambda_n\left(1-\frac{\partial P_L}{\partial P_n}\right) \qquad (16A)$$

Figure 1A:
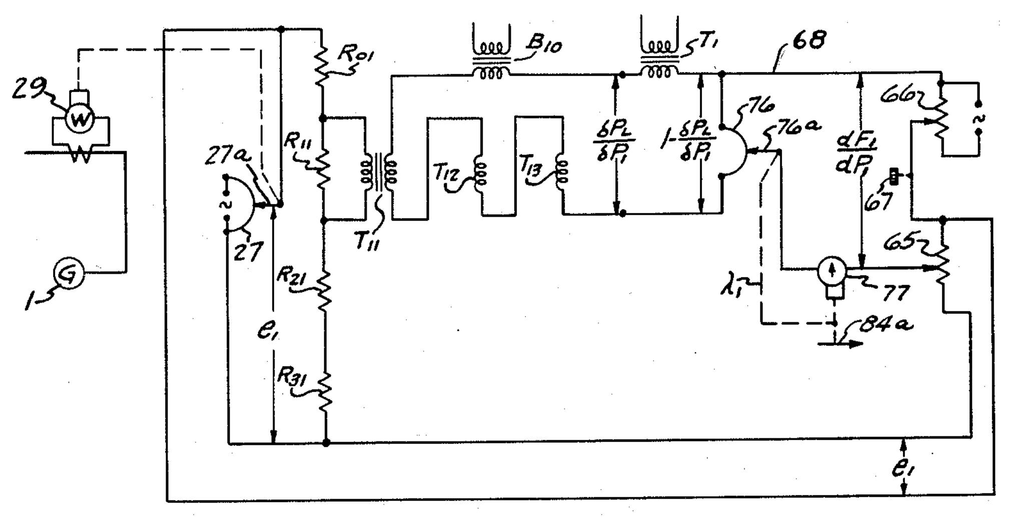
Fig. 1A is a simplification of part of Fig. 1.

Throughout the several modifications of the invention, loop circuits can be found. Such a circuit has been illustrated in Fig. 1A (Sheet 2) of the system of Fig. 1. The wattmeter 29 adjusts the voltage-modifying means or slidewire contact 27*a* to apply to the first column of the computer network the voltage $e_1$ representative of the actual level of generation of the source 1. By means of the summing circuit there is produced at the output terminals of the computer network a voltage representative of the incremental transmission loss for source 1. The detector 36 and the slidewire 37 of Fig. 1 is in effect a re-transmitter inasmuch as the voltage $e_6$ of Fig. 1 is also equal to the incremental transmission loss. Accordingly, in Fig. 1A the circuit is illustrated as continuous and as including the transformer $T_1$. The voltage labeled in Fig. 1A $$\left(1-\frac{\partial P_L}{\partial P_1}\right)$$

corresponds in magnitude with the voltage $e_{10}$ of Fig. 1.

It will be recalled that the voltage developed by the slidewire 64 in Fig. 1 is representative of the actual level of generation of source 1. Accordingly, in Fig. 1A the same generation-representing voltage $e_1$ obtained from slidewire 27 has been shown applied directly across potentiometer resistor 65. This potentiometer 65 in conjunction with potentiometer 66 produces the voltage of magnitude representative of $$\left(\frac{dF}{dP}\right)$$

the incremental cost of generating power at source 1. Thus, while in Fig. 1 the loop circuit is completed in part by electromechanical means, in the equivalent circuit of Fig. 1A the loop circuit is entirely electrical. The detector 77 in both Figs. 1 and 1A produces a positional output for slidewire contact 76*a* corresponding with the incremental cost of generating power at source 1. In manner earlier described, the actual generation of the one or more sources is varied until λ, the ratio of $$\frac{dF}{dP}$$

to $$\left(1-\frac{\partial P_L}{\partial P_1}\right)$$

corresponds in magnitude to like ratios of the remaining sources. Electrically considered, the slidewire contact 76*a* is moved to a position where the voltage between it and conductor 68 is equal to the voltage representing $$\frac{dF_1}{dP_1}$$

Thus the slidewire 76 and its contact 76*a* represent a voltage-modifying means for taking a fraction of the voltage $$\left(1-\frac{\partial P_L}{\partial P_1}\right)$$

which is made equal to the voltage $$\frac{dF_1}{dP_1}$$

by the operation of detector 77.

The foregoing concept of the invention has been utilized in certain of the claims.

In the claims appended hereto I have broadly claimed my invention and have included claims generic to all modifications. However, I have not presented claims specifically directed to the equal-λ multiplier 140 included in the modification of Fig. 2. In that modification voltages representative of computed levels of generation are applied to the computer 25 instead of voltages representing actual generation levels. I have not presented claims specific to the manner in which total change in generation is obtained from networks 172 and 181 for operation of the equal-λ multiplier 140 and the manner in which like networks in Fig. 2A are utilized to change the potential applied to conductors 210*a* and 210*b*. I am informed and believe that the foregoing features not specifically claimed herein have been claimed by William G. Miller in a copending application, Serial No. 450,025, filed August 16, 1954. However, the remaining features shown and described in connection with Figs. 2 and 2A I do claim as part of my invention.

What is claimed is:

1. In a power system including a plurality of interconnected transmission lines to which there are connected a plurality of power sources, means for determining the loading of said power sources comprising a plurality of series-circuits, each including a plurality of circuit components, a plurality of energizing means, each said energizing means providing an energizing medium for one only of said components of each of said series-circuits, the impedances of said circuit components having values for collectively inter-relating values of power generation of said sources and incremental transmission losses of said sources for determination of one of them by each of said series-circuits upon magnitudes of energization of said components by said energizing means representative of the magnitudes of the other of them, and means operable with change in loading of said power system for changing the outputs of said energizing means.

2. The combination set forth in claim 1 in which said first-named means includes additional circuits and circuit components, at least one of which is adjustable with said changes in loading of said power system for producing output signals representative of the incremental cost of generation of power at each of said sources for combination with output signals from said series-circuits in determination of the incremental cost of delivered power for optimum loading of said sources.

3. The combination set forth in claim 2 in which said adjustable one of said circuit components when adjusted introduces a variable changing in accordance with a characteristic curve relating incremental cost of generation and change in power at each said source, said adjustable circuit component having provisions for establishing changes in each said variable, each in accordance with its corresponding characteristic curve, said curves ranging from linear to curvilinear and including discontinuous functions.

4. The combination set forth in claim 1 in which said first-named means includes additional circuits and circuit components, at least one of which for each source is adjustable in accordance with a changed level of generation, and means for combining output signals from said first-named means including said plurality of series-circuits and from said additional circuits for determination of incremental cost of delivered power from each of said sources whereby the generation at each of said sources may be adjusted for equal incremental costs of delivered power.

5. The combination set forth in claim 4 in which there are provided generation-raising and generation-lowering circuits for each said source, and means operable under the control of said first-named means for selectively energizing said last-named circuits for changing the generation of selected sources in sense and in magnitude to maintain equalization among the sources of incremental cost of delivered power therefrom upon change of generation in the system as a whole.

6. In a system for the determination of the loading of power sources interconnected by transmission lines, the combination of computing means having first and second groups of series-circuits, each said series-circuit including a plurality of circuit components effectively in series one with the other, a different one of the circuit components of each series-circuit in said first group being connected in each of said series-circuits of said second group, the impedances of said circuit components having values for collectively inter-relating power generation of said sources and incremental transmission losses of said sources for determination of one of them by said first group of said series-circuits upon application to said second group of said series-circuits of signals representative of the magnitudes of the other of them, means for applying said signals respectively to said series-circuits of said second group, and circuit means included in each of said series-circuits of one of said groups for modifying by a constant the magnitude of signals developed in each said series-circuit of the other of said groups for more accurate representation of incremental transmission losses.

7. The combination of claim 6 in which said circuit means additionally modifies the magnitude of said signals developed in each said series-circuit of said first group to make them respectively representative of the quantities unity minus the incremental transmission loss of each said source.

8. The combination set forth in claim 7 in which said computing means includes additional circuits and circuit components, at least one of which is adjustable in accordance with changed generation levels of said sources for producing output signals representative of the incremental cost of generation of power at each of said sources in determination of optimum loading of said sources.

9. The combination set forth in claim 8 in which means are provided for producing from said signals developed in each said series-circuit of said first group and from said additional circuits generation-control signals of magnitude and direction for adjustment of generation of the respective sources for equality in incremental costs of delivered power therefrom.

10. The combination set forth in claim 9 in which there are provided generation-raising and generation-lowering circuits for each said source, and means operable in response to said generation-control signals for selectively energizing said last-named circuits for changing the generation of selected of said sources for maintaining equalization of incremental costs of delivered power therefrom.

11. In power generating and distributing systems of the type having a plurality of power sources interconnected by transmission lines, the combination of a computing network having interconnected circuit components for developing first voltages and second voltages respectively inter-relating given levels of generation of said sources and quantities having magnitudes dependent upon the magnitudes of the incremental transmission loss for each of said sources at said given levels of generation and for developing third voltages related to the incremental cost of generating power at each said source at said given levels, said second and third voltages representing the variable affecting incremental cost of delivered power, and said circuit components including voltage-modifying means included in said network at points intermediate those at which said second and thid voltages are respectively developed and adjustable to intorduce into said network a voltage-modifying effect representative of incremental cost of power delivered at said given level of generation.

12. In a system for the determination of the loading of power sources interconnected by transmission lines, the combination of computing means having first and second groups of series-circuits, each said series-circuit including a plurality of circuit components effectively in series one with the other, a different one of the circuit components of each series-circuit in said first group being connected in each of said series-circuits of said second group, the impedances of said circuit components having values for collectively inter-relating power generation of said sources and incremental transmission losses of said sources for determination of one of them by said first group of said series-circuits upon application to said second group of said series-circuits of signals representative of the magnitudes of the other of them, means for applying said signals respectively to said series-circuits of said second group, and circuit means included in each of said series-circuits of one of said groups for modifying by a constant the magnitude of signals developed in each said series-circuit of said first group, said computing means including other circuit components for each of said sources, at least one of which is adjustable with change in generation level for each source for introducing a circuit-varying effect related to the incremental cost of generating power at each said source, said computing means including at least one other circuit component for each said source included at points intermediate each said series-circuit of said first group and each of said additional components for producing outputs representative of incremental costs of power delivered from each said source.

13. In a system for the determination of the loading of power sources interconnected by transmission lines, the combination of computing means having first and second groups of series-circuits, each said series-circuit including a plurality of circuit components effectively in series one with the other, a different one of the circuit components of each series-circuit in said first group being connected in each of said series-circuits of said second group, the impedances of said circuit components having values for collectively inter-relating power generation of said sources and incremental transmission losses of said sources, means for applying input signals to said series-circuits of said second group for development of outputs at each of said series-circuits of said first group, circuit means included in each of said series-circuits of said first group for modifying by a constant the outputs thereof for production of voltages representative of the quantities unity minus incremental transmission loss for each said source, said computing means including other circuit components relating the incremental cost of generating power to the generation level thereof at each said source for developing second voltages, and other circuit components including voltage-modifying means included in said computing means at points intermediate those at which said two voltages are respectively developed and adjustable to introduce into said computing means a voltage-modifying effect representative of incremental cost of power delivered by each said source.

14. In a system for the determination of the loading of power sources interconnected by transmission lines, the combination of computing means having first and second groups of series-circuits, each said series circuit including a plurality of circuit components effectively in series one with the other, a different one of the circuit components of each series-circuit in said first group being connected in each of said series-circuits of said second group, the impedances of said circuit components having values for collectively inter-relating power generation of said sources and incremental transmission losses of said sources, means responsive to actual generation of each of said sources for applying input signals respectively to each of said series-circuits of said second group for developing output signals from each of said series-circuits of said first group, and circuit means included in each of said series-circuits of said first group for modifying by a constant the magnitude of said signals developed therein to make them more representative of the incremental transmission loss of each of said power sources.

15. In power generating and distributing systems of the type having a plurality of power sources interconnected by transmission lines, the combination of a computing network having circuit components energized in accordance with a given level of generation for developing first voltages representative of quantities having magnitudes dependent upon the magnitudes of the incremental transmission loss for each of the power sources at said given level of generation and for developing second voltages related to the incremental cost of generating power at each said source at said given level, said voltages representing the variables affecting incremental cost of delivered power, voltage-modifying means included in said network at points intermediate those at which said voltages are respectively developed and adjustable to introduce into said network a voltage-modifying effect representative of incremental cost of power delivered at said given level of generation, control means responsive to a change in load on the system, means operable in accordance with the operation of said control means for varying the power generation by said sources until the total change in generation satisfies the total change in load on the system, and generation-control means for each said source operable upon change of adjustment of said voltage-modifying means for subdividing among said sources said total change in generation to satisfy said change in load to provide substantial equality among said sources of the incremental cost of power delivered by them at their changed generation levels.

16. In power generating and distributing systems of the type having a plurality of power sources interconnected by transmission lines, the combination of a computing network having circuit components energized in accordance with a given level of generation for developing first voltages representative of quantities having magnitudes dependent upon the magnitudes of the incremental transmission loss for each of the power sources at said given level of generation voltage-modifying means operable to relate the incremental cost of generating power at each said source to said given level of generation, voltage-modifying means included in said network for introducing a voltage-modifying effect representative of incremental cost of power delivered at said given level of generation, control means responsive to a change in load on the system, means operable in accordance with the operation of said control means for varying the power generation by said sources until the total change in generation satisfies the total change in load on the system, and generation-control means for each said source operable upon change of adjustment of said voltage-modifying means for subdividing among said sources said total change in generation to satisfy said change in load to provide substantial equality among said sources of the incremental cost of power delivered by them at their changed generation levels.

17. In power generating and distributing systems of the type having a plurality of power sources interconnected by transmission lines, the combination of computing means including a computing network having circuit components disposed in rows and columns in number at least equal to the number of power sources, the circuit components in each column being effectively connected in series-circuit relation for flow of current through the circuit components in each said column, summing circuits for each said row in which the circuit components of each said row are connected in series-circuit relation for current flow through them, means including first voltages for producing current flow through corresponding series-connected circuit components for developing second voltages, said first and said second voltages inter-relating given levels of generation and incremental transmission loss for each of the power sources at said given levels of generation, said computing means having other circuit components for developing outputs related to the incremental cost of generating power at each said source at said given level, at least two of said voltages representing the variables affecting incremental cost of delivered power, said other circuit components including voltage-modifying means included in said network at points intermediate those at which said two voltages are respectively developed and adjustable to introduce into said network a voltage-modifying effect representative of incremental costs of power delivered at said given levels of generation by said sources.

18. In power generating and distributing systems of the type having a plurality of power sources interconnected by transmission lines, the combination of means including a computing network having circuit components disposed in rows and columns at least equal in number to the number of power sources, the circuit components in each column being effectively connected in series-circuit relation for flow of current through the circuit components in each said column, summing circuits for each said row in which the circuit components of each said row are connected in series-circuit relation for current flow through them, means including first voltages for producing current flow through corresponding series-connected circuit components for developing second voltages, said first and said second voltages inter-relating given levels of generation and incremental transmission loss for each of the power sources at said given levels of generation, said means having other circuit components developing from one of said first and second voltages third voltages equal to unity minus said one of said voltages, said other circuit components including voltage-modifying means included in said network and adjustable to introduce into said network a voltage-modifying effect representative of incremental cost of power delivered at said given level of generation, control means responsive to a change in load on the system as a whole, means operable in accordance with the operation of said control means for varying the power generation by said sources until the total change in generation satisfies the total change in load on the system, and generation-control means for each said source operable upon change of adjustment of said voltage-modifying means for subdividing among said sources said total change in generation to satisfy said change in load to provide substantial equality among said sources of the incremental cost of power delivered by them at their changed generation levels.

19. In power generating and distributing systems of the type having a plurality of power sources interconnected by transmission lines, the combination of a computing network having interconnected circuit components for developing first voltages and second voltages respectively inter-relating given levels of generation of said sources and quantities having magnitudes dependent upon the magnitudes of the incremental transmission losses for said power sources at said given level of generation and for developing third voltages related to the incremental cost of generating power at each said source at said given level, said network including additional circuit elements, at least one of which is adjustable for introducing variations representative of variable cost factors in the generation of power at each said source, said second and third voltages representing the variables affecting incremental cost of delivered power, said circuit components including voltage-modifying means included in said network at points intermediate those at which said second and third voltages are respectively developed and adjustable to introduce into said network a voltage-modifying effect representative of incremental cost of power delivered at said given level of generation, control means responsive to a change in load on the system, means operable in accordance with the operation of said control means for varying the power generation by said sources until the total change in generation satisfies the total change in load on the system, and generation-control means for each said source operable upon change of adjustment of said voltage-modifying means for subdividing among said sources said generation changes to satisfy said change in load to provide substantial equality among said sources of the incremental cost of power delivered by them at their changed generation levels.

20. In power generation and distributing systems of the type having a plurality of power sources interconnected by transmission lines, the combination of a computing network having interconnected circuit components for developing first voltages and second voltages respectively inter-relating given levels of generation of said sources and the quantities equal to unity minus the incremental transmission loss for each said source at said given levels of generation, said network including voltage-modifying means operable with changes in said levels of generation for introducing a variable representing the incremental cost of generating power at each said source, circuit components connected to said network for developing output signals representative of incremental cost of power delivered at said given level of generation, control means responsive to a change in load on the system as a whole, means operable in accordance with the operation of said control means for varying the power generation by said sources until the change in generation satisfies the total change in load on the system, and generation-control means operable in accordance with the ratio between said quantity and said variable representative of said incremental cost of generating power at each said source for subdividing among said sources said total generation change required to satisfy said change in load to provide substantial equality of the incremental costs of power delivered by said sources at their changed generation levels.

21. The combination set forth in claim 20 in which means are provided for indicating and recording said ratio for each said source as a measure of the incremental cost of power delivered by each of said sources to said load.

22. The combination set forth in claim 20 in which one power source is utilized as a reference and the power generation of the remaining sources adjusted by said generation-control means to maintain said substantial equality of the incremental costs of power delivered between and with reference to said selected reference source.

23. The combination set forth in claim 20 in which there is provided a pulse-producing means for producing raise and lower pulses in response to a desired change of generation of said sources, and said generation-control means including means for changing generation of one or more of said sources only upon production of pulses by said device.

24. The combination set forth in claim 23 in which said generation-control means includes routing circuits for transmittal of said pulses first to one source and then to other of said sources when said ratios change by differing amounts.

25. The combination set forth in claim 20 in which there is provided a recorder for total transmission losses on said system, said recorder responding to the sum of the products of quantities representative of incremental transmission losses and said respective given levels of generation.

26. In power generating and distributing systems of the type having a plurality of power sources interconnected by transmission lines, the combination of a computing network having interconnected circuit components for developing first voltages and second voltages respectively inter-relating existing levels of generation of said sources and the incremental transmission losses for said sources at said existing levels of generation and for developing third voltages related to the incremental cost of generating power at each said source at said existing levels, said second and third voltages representing the variables affecting incremental cost of delivered power, said circuit components including voltage-modifying means included in said network at points intermediate those at which said second and third voltages are respectively developed and adjustable to introduce into said network a voltage-modifying effect representative of incremental cost of power delivered at said existing level of generation, control means responsive to a change in load on the system, means operable in accordance with the operation of said control means for varying the power generation by said sources until the change in generation satisfies the total change in load on the system, and generation-control means for each said source operable upon change of adjustment of said voltage-modifying means for subdividing among said sources said total generation change required to satisfy said change in load to provide substantial equality among said sources of the incremental cost of power delivered by them at their changed generation levels.

27. The method of controlling distribution of an electrical load among a plurality of power sources interconnected by transmission lines to minimize the cost of delivered power, which comprises measuring actual generation of each said source, from said measured generation of all of said sources computing lambda ($\lambda$), lambda ($\lambda$) being defined as the incremental cost of delivered power at each said source, selectively adjusting the levels of generation of said sources except as a constraint is imposed upon a power source which prevents change in generation in the required direction for increase of generation of each source having a lower $\lambda$ than the $\lambda$ of other of said sources and for decreasing generation of sources having a higher $\lambda$ than the $\lambda$ of other of said sources, said changes in generation at said sources continuing until all sources, except for the occurrence of a constraint upon one or more of said sources, have the same values of $\lambda$, the condition of minimum cost of delivered power from all of said sources.

28. In a system for the determination of the loading of power sources interconnected by transmission lines, the combination of computing means having a group of series-circuits, each said series-circuit including a plurality of circuit components effectively in series one with the other, isolating transformers having primary windings, means for energizing said primary windings respectively in accordance with actual generation of each of said sources, said transformer windings having said circuit components in circuit therewith for developing output signals from each of said series-circuits, and circuit means included in each of said series-circuits for modifying by a constant the magnitude of said output signals to make them representative of the quantity unity minus incremental transmission loss of each of said sources.

29. The combination set forth in claim 28 in which each said isolating transformer includes a primary winding and a plurality of secondary windings.

30. A system for controlling the distribution of an electrical load among a plurality of power sources interconnected by transmission lines, comprising adjustable components, means responsive to a change of generation by said sources for adjusting said components, a first computing means responsive to said changes in generation for inter-relating first signals representative of incremental transmission loss for each of said sources with a changed level of generation thereof, a second computing means responsive to said changed levels of generation for developing second signals representative of the incremental cost of generation of each said source at its said changed level, and means responsive to changes in the magnitudes of said first signals and of said second signals for distributing the desired total changed level of generation of said system among said power sources so that there is equality of the incremental cost of delivered power from each of said sources at their changed levels of generation.

31. In a load-frequency control system of an interconnected power system for producing change-of-generation signals for generating sources in accordance with the load requirements of said power system, the improvement comprising a computer network for transmitting said change-of-generation signals to said generating sources of said power system to maintain equal the incremental cost of power delivered for each said source comprising a first section of said network for each said source having input and output control signals related in accordance with the relation between the level of generation at said source and the incremental transmission loss associated with that source at that level of generation, a second section for each said source including at least one adjustable circuit component adjustable to represent a factor in the cost of generating power at the respective sources having input and output control signals related in accordance with the relation between the level of generation at the source and the incremental cost of producing power at that level, circuit means connected between said first and second sections and including means adjustable in accordance with the incremental cost of power delivered from said source, and signal-transmitting means operative under the control of said circuit means to transmit said change-of-generation signals to said respective sources to maintain substantially equal the incremental costs of power delivered by said sources.

32. A system for the economic loading of sources of power of an electric power system, comprising a network having circuit components and for each power source at least one voltage source variable with generation level of each said power source for producing outputs representative of incremental transmission loss for each said source at said loadings, means including a circuit component in said network for developing therein a potential difference and for producing signal outputs representing quantities respectively equal to a constant minus said incremental transmission losses for said power sources, a network for each said source including at least one circuit component adjus[illegible]ble in accordance with the change of fuel cost for each said power source, means including a circuit component connected between each said signal output and each of said last-named networks for introducing into one of said networks a voltage-modifying effect representative of the incremental cost of delivered power at said level of generation at each of said power sources, and means for varying the generation of each said power source in direction and by an amount to maintain substantially equal said voltage-modifying effects representative of said incremental costs of delivered power by each said power source.

33. In a system for the determination of the loading of power sources interconnected by transmission lines, the combination of computing means having inputs and outputs, said computing means between said inputs and outputs having components for developing a plurality of products, each product being representative of the generation of a source multiplied by a constant of magnitude related to power transmission loss, one said component for each of said inputs representing a self-constant whose magnitude is related to the incremental transmission loss produced by the generation at one of said sources and including other of said components representing mutual-constants having values respectively establishing the relationship of the effect on the incremental transmission loss of said one source of the generation of all the other said sources, said computing means including summing circuits, one for each said source, for producing first output signals at said outputs representative of the algebraic sum of a plurality of said products, each said summing circuit including all of said components which contribute to said products representing components of said incremental transmission loss of one of said sources, and circuit means included in said summing circuits modifying said first output signals by a constant.

34. A system of controlling distribution of an electrical load among a plurality of power sources interconnected by transmission lines to minimize the cost of delivered power, comprising means located at each said power source for measuring actual generation thereof, computing means operable in accordance with said measured generation of all said sources for producing outputs representative of lambda ($\lambda$), lambda ($\lambda$) being defined as the incremental cost of delivered power at each said source, means operable under the control of said outputs for selectively adjusting the levels of generation of said sources, except as a constraint is imposed upon a power source which prevents change in generation in the required direction, for increase of generation of each source having a lower $\lambda$ than the $\lambda$ of other of said sources and for decreasing generation of sources having a higher $\lambda$ than the $\lambda$ of other of said sources, said means being operative to continue change in generation at said sources until all sources, except for the occurrence of a constraint upon one or more of them, have the same value of $\lambda$, resulting in a condition of operation for minimum cost of delivered power from all said sources.

35. In a system for the determination of the loading of power sources interconnected by transmission lines, the generation capacity of each of said sources imposing constraints as by the selected magnitudes of their permissible maximum and minimum generation, the maximum loading of said transmission lines imposing constraints as by the maximum magnitudes of their permissible load-carrying capacities, the combination of computing means having input circuits, one for each of said sources, and having corresponding output circuits, means responsive to actual generation for applying input signals to each of said input circuits respectively representative of said actual generation of said power sources, said computing means between said input and output circuits having components for developing a series of products, each product being representative of said actual generation of a source multiplied by a constant of magnitude related to power transmission loss, one said component of each of said input circuits representing a constant of magnitude related to the incremental transmission loss produced by the generation at one of said sources and including other of said circuit components representing constants having values respectively establishing the relationship of the effect on the incremental transmission loss of said one source of the generation of all the other said sources, said computing means including summing circuits for producing output signals at said output circuits representative of the algebraic sum of a plurality of said products, each said summing circuit including all of said components producing products relating the effect upon incremental transmission loss for one of said sources of the actual generation of all of said sources, circuit means included in said summing circuits modifying by a constant said output signals to make them respectively representative of the incremental transmission loss for each of said sources at their said actual generation levels, each said input signal being held at a fixed value representative of the magnitude of actual generation whenever a constraint imposes a limitation upon change of generation of one or more of said sources.

36. In a system for the determination of the loading of power sources interconnected by transmission lines, the combination of computing means having inputs and outputs, said computing means between said inputs and outputs having components for developing a plurality of products, each product being representative of the generation of a source multiplied by a constant of magnitude related to power transmission loss, one said component of each of said inputs representing a self-constant whose magnitude is related to the incremental transmission loss produced by the generation at one of said sources and including other of said components representing mutual-constants having values respectively establishing the relationship of the effect on the incremental transmission loss of said one source of the generation of all the other said sources, said computing means including summing circuits, one for each said source, for producing first output signals at said outputs representative of the algebraic sum of a plurality of said products, each said summing circuit including all of said components which contribute to said products representing components of said incremental transmission loss of one of said sources, circuit means included in said summing circuits modifying said first output signals by a constant, each said summing circuit including a modifying means for varying each of said first output signals to maintain their magnitudes equal to unity minus the incremental transmission loss for said sources, computing means having inputs of magnitude representative of the generation at each of said sources and varying with change of generation of said sources, and a combining circuit for producing from said computing means outputs representative of the incremental cost of delivered power, whereby the generation of the sources having the lower incremental costs of delivered power may be increased and the generation from the sources having the higher incremental costs of delivered power may be reduced for realization of the lowest total cost of delivered power from all of said sources, the input signals for a source upon which a constraint prevents change of generation of a source in one direction being maintained at a fixed value until the generation demanded of such source changes in the opposite direction.

37. In power generating and distributing systems for generating stations having generators therein, the combination of a computer network for solving the equation $$\lambda_{Gm}=\frac{\dfrac{dF}{dP_{Gm}}}{1-\dfrac{\partial P_L}{\partial P_m}}$$

where $\lambda_{Gm}$=incremental cost of power delivered for a particular generator G in station $m$, $\frac{dF}{dP_{Gm}}$=incremental generation cost for said generator G in said station $m$, and $\frac{\partial P_L}{\partial P_m}$=incremental transmission loss of station $m$, said computer network having a first section with circuit components for varying an applied voltage to produce a first output voltage varying in the same manner as the incremental generation cost for said generator G changes with changed loading, said computer network having a second section with circuit components which upon flow of currents therethrough representative of the generation at each station produce second output voltages varying in the same manner as said incremental transmission loss for each said generator, circuit means including voltage-producing components from which voltages said second output voltages are respectively subtracted, and a ratio circuit interconnecting said sections for producing output voltages varying in the same manner as $\lambda$ for each said generator.

38. A system for the determination of the loading of a plurality of power sources interconnected by transmission lines, said power sources imposing constraints as by the permissible magnitude of their maximum and minimum loadings and the transmission lines imposing constraints as by the permissible limits on the maximum power which may be carried thereby, comprising a computer having input circuits, one for each power source, and having output circuits, one for each power source, said computer including components for producing from signals applied to said input circuits the incremental transmission loss for each source, means for respectively applying to said input circuits signals representative of the actual generation of said sources, a second computer operable in accordance with said actual generation of said sources for producing outputs respectively representative of the incremental costs of generation at each source, means including ratio-determining means interposed between said computers for producing outputs respectively representative of the incremental costs of delivered power from said sources, said ratio circuit computing quotients of each of said incremental costs of generation of power divided respectively by the quantity of one minus said incremental transmission loss for each said source, changes in actual generation of said sources producing immediate changes in said quotients representative of said incremental costs of delivered power, and indicating means operable with change of said quotients for indicating those of said power sources having lower incremental costs of delivered power than the remaining power sources having higher incremental costs of delivered power whereby the generation of said power sources having the lower incremental costs of delivered power may be adjusted to increase their levels of generation and the generation of said sources having said higher incremental costs of delivered power may be reduced, for the realization of the lowest total cost of delivered power for the system as a whole.

39. A system for the determination of the loading of power sources interconnected by transmission lines, the generation capacity of each of said sources imposing constraints as by the magnitudes of their permissible maximum and minimum generation, the maximum loading of said transmission lines imposing constraints as by the magnitudes of their permissible maximum loads, comprising computing means having input circuits, one for each of said sources, and having corresponding output circuits, said computing means between said input and output circuits having components for developing a series of products respectively representative of the actual generation of each said source, each multiplied by a constant of magnitude related to power transmission loss, said computing means including summing circuits for producing output signals from said products representative of the incremental transmission loss for each of said sources, each said summing circuit including a voltage source for introduction of a constant modifying each said output signal by a predetermined amount, said computing means including circuit components, at least one of which is adjustable in response to actual generation of each said source for producing output signals representative of the incremental cost of geenration at each said source, means including a ratio circuit for each said source for determination of lambda, lambda being defined as equal to the incremental cost of delivered power from said source, by dividing said incremental cost of generation by the quantity unity minus said incremental transmission loss, and means operable with change of each said lambda for indicating the generators having the lower lambdas as compared with the generators having the higher lambdas, wheerby the generation at the generators having the lower lambdas may be increased, and whereby the generation from the generators having the higher lambdas may be reduced for realization of the lowest total cost of delivered power, any of said constraints limiting the generation at any said source being automatically taken into account by maintaining at fixed values corresponding input signals with a continuing change in load on the system as a whole.

40. The combination set forth in claim 39 in which the input to said computing means from each said power source varies the input signals thereof coincidentally with change of generation at each said power source for concurrently changing said computed incremental costs of generating power and said computed incremental transmission losses, whereby said lambdas are changed coincidentally with said changes of generation at said sources.

41. In power generating and distributing systems for generating stations having generators therein, the combination of computing means for solving the equation $$\lambda_{Gm}=\frac{\frac{dF}{dP_{Gm}}}{1-\frac{\partial P_L}{\partial P_m}}$$

where $\lambda_{Gm}$=incremental cost of power delivered for a particular generator G in station $m$ $\frac{dF}{dP_{Gm}}$=incremental generation cost for said generator G in said station $m$, and $\frac{\partial P_L}{\partial P_m}$=incremental transmission loss of station $m$ said computing means having a first section for producing outputs varying in the same manner as the incremental cost of generation for said generator G with changed loading, said computing means having a second section for producing outputs varying in the same manner as said incremental transmission loss for each said generator, and means including a ratio means interconnecting said sections for producing outputs varying in the same manner as lambda (λ) for each said generator.

42. In a system for the determination of the loading of power sources interconnected by transmission lines, the combination of computing means having first and second groups of series-circuits, each said series-circuit including a plurality of circuit components effectively in series one with the other, a different one of the circuit components of each series-circuit in said first group being connected in each of said series-circuits of said second group, the impedances of said circuit components having values for collectively inter-relating power generation of said sources and incremental transmission losses of said sources, each of said series-circuits of one of said groups comprising a transformer having a primary winding and a plurality of secondary windings excited by the common flux of said transformer, each of said series-circuits of said other of said groups including a secondary winding of a different one of said transformers of said other series-circuits, means responsive to actual generation of each of said sources for applying input signals respectively to each of said series-circuits of said second group for developing output signals from each of said series-circuits of said first group, and circuit means included in each of said series-circuits of said first group for modifying by a constant the magnitude of said signals developed therein to make them representative of the incremental transmission loss of each of said power sources.

43. In a system for the determination of the loading of power sources interconnected by transmission lines, the combination of means for measuring the generation of each said source, computing means operable in accordance with the output of said measuring means for producing signals representative of the incremental transmission loss of each said source, means operable in accordance with said generation for producing in combination with said signals outputs representative of λ, lambda being defined as the incremental cost of delivered power from each said source, circuit means operable with change of said signals and of said outputs for comparing the incremental cost of delivered power from each of said sources one against the other and for selecting from said sources those having the lower incremental costs of delivered power for increase of generation and for selecting from said sources those having the higher incremental costs of delivered power for reducing their generation, and means responsive to a system condition for initiating increase and decrease of generation depending upon the direction of change of said system condition.

44. The combination set forth in claim 43 in which there are provided high-λ and low-λ busses, and said outputs representative of incremental cost of delivered power are in the form of voltages, means including said voltage outputs for establishing on said busses potentials representative of the average incremental cost of delivered power from said sources, said circuit comparing means including voltage detectors for each said source for increase and decrease of generation at each said source when said voltage outputs differ in selected directions from said potentials of said busses.

45. The combination set forth in claim 44 in which the potential of at least one of said busses is affected to a larger degree by a source whose generation is being changed by one of said voltage detectors than by said sources whose generations are not being changed by said detectors.

46. The combination set forth in claim 43 in which limit circuits are provided for each said source, each said limit circuit including means for eliminating in the comparison of incremental costs of delivered power from said sources that source which has reached the limit of its regulating range but only for the direction in which said limit of said range has been reached.

47. In a system for the determination of the loading of power sources interconnected by transmission lines, the combination of computing means for producing output voltages varying in accordance with the incremental cost of delivered power from each of said sources, said incremental cost of delivered power being hereinafter referred to as λ, high-λ and low-λ busses, comparison circuits including resistors, at least one for each of said sources connected respectively to each of said busses, the potentials of said busses being representative of the average of said voltages so weighted that the potentials of said busses approach the potential levels of the sources having the highest or lowest potential respectively and varying in accordance with λ for each of said sources in proportion to said weighting, and detecting means operable whenever one of said λ-representing voltages of one of said sources differs in one direction from one of said λ-busses for decrease of generation of said one of said sources and operable when said λ-representing voltage differs in the opposite direction from the potential of the other of said λ-busses for increase of generation of said one of said sources.

48. The combination set forth in claim 47 in which there is provided a short-circuiting means and at least two of said resistors for each said circuit, and means for selectively operating said short-circuiting means for one of said resistors for increasing the weight of the λ-representing voltage of the source whose generation is being changed with respect to its associated λ-bus.

49. The combination set forth in claim 47 in which limit circuits are provided, each said limit circuit including means for removing from one of said λ-busses the λ-representing voltage whenever one of said sources reaches a limit of its regulating range in one direction and for removing said λ-representing voltage from the other of said busses whenever one of said sources reaches the limit of its regulating range in the other direction.

50. The combination set forth in claim 47 in which there is associated with each said λ-bus, voltage-varying means for varying said potential of said λ-busses independently of the magnitudes of said λ-representing voltages.

51. The combination set forth in claim 50 in which means are provided for adjustment of said last-named voltage-varying means in response to a desired change in total system generation and in a direction to produce changes in generation at a plurality of said sources in a direction to meet the requirement of said desired change of total system generation and to an extent corresponding with the magnitude of said desired change.

52. In a system for the determination of loading of power sources interconnected by transmission lines, the combination of computing means, said computing means having a plurality of circuit components, means for energizing said circuit components in groups in response to actual generation of each of said sources, said computing means including circuit components for producing output voltages representative of the quantities unity minus the incremental transmission loss for each said source, means for applying each of said voltages to a series-circuit including two fixed resistors and an adjustable resistor, a potentiometer for each said source, means for applying to each potentiometer an output voltage appearing across a fixed resistor in each of said series-circuits, an adjustable contact for each said potentiometer movable to positions representative of fuel cost for development of voltages varying in accordance with the reciprocal of the incremental cost of delivered power from each said source, and means for comparing the relative magnitudes of said last-mentioned voltages for controlling generation at said sources to maintain equality of said last-named voltages.

53. A system of controlling distribution of an electrical load among a plurality of power sources interconnected by transmission lines to minimize the cost of delivered power, comprising means located at each said power source for measuring actual generation thereof, computing means operable in accordance with said measured generation of all said sources for producing outputs representative of λ, the incremental cost of delivered power at each said source, means operable under the control of said outputs for selectively adjusting the levels of generation of said sources, except as a constraint is imposed upon a power source which prevents change in generation in the required direction, for increase of generation of each source having a lower λ than the λ of other sources and for decreasing generation of sources having a higher λ than the λ of other sources, said means being operative to continue change in generation at said sources until all sources, except for the occurrence of a constraint upon one or more of them, have the same values of λ, the condition of minimum cost of delivered power from all said sources, said means operable under the control of said outputs including multiplying means for producing electrical quantities representative of the products of actual generation of each said source and the λ for each said source, and further including means for producing a quantity representative of the weighted average value of λ weighted by power generation of all said sources, and comparison means for comparing the λ of each said source with said weighted average value of λ for said increase and decrease of generation of said sources.

54. The combination set forth in claim 53 in which said multiplying means are associated in a summing circuit which includes means for dividing the sum of said products by a quantity representative of the total actual generation for production of said weighted average value of λ.

55. The combination set forth in claim 53 in which said comparison means includes circuit components for converting the difference between the λ of each source and said weighted average value of λ to values representative of desired changes in generation of each said source required to bring its value of λ to said weighted average value.

56. The combination set forth in claim 54 in which said comparison means includes circuit components for converting the difference between the λ of each source and said weighted average value of λ to values representative of desired changes in generation of each said source required to bring its value of λ to said weighted average value.

57. A system for controlling the distribution of an electrical load among a plurality of power sources interconnected by transmission lines to minimize the cost of delivered power, comprising computing means including loop circuits, one for each of said power sources, each loop circuit having circuit components which establish the relationships among a plurality of voltages respectively representative of (*a*) a level of generation of each said source, (*b*) the incremental transmission loss for each said source, (*c*) the quantity of unity minus the incremental transmission loss of each said source, and (*d*) the incremental cost of generating power at each said source, voltage-modifying means including a source of supply connected to said loop circuit for applying at one point thereof a voltage in magnitude representative of one of said voltages for developing at other points along said loop circuit the remaining of said voltages, said loop circuit including a second voltage-modifying means for deriving from one of said voltages (*c*) and (*d*) another voltage equal to the other of said voltages (*c*) and (*d*), means including a detector and a balanceable detector circuit included in each said loop circuit for comparing the voltage in one direction around said loop circuit against the voltage in the other direction around said loop circuit, and means operable under the control of said detector for varying one of said voltage-modifying means until said voltage in one direction around said loop circuit is equal to the voltage in the other direction around said loop circuit.

58. In power generating and distributing systems of the type having a plurality of power sources interconnected by transmission lines, the combination of a computing network having means including a plurality of interconnected circuit components, means for applying input signals to said network, output means for taking first output signals from said network, second computing networks including voltage-modifying means for producing second output signals representative of the incremental cost of generation for each said source, an adjustable circuit component disposed between each of said second computing networks and said first network, means for adjusting said adjustable components in accordance with changes in generation, and means operable in accordance with said output signals for changing the generation of said sources to equalize their incremental costs of delivered power.

59. A system for determining the distribution of generation among a plurality of power sources interconnected to form a power distribution network, comprising computing means having a plurality of components relating the incremental cost of generation for each said source with actual generation of each said source, said computing means including a plurality of additional components for relating the incremental transmission loss for each said source to the actual generation of all said sources, input-varying means for said computing means responsive to change in actual generation of each of said sources for producing outputs representative of the incremental costs of delivered power from each of said sources, and means operable under the control of said outputs for changing the actual generation at said sources in directions to bring said outputs to the same magnitude at said changed levels of generation.

60. The combination set forth in claim 59 in which means responsive to deviation in a system condition from a predetermined value initiates a change in generation by at least one of said sources, and in which the sum of said changes in actual generation meets the requirement of returning said system condition to its predetermined value.

61. A system for determining the distribution of generation among a plurality of power sources interconnected to form a power distribution network, comprising computing means having a plurality of components relating the incremental cost of generation for each said source with the level of generation of each said source, said computing means including a plurality of additional components for relating quantities having magnitudes dependent upon the magnitudes of the incremental transmission loss for each said source to the generation levels of all said sources, input-varying means for said computing means for producing outputs representative of computed levels of generation for each of said sources, output circuits to which said outputs are applied, means developing in said output circuits quantities representative of maximum and minimum limits of generation levels for said sources, and means operable upon attainment of computed levels of generation corresponding with one of said limits for substituting a corresponding one of said quantities in one of said output circuits in place of the corresponding output from said computing means.

62. In a system for the determination of the loading of power sources interconnected by transmission lines, the combination of generation-varying means, control means therefor including a computing means for computing weighted average incremental costs of delivered power from said sources, a comparison circuit for each said source, means for applying to each said circuit a voltage varying in accordance with change in generation of each source, adjustable means including a source of supply for developing voltages for each of said circuits representative of maximum and minimum limits of generation level for the respective sources, voltage-comparing means operable when said applied voltage bears a predetermined relation to one of said developed voltages for preventing change of generation of a source in the direction exceeding its one limit by said control means, and means operable by said voltage-comparing means for modifying the operation of said computing means.

63. A system for determining the distribution of generation among a plurality of power sources interconnected to form a power distribution network, comprising means for producing an output quantity $$\frac{dF}{dP}$$

representative of the incremental cost of generation for each said source, said means including impedances for dividing said output quantity $$\frac{dF}{dP}$$

by a constant C having a magnitude related to the cost of fuel, and means for subtracting a constant K from the modified output quantity representative of the quotient of said division to produce an output representative of a computed level of desired generation.

64. A system for controlling the distribution of an electrical load among a plurality of power sources interconnected by transmission lines to minimize the cost of delivered power, comprising computing means including loop circuits, one for each of said power sources, each loop circuit having circuit components which upon application to said loop circuit of a voltage representative of (1) actual generation of a power source produces further voltages around said loop circuit respectively representative of (2) the incremental transmission loss for each said source, (3) the quantity of unity minus the incremental transmission loss of each said source, and (4) the incremental cost of generating power at each said source, voltage-modifying means including a source of supply connected to each said loop circuit for applying thereto said first-named voltage varying in accordance with actual generation of each of said sources, the remaining of said voltages appearing at other points along said loop circuit, means including a detector and a balanceable detector circuit connected to each said loop circuit, a second voltage-modifying means common to said loop circuit and said detector circuit and adjustable by said dectector for determining the ratio of voltages (4) to (3), said detector adjusting said second means to a position where a fraction of said voltage (3) is equal to said voltage (4), said voltage developed in one direction around said loop and ending with said voltage (4) then being equal to the voltage in the other direction around said loop and ending with said fraction of said voltage (3), and means operable under the control of said detectors for varying actual levels of generation of said sources until said fractions have the same magnitude.

65. The method of controlling distribution of an electrical load among a plurality of power sources interconnected by transmission lines to minimize the cost of delivered power, which comprises generating (1) voltages respectively representative of actual levels of generation of said sources, (2) modifying each of said voltages to produce further voltages repersentative of incremental transmission loss for each said source, (3) the quantity of unity minus the incremental transmission loss of each said source, and (4) the incremental cost of generating power at each said source, selectively varying the generation of each of said sources to change the magnitudes of the generation-representing voltages of each source until the ratio of voltages (3) and (4) of all sources have, to the extent permitted by generation constraints, the same values, whereby the incremental costs of delivered power from said sources is equalized to the extent permitted by said constraints upon change of generation.

66. In a system for the determination of the loading of power sources interconnected by transmission lines, the combination of computing means having first and second groups of circuits, each said circuit of said first group including a plurality of circuit components, each said circuit of said second group being a series-circuit having a plurality of circuit components therein, a different one of the circuit components of each said circuit of said first group being connected in each of said series-circuits of said second group, the impedances of said circuit components having values for collectively inter-relating power generation of said sources and incremental transmission losses of said sources for determination of one of them by said circuits of said second group upon application to said circuits of said first group of signals representative of the magnitudes of the other of them, and means for applying said signals respectively to said circuits of said first group.

67. In a power system including a plurality of interconnected transmission lines to which there are connected a plurality of sources of power, the combination of means responsive to the actual generation at each said source for producing for each source a signal proportional to the magnitude of the incremental transmission loss for said source, means responsive to actual generation at each said source for producing for each source a signal proportional to the magnitude of the incremental cost of generation at the level of said actual generation, means operable in response to said signals from each of said sources for producing an output signal whose magnitude is zero when the incremental cost of delivered power for a source is equal to the average value of the incremental cost of delivered power of all sources, said output signal varying in direction and amplitude as the incremental cost of delivered power of a source increases above or falls below said average value of incremental cost of delivered power, and means responsive to the output signal corresponding with each of said sources for changing the generation of each said source in direction and to extent to bring its incremental cost of delivered power to a value corresponding with said average value of the incremental cost of delivered power of all said sources.

68. In a power system including a plurality of interconnected transmission lines to which there are connected a plurality of sources of power, the combination of means for generating an output signal for each of said sources whose magnitude is zero when the incremental cost of delivered power for a source is equal to the average value of the incremental cost of delivered power of all sources, said output signal varying in direction and amplitude as the incremental cost of delivered power of a source increases above or falls below said average value of incremental cost of delivered power, and means responsive to the output signal corresponding with each of said sources for changing the generation of each said source in direction and to extent to bring its incremental cost of delivered power to a value corresponding with said average value of the incremental cost of delivered power of all said sources.

69. The system of claim 68 in which said combining means includes an averaging means normally responsive to change in actual generation at each of said sources for producing a reference signal corresponding with the average value of the incremental cost of delivered power of all sources and in reference to which said output signals are produced, and means for excluding the effect upon said averaging means of sources of power which are operating at either an upper or lower limit of regulation thereof.

References Cited in the file of this patent

UNITED STATES PATENTS

| | | |
|---|---|---|
| 2,010,594 | Kerr | Aug. 6, 1935 |
| 2,039,426 | Kerr | May 5, 1936 |
| 2,050,338 | Kerr | Aug. 11, 1936 |
| 2,113,164 | Williams, Jr. | Apr. 5, 1938 |
| 2,366,968 | Kaufman | Jan. 9, 1945 |
| 2,367,746 | Williams, Jr. | Jan. 23, 1945 |
| 2,656,977 | Cummings | Oct. 27, 1953 |
| 2,688,728 | Carolus | Sept. 7, 1954 |
| 2,692,342 | Nichols et al. | Oct. 19, 1954 |

FOREIGN PATENTS

| | | |
|---|---|---|
| 1,083,932 | France | Sept. 23, 1953 |

OTHER REFERENCES

Electric Analog Computing (Mynall), Electronic Engineering, June 1947, pages 178 to 180.

Electronic Instruments (Greenwood, Holdam and MacRae), published by McGraw-Hill Book Co., New York, 1948, page 36.

George et al., "Co-ordination of Fuel Cost and Transmission Loss by Use of the Network Analyzer to Determine Plant Loading Schedules," AIEE Technical Paper 49—242, September 1949.

Baldini et al., "A Power System Analog and Network Computer," AIEE Technical Paper 52—62, December 1951.

Electronic Analog Computers (Korn and Korn), published by McGraw-Hill Book Co., New York, 1952, page 254.

UNITED STATES PATENT OFFICE

Certificate of Correction

Patent No. 2,836,730

May 27, 1958

Edwards Donald Early

It is hereby certified that error appears in the printed specification of the above numbered patent requiring correction and that the said Letters Patent should read as corrected below.

Column 5, line 70, for "means" read —mean—; column 15, lines 51 to 53, for $$\frac{F_{Gm}}{P_{Gm}} \quad \text{read} \quad \frac{dF_{Gm}}{dP_{Gm}}$$

column 19, line 31, for "reppresents" read —represents—; column 20, line 51, for "these" read —those—; column 23, line 73, for "770B" read —70B—; column 36, line 75, for "decrease" read —decreased—; column 38, line 11, for "effecting" read —affecting—; column 40, lines 73 and 74, for "advontages" read —advantages—; column 41, line 72, for "when ever" read —whenever—; column 42, line 41, for "583 *b*," read —583*b*,—; line 60, for "560 increases" read —564 increases—; column 46, line 40, for the last quantity in Equation 25, read —$e_5$—; column 47, line 9, after the quantity "$+I_3$" insert — $+I_4$ —; column 54, line 68, for "fo reach" read —for each—; column 60, line 27, for "variable" read —variables—; line 30, for "thid" read —third—; line 31, for "intorduce" read —introduce—; column 69, line 18, for "geenration" read —generation—; column 73, line 59, for "level" read —levels—; column 74, line 50, for "repersentative" read —representative—.

Signed and sealed this 10th day of November 1959.

[SEAL]

Attest:

KARL H. AXLINE,
*Attesting Officer.*

ROBERT C. WATSON,
*Commissioner of Patents.*